United States Patent
Hayes et al.

(10) Patent No.: US 10,896,606 B1
(45) Date of Patent: Jan. 19, 2021

(54) EMERGENCY VEHICLE DETECTION AND RIGHT-OF-WAY DEFERENCE CONTROL IN PLATOONING

(71) Applicant: Bendix Commercial Vehicle Systems LLC, Elyria, OH (US)

(72) Inventors: Thomas J. Hayes, Elyria, OH (US); Michael D. Cremona, Elyria, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 18 days.

(21) Appl. No.: 16/570,283

(22) Filed: Sep. 13, 2019

(51) Int. Cl.
| | |
|---|---|
| *G08G 1/0965* | (2006.01) |
| *H04W 4/90* | (2018.01) |
| *G05D 1/02* | (2020.01) |
| *G05D 1/00* | (2006.01) |
| *G08G 1/16* | (2006.01) |
| *G08G 1/0967* | (2006.01) |
| *H04W 4/46* | (2018.01) |
| *G08G 1/00* | (2006.01) |

(52) U.S. Cl.
CPC ......... *G08G 1/0965* (2013.01); *G05D 1/0022* (2013.01); *G05D 1/0293* (2013.01); *G05D 1/0295* (2013.01); *G08G 1/096725* (2013.01); *G08G 1/162* (2013.01); *G08G 1/22* (2013.01); *H04W 4/46* (2018.02); *H04W 4/90* (2018.02)

(58) Field of Classification Search
CPC ...... G08G 1/0965; G08G 1/161; G08G 1/162; G08G 1/165; G08G 1/167; G08G 1/168; G08G 1/0967; H04W 4/90; G05D 1/0044; G05D 1/0077
See application file for complete search history.

(56) References Cited

U.S. PATENT DOCUMENTS

| | | | | |
|---|---|---|---|---|
| 4,704,610 A | * | 11/1987 | Smith | ................... G08G 1/087 340/906 |
| 4,775,865 A | * | 10/1988 | Smith | ................... G08G 1/087 340/906 |
| 6,765,495 B1 | | 7/2004 | Dunning et al. | |
| 7,133,767 B2 | | 11/2006 | Ogino et al. | |
| 7,383,121 B2 | | 6/2008 | Shinada | |
| 7,961,086 B2 | | 6/2011 | Bradley | |
| 8,145,413 B2 | | 3/2012 | Shida | |

(Continued)

FOREIGN PATENT DOCUMENTS

KR      2012106036 A      9/2012

*Primary Examiner* — Hoi C Lau
(74) *Attorney, Agent, or Firm* — Tucker Ellis LLP

(57) ABSTRACT

Systems and methods are provided for dynamically controlling a set of platooning vehicles travelling on a roadway to respond to a presence of a non-platooning emergency vehicle based on situational factors such as roadway configuration, emergency vehicle status, and a location of the platooning vehicle as being approaching from ahead or from behind. An emergency vehicle sensor unit senses a presence and an urgency status of the emergency vehicle near a platooning vehicle. A roadway configuration sensor unit generates roadway configuration data representative of a sensed configuration of the roadway. A control unit generates an emergency vehicle avoidance platoon control command signal based on the roadway configuration, presence, and urgency data for use by the set of platooning vehicles to maneuver the platoon away from a path of the emergency vehicle.

26 Claims, 31 Drawing Sheets

(56) References Cited

U.S. PATENT DOCUMENTS

| | | | |
|---|---|---|---|
| 9,249,742 B2 | 2/2016 | Sangameswaran et al. | |
| 9,278,689 B1* | 3/2016 | Delp | G08G 1/0965 |
| 9,776,631 B1* | 10/2017 | Domeyer | B62D 6/00 |
| 10,762,779 B1* | 9/2020 | Mundy | G08G 1/0968 |
| 2003/0201906 A1* | 10/2003 | Buscemi | G08G 1/0965 |
| | | | 340/902 |
| 2004/0246144 A1* | 12/2004 | Siegel | G08G 1/0965 |
| | | | 340/902 |
| 2006/0095199 A1* | 5/2006 | Lagassey | B62D 41/00 |
| | | | 701/117 |
| 2007/0132608 A1* | 6/2007 | Votaw | G08G 1/0965 |
| | | | 340/903 |
| 2007/0159354 A1* | 7/2007 | Rosenberg | G08G 1/0965 |
| | | | 340/902 |
| 2012/0136559 A1* | 5/2012 | Rothschild | G08G 1/096775 |
| | | | 701/117 |
| 2015/0024702 A1* | 1/2015 | Morgan | H04L 67/26 |
| | | | 455/404.1 |
| 2016/0098926 A1* | 4/2016 | Probert | G01S 11/02 |
| | | | 340/903 |
| 2016/0253903 A1* | 9/2016 | Wilk | G08G 1/087 |
| | | | 340/902 |
| 2017/0025000 A1* | 1/2017 | Lagassey | G08G 1/094 |
| 2017/0030725 A1* | 2/2017 | Gordon | G01C 21/3492 |
| 2017/0192429 A1* | 7/2017 | Tseng | G05D 1/0088 |
| 2017/0276495 A1* | 9/2017 | Krishnan | G08G 1/096741 |
| 2018/0075759 A1* | 3/2018 | Kim | G08G 1/0965 |
| 2018/0132285 A1* | 5/2018 | Jackson | G08G 1/0955 |
| 2018/0137756 A1* | 5/2018 | Moosaei | G08G 1/0965 |
| 2018/0188725 A1* | 7/2018 | Cremona | G01S 19/13 |
| 2018/0299279 A1* | 10/2018 | Brown | G01C 21/3415 |
| 2018/0301034 A1* | 10/2018 | Morita | G01C 21/3602 |
| 2019/0027032 A1* | 1/2019 | Arunachalam | G08G 1/0965 |
| 2019/0035269 A1* | 1/2019 | Donovan | G05D 1/0293 |
| 2019/0039613 A1* | 2/2019 | Lee | B60W 50/14 |
| 2019/0187719 A1* | 6/2019 | El-Khatib | G08G 1/0965 |
| 2019/0283758 A1* | 9/2019 | Arisa | B60W 10/18 |
| 2019/0302781 A1* | 10/2019 | Tao | G08G 1/164 |
| 2020/0242922 A1* | 7/2020 | Dulberg | G08G 1/08 |
| 2020/0312136 A1* | 10/2020 | Mondello | H04W 12/00512 |
| 2020/0313848 A1* | 10/2020 | Troia | H04W 12/00512 |
| 2020/0313890 A1* | 10/2020 | Mondello | H04L 9/3226 |
| 2020/0313907 A1* | 10/2020 | Mondello | H04L 9/3268 |

\* cited by examiner

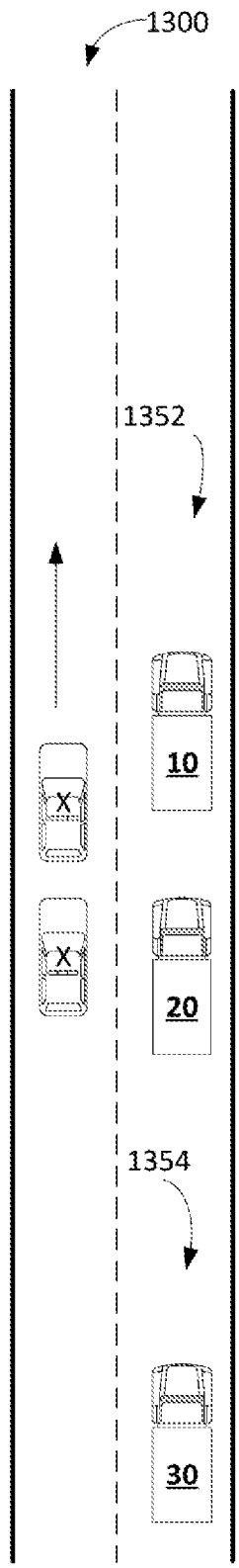
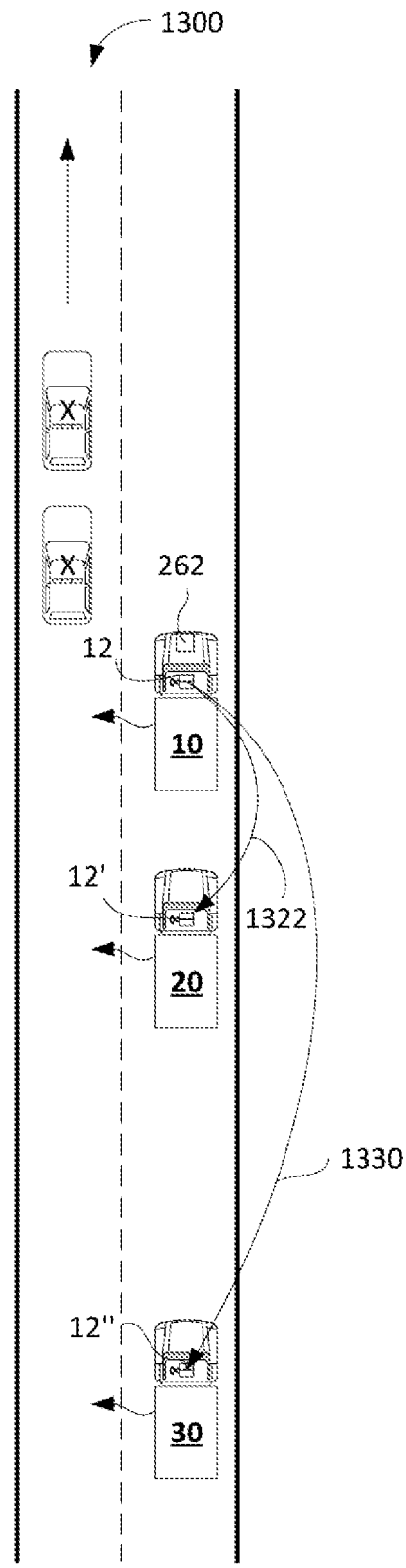
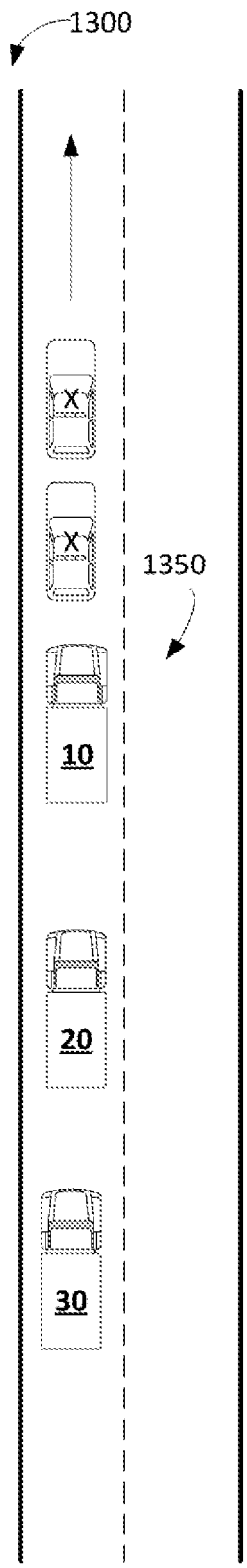
FIGURE 13d
FIGURE 13e
FIGURE 13f

EMERGENCY VEHICLE DETECTION AND RIGHT-OF-WAY DEFERENCE CONTROL IN PLATOONING

TECHNICAL FIELD

The embodiments herein relate generally to highway vehicle platoon management and, more specifically, particular embodiments relate to commercial highway vehicle platoon management where it is desirable to detect oncoming and/or overtaking non-platooning special purpose vehicles such as emergency vehicles or the like, and provide lane clearance deference by one or more of the platooning vehicles to the detected non-platooning special purpose vehicles in safe and efficient ways. Although the embodiments will be described with reference to selected situational operating conditions of platoons formed of highway vehicles, it is to be appreciated that the claimed invention is also amenable to other applications and operating conditions, and can be equivalently extended to other embodiments and environments such as for example in driver assisted and autonomous platoon environments.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane for providing enhanced efficiency to the overall platoon. Larger platoons can involve many follower vehicles spanning more than the single roadway lane. However, the single-file platoon arrangement is most common.

The aerodynamic geometry of the vehicles within a platoon is a significant factor used in determining an ordered arrangement of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by arranging the vehicles participating in the platoon classified this way such that the taller and wider commercial box truck and tractors towing box trailers take the leader position(s) in the platoon, while the shorter and/or narrower flatbed tractor trailer rigs take the follower position(s) in the platoon.

In addition to the above, maintaining a small distance or spacing between the platooning vehicles gives greater benefit in terms of reduced energy consumption. However, holding a tight distance or spacing between platooning vehicles requires that careful attention be paid to various functional and operational characteristics and capabilities of the vehicles such as for example relative braking abilities between vehicle pairs, relative acceleration abilities, relative load or cargo sizes and weights including required stopping distances, and the overall size of the platoon, to name a few. Careful attention must also be paid to other conditions such as external conditions including for example weather conditions including impact of the weather conditions on the vehicles' performance capabilities. Special attention must also be paid to characteristics of the roadway such as roadway incline, decline, and turn radii. These various parameters implicate directly or indirectly the inter-vehicle safety considerations as well as the overall safety of multiple vehicle platoons.

In the single lane or single file platoon such as generally described above, the vehicles participating in a platoon typically mutually cooperate to maintain a relatively fixed and constant (even or the same) distance between adjacent vehicles by exchanging deceleration command and other signals between adjacent vehicles of the platoon. On flat roadways, the constant (even or the same) distance maintained between the vehicles is often determined or otherwise controlled in accordance with control protocols using combinations of global positioning systems (GPS) data sharing, deceleration command signal exchanges, and safety and efficiency algorithms. On graded roadways, the relatively constant (even or the same) distance maintained between the vehicles is often modified to improve or otherwise maintain or enhance the overall safety and efficiency of the platoon. For example, the constant distance maintained between the vehicles can be decreased during conditions of the platoon traversing an incline wherein the tendency of the overall platoon is to decrease speed slightly, thereby allowing for tighter or reduced inter-vehicle distances. Conversely, the distances maintained between the vehicles can be increased during conditions of the platoon traversing a decline wherein the tendency of the overall platoon is to increase speed slightly. In any case, the relative distances between the vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems including forward and rearward sensors used for maintaining a safe relative distance between a host vehicle and a forward vehicle, and collision mitigation (CM) systems for avoiding or lessening the severity of impacts between a host and forward and rearward vehicles using various combinations of transmission, vehicle retarder, and foundation brake controls.

In addition to the above, vehicles participating in a platoon typically share their positions with other vehicles of the platoon by communicating their GPS coordinate data with other vehicles using vehicle-to-vehicle (V2V) communications ("V2V Unicast" communications), and/or vehicle-2-vehicles (V2x) communications ("V2V Multicast" communications), and/or any other suitable communications that might be available. One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers. That definition of the categories of data exchanges starts with differentiating between platooning and ACC, then determines message sets and performance to realize cooperative vehicles.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish and coordinate the relatively even and/or consistent inter-vehicle distance(s) as generally described above.

Platooning vehicles follow each other on the roadway in close proximity to each other and often at highway speeds as explained above, and for this they typically use a Radar System to control the inter-vehicle distance(s). For the lateral control using automatic steering control or assist, a Lane Departure System tracks the lane markings and actively steers or assists in steering the vehicles between the detected lane lines and/or marks. For emergency braking situations such as Autonomous Emergency Braking (AEB) events for example, one or more forward-directed cameras on a following vehicle detects the actuation by a forward vehicle of a rearward facing brake light so that appropriate stopping and/or other evasive actions or the like can suitably be initiated by the following vehicle.

Platoons that operate on public roadways, however, sometimes encounter conditions that require more complicated platoon arrangements and more complicated brake monitoring and platooning control and maintenance operations. For example, many roadways are open to vehicular traffic including non-commercial private traffic having little or no interaction with the platooning vehicles other than sharing a common roadway. Sometimes in practice the non-platooning vehicles, typically comprising small fast automobiles, dart into the path of the platoon, typically comprising large heavily loaded trucks. In addition, non-platooning special purpose vehicles such as emergency vehicles or the like share the roadway with the platooning vehicles and often need access to the same lane as is occupied by the platoon, or they may need access to adjacent lanes, or the like. Also, given the special case of emergencies, those vehicles may desire to overtake the platoon from behind or approach the platoon from ahead while also needing to share same lane as is occupied by the platoon by desire or necessity, pass via adjacent lanes, or the like. It is to be appreciated that non-platooning special purpose vehicles may include not only emergency vehicles but also police and fire vehicles, Department of Transportation plow vehicles, or any vehicle that has a purpose that is or should be elevated above the purpose of simple transportation of freight and/or people. For purposes of the present disclosure, however, the expression "emergency vehicle" will be used to express any such special purpose vehicle.

Given the above, therefore, it will be helpful to control a set of platooning vehicles traveling on a roadway to detect a presence of a non-platooning emergency vehicle by one or more of the platooning vehicles, to detect an emergency priority level of the emergency vehicle by one or more of the platooning vehicles, to detect the physical construct of the travelled highway by one or more of the platooning vehicles, and to respond to the detected presence of the non-platooning emergency vehicle such as for example by sharing the above information throughout the platoon, so that the platoon overall can react to the presence of the emergency vehicle, to enable the emergency vehicle to safely and efficiently pass by the platoon from ahead or behind the platoon without impediment which might otherwise slow the response time of the emergency vehicle.

It would further also be helpful to dynamically control the set of platooning vehicles traveling on the roadway to respond to the presence of the non-platooning emergency vehicle based on situational factors such as for example the type of non-platooning vehicle, the configuration of the roadway, whether the non-platooning vehicle is approaching from behind or ahead, and the like, to enable the emergency vehicle to safely and efficiently pass the platoon without impediment which might otherwise slow the respond time of the emergency vehicle.

It would also be helpful to control the set of platooning vehicles traveling on the roadway to dynamically respond to the presence of the non-platooning emergency vehicle by maneuvering to unimpeded the vehicle such as by selectively switching lanes based on situational factors such as for example the type of non-platooning vehicle, roadway configuration, and whether the non-platooning vehicle is approaching from behind or ahead so that the emergency vehicle may safely and efficiently pass the platoon without changing lanes itself which might otherwise slow the response time of the emergency vehicle.

It would still further also be helpful to dynamically control the set of platooning vehicles traveling on the roadway to respond to the presence of the non-platooning emergency vehicle based on situational factors such as for example a status of the emergency vehicle as being urgent, highly urgent, etc. to take action commensurate with the level of the emergency to properly and accordingly enable the emergency vehicle to safely and efficiently pass the platoon without impediment which might otherwise slow the respond time of the emergency vehicle.

It would be helpful to control the set of platooning vehicles traveling on the roadway to dynamically respond to the presence of the non-platooning emergency vehicle by selectively switching lanes based on situational factors such as for example the status of the emergency vehicle as being urgent, highly urgent, etc. so that the emergency vehicle may safely and efficiently pass the platoon without changing lanes itself which might otherwise slow the respond time of the emergency vehicle.

It would still further also be helpful to dynamically control the set of platooning vehicles traveling on the roadway to respond to the presence of the non-platooning emergency vehicle based on situational factors such as for example whether the emergency vehicle is approaching from ahead or overtaking from behind to enable the emergency vehicle to safely and efficiently pass the platoon without impediment which might otherwise slow the respond time of the emergency vehicle.

It would be helpful to control the set of platooning vehicles traveling on the roadway to dynamically respond to the presence of the non-platooning emergency vehicle by selectively switching lanes based on situational factors such as for example whether the emergency vehicle is approaching from ahead or overtaking from behind so that the emergency vehicle may safely and efficiently pass the platoon without changing lanes itself which might otherwise slow the respond time of the emergency vehicle.

SUMMARY OF THE EXAMPLE EMBODIMENTS

The embodiments herein provide for new and improved systems and methods for controlling a set of platooning vehicles traveling on a roadway to detect a presence of a non-platooning special purpose vehicle such as for example an emergency vehicle approaching from the rear of a last trailing vehicle of the platoon or approaching from ahead of the platoon towards the lead vehicle of the platoon, to share the detected non-platooning special purpose vehicle presence information with other vehicles of the platoon, and to take action as may be necessary and/or desired to permit the non-platooning special purpose vehicle a best opportunity to pass relative to the platoon to minimize interference with the travel of the non-platooning special purpose vehicle.

The embodiments herein further provide for new and improved systems and methods for controlling a set of platooning vehicles traveling on a roadway to detect a type of status of the non-platooning special purpose vehicle such as for example, a high urgency emergency, police, or fire vehicle as examples, or a low-urgency Department of Transportation plow vehicle, or commercial towing vehicle for example, or any vehicle that has a purpose for travelling the roadway together with the platooning vehicles that is or should be elevated above the purpose of simple transportation of freight and/or people.

The embodiments herein further provide for new and improved systems and methods for controlling a set of platooning vehicles traveling on a roadway to respond to the detected presence and type of the special purpose vehicle to enable the special purpose vehicle to safely and efficiently pass the platoon with minimum impediment that would otherwise slow the response time of the emergency vehicle.

The embodiments herein provide for new and improved systems and methods for controlling a set of platooning vehicles traveling on a roadway to respond to a presence of a non-platooning emergency vehicle based on situational factors such as for example the type of non-platooning vehicle, roadway configuration, and whether the non-platooning vehicle is approaching from behind or ahead to enable the emergency vehicle to safely and efficiently pass the platoon with minimum impediment that would otherwise slow the respond time of the emergency vehicle.

The embodiments herein provide for new and improved systems and methods for controlling a set of platooning vehicles traveling on a roadway to dynamically respond to a presence of a non-platooning emergency vehicle by generating signals and transmitting the signals to other vehicles of the platoon to control the platoon to perform or otherwise execute a platoon maneuver such as for example to selectively switch lanes based on situational factors such as for example the type of non-platooning vehicle, roadway configuration, and whether the non-platooning vehicle is approaching from behind or ahead so that the emergency vehicle may safely and efficiently pass the platoon without changing lanes itself which would otherwise slow the respond time of the emergency vehicle.

The embodiments herein provide for new and improved systems and methods for controlling a set of platooning vehicles traveling on a roadway to respond to a presence of a non-platooning emergency vehicle based on situational factors such as for example a status of the emergency vehicle as being highly urgent (high priority), normal/regular urgent (low priority), etc. to enable the emergency vehicle to safely and efficiently pass the platoon with minimum impediment that would otherwise slow the respond time of the emergency vehicle.

The embodiments herein provide for new and improved systems and methods for controlling a set of platooning vehicles traveling on a roadway to dynamically respond to a presence of a non-platooning emergency vehicle by selectively switching lanes based on situational factors such as for example the status of the emergency vehicle as being urgent (low priority), highly urgent (high priority), etc. so that the emergency vehicle may safely and efficiently pass the platoon without changing lanes itself which would otherwise slow the respond time of the emergency vehicle.

The embodiments herein provide for new and improved systems and methods for controlling a set of platooning vehicles traveling on a roadway to respond to a presence of a non-platooning emergency vehicle based on situational factors such as for example whether the emergency vehicle is approaching from ahead or overtaking from behind to enable the emergency vehicle to safely and efficiently pass the platoon without impediment which would otherwise slow the respond time of the emergency vehicle.

The embodiments herein provide for new and improved systems and methods for controlling a set of platooning vehicles traveling on a roadway to dynamically respond to a presence of a non-platooning emergency vehicle by selectively switching lanes based on situational factors such as for example whether the emergency vehicle is approaching from ahead or overtaking from behind so that the emergency vehicle may safely and efficiently pass the platoon without changing lanes itself which would otherwise slow the respond time of the emergency vehicle.

In accordance an aspect, a platoon management control system and method uses an emergency vehicle sensor unit including a processor executing code stored in a memory to detect a presence of a special purpose non-platooning vehicle near to a platooning vehicle, and a roadway configuration sensor unit including a processor executing code stored in a memory to detect a configuration of the roadway upon which the platooning vehicle is travelling, wherein a set of platooning vehicles is controlled in response to the detected presence of the emergency vehicle and to the conditions of the roadway. The emergency vehicle sensor unit may be for example a light sensor and a processor executing logic stored in a memory to detect a flashing light on an emergency vehicle and determine a flash rate and/or color of the flashing light(s) using one or more filters or the like to determine the level of the emergency. The roadway configuration sensor unit may be for example a camera and a processor executing logic stored in a memory to compare the roadway imaged by the camera with a set of images previously stored for comparison against to determine a configuration of the roadway and/or to extract map data in concert with an on-board GPS system in order to determine a configuration of the roadway. A platoon management control system is disposed in each of the vehicles forming the platoon.

In accordance an aspect, a platoon management control system is disposed in each of the vehicles forming the platoon wherein an emergency vehicle sensor unit of a platoon management control system disposed in the lead platoon vehicle detects a presence of a special purpose non-platooning vehicle travelling towards the platoon from ahead, and an emergency vehicle sensor unit of a platoon management control system disposed in the training platoon vehicle detects a presence of a special purpose non-platooning vehicle approaching the platoon from behind.

In accordance with a further aspect, the emergency vehicle sensor unit of the platoon management control systems disposed in each of the vehicles forming the platoon include a forward-directed vehicle sensor that operates to detect a presence of an emergency vehicle heading towards the platoon from ahead of the platooning vehicle. In addition, the emergency vehicle sensor unit of the platoon management control systems disposed in each of the vehicles forming the platoon include a rearward-directed sensor that operates to detect a presence of an emergency vehicle heading towards the platoon from behind the platooning vehicle.

In accordance with yet a further aspect, the emergency vehicle sensor unit operates to detect a status of an emergency vehicle heading towards the platoon. The emergency vehicle sensor unit further operates to detect the status of an emergency vehicle heading towards the platoon as being urgent, highly urgent, etc. The emergency vehicle sensor unit further operates to detect a status of an emergency vehicle heading towards the platoon based on one or more characteristics of a flashing light generated by the emergency vehicle. In an embodiment, the emergency vehicle sensor unit operates to detect the status of an emergency vehicle heading towards the platoon based on detecting a frequency of the flashing light generated by the emergency vehicle. In a further embodiment, the emergency vehicle sensor unit operates to detect the status of an emergency vehicle heading towards the platoon based on detecting one or more colors of the flashing light generated by the emergency vehicle. In yet a further embodiment, the emergency vehicle sensor unit operates to detect the status of an emergency vehicle heading towards the platoon based on a combination of the detecting flashing frequency and the detected one or more colors of the flashing light generated by the emergency vehicle.

In accordance with yet a further aspect, the roadway configuration sensor unit operates to sense a configuration of the roadway and to generate roadway configuration data representative of the sensed configuration of the roadway. The roadway configuration sensor unit may in one embodiment for example include a GPS sensor and a database of roadway configurations wherein a current location determined using GPS is used to index into the roadway configuration database to determine the configuration of the current roadway. In another form, the roadway configuration sensor unit may include one or more cameras and/or one or more LASER sensors for obtaining an image of the current roadway wherein current roadway image data may be used to index a database for comparison against a plurality of stored pairings of roadway image data sets and their respective configuration types for determining a configuration of the current roadway using the stored roadway images. The roadway configuration sensor unit may operate to sense a multi-lane roadway having a single lane in each direction. In accordance with yet a further aspect, the roadway configuration sensor unit may operate to sense a two lane roadway having a high-speed lane of the two lane roadway, and a low-speed lane of the two lane roadway. In accordance with yet a further aspect, the roadway configuration sensor unit may operate to sense a multi-lane roadway having two (2) or more lanes in each direction. In accordance with yet a further aspect, the roadway configuration sensor unit may operate to sense a divided highway roadway having a median dividing two (2) or more lanes in each direction.

In accordance with yet a further aspect, logic of a platoon control unit of the platoon management control system and method is executable by a processor to use emergency vehicle present data to determine a position of the emergency vehicle relative to the platooning vehicle as being a one of travelling towards the platoon from ahead or otherwise approaching from ahead of the first associated platooning vehicle, or approaching the first associated platooning vehicle of the platoon from behind from behind. The logic of a platoon control unit may selectively, based on the determined position of the emergency vehicle to be approaching from ahead, use the emergency vehicle status data to generate an emergency vehicle avoidance platoon control command signal for use by the set of platooning vehicles to maneuver the platoon away from a path of the associated emergency vehicle based on a level of the emergency and on the configuration of the roadway. The logic of a platoon control unit may selectively, based on the determined position of the associated emergency vehicle to be approaching from behind, use the roadway configuration data to generate the emergency vehicle avoidance platoon control command signal for use by the set of platooning vehicles to maneuver the platoon away from a path of the associated emergency vehicle based on a level of the emergency and on the configuration of the roadway.

In accordance with yet a further aspect, a transmitter unit of the platoon control unit of the platoon management control system is operable to transmit the emergency vehicle avoidance platoon control command signal to the other platooning vehicles of the platoon for use by the set of platooning vehicles to maneuver the platoon away from a path of the associated emergency vehicle.

In accordance with yet a further aspect, a receiver unit of the platoon control unit of the platoon management control system and method is operable to receive an emergency vehicle avoidance platoon control command signal from another platooning vehicle of the platoon for use by the receiving vehicle to maneuver together with the platoon away from a path of the associated emergency vehicle.

An example embodiment to be described below provides a system for dynamically controlling a set of platooning vehicles travelling on an associated roadway to respond to a presence of a non-platooning emergency vehicle approaching the set of platooning vehicles on the associated roadway. The system of an example embodiment includes a platoon control unit configured to be disposed in a first associated platooning vehicle of the set of platooning vehicles, an emergency vehicle sensor unit operatively coupled with the platoon control unit and disposed in the first associated platooning vehicle, a roadway configuration sensor unit operatively coupled with the platoon control unit and disposed in the associated platooning vehicle, and a first transceiver operatively coupled with the platoon control unit and disposed in the first associated platooning vehicle.

The first platoon control unit includes a processor, a non-transient memory device operatively coupled with the processor, and logic stored in the non-transient memory and executable by the processor to control a platooning operation of the first associated platooning vehicle. The first emergency vehicle sensor unit is operable to sense a presence of an associated emergency vehicle near to the first associated platooning vehicle and, based on sensing the presence of the associated emergency vehicle near to the first associated platooning vehicle: determine a position of the emergency vehicle relative to the first associated platooning vehicle; generate emergency vehicle position data representative of the determined position of the associated emergency vehicle relative to the first associated platooning vehicle, determine a status of the associated emergency vehicle, and generate emergency vehicle status data representative of the determined status of the associated emergency vehicle. The roadway configuration sensor unit is operable to: sense the associated roadway, determine a configuration of the associated roadway, and generate roadway configuration data representative of the determined configuration of the associated roadway. The first transceiver is operable to receive signals from the set of platooning vehicles that are not the first associated platooning vehicle, and to transmit signals to the set of platooning vehicles that are not the first associated platooning vehicle. The logic of the platoon control unit is executable by the processor to, based on the first emergency vehicle sensor unit sensing the presence of the associated emergency vehicle near to the first associated platooning vehicle use the emergency vehicle position data, the emergency vehicle status data, and the roadway configuration data to determine emergency vehicle avoidance maneuver command data representative of an emergency vehicle avoidance maneuver for directing the set of platooning vehicles away from a path of the associated emergency vehicle on the associated roadway. In an example embodiment, the first transceiver operates to transmit the emergency vehicle avoidance maneuver command data as an emergency vehicle avoidance maneuver command signal to the set of platooning vehicles that are not the first associated platooning vehicle for directing the set of platooning vehicles away from a path of the associated emergency vehicle on the associated roadway.

In a further example embodiment, the emergency vehicle sensor unit may include forward and backward directed sensors. The forward directed sensor may be operatively coupled with the platoon control unit and configured to be disposed on a front portion of the first associated platooning vehicle. The forward directed sensor is operable to sense from the front of the first associated platooning vehicle emergency light flashes emanating from the associated emergency vehicle, and generate emergency vehicle present ahead data as the emergency vehicle position data based on the emergency light flashes sensed as being from ahead of the first associated platooning vehicle. The rearward directed sensor is operatively coupled with the platoon control unit and configured to be disposed on a rear portion of the first associated platooning vehicle. The rearward directed sensor is operable to sense from the rear of the first associated platooning vehicle the emergency light flashes emanating from the associated emergency vehicle, and generate emergency vehicle present behind data as the emergency vehicle position data based on the emergency light flashes sensed as being from behind the first associated platooning vehicle In a further example embodiment the logic of the platoon control unit is executable by the processor to, based on the first emergency vehicle sensor unit sensing the presence of the associated emergency vehicle near to the first associated platooning vehicle, use the emergency vehicle status data, the roadway configuration data, and the emergency vehicle present ahead or behind data to determine the emergency vehicle avoidance maneuver command data representative of the emergency vehicle avoidance maneuver for directing the set of platooning vehicles away from the path of the associated emergency vehicle on the associated roadway.

In a particular example embodiment, the emergency vehicle sensor unit includes a timer operatively coupled with the platoon control unit, wherein the timer is configured to determine a flash frequency of the sensed emergency light flashes of the associated emergency vehicle, and generate high priority emergency vehicle status data as the emergency vehicle status data based on the determined flash frequency being about 14 Hz or generate low priority emergency vehicle status data as the emergency vehicle status data based on the determined flash frequency being about 10 Hz, the high priority emergency vehicle status data being representative of a status of the associated emergency vehicle being a high priority emergency vehicle and the low priority emergency vehicle status data being representative of a status of the associated emergency vehicle being a low priority special purpose vehicle. In the example embodiment, the logic of the platoon control unit is executable by the processor to, based on the first emergency vehicle sensor unit sensing the presence of the associated emergency vehicle near to the first associated platooning vehicle, use the high or low priority emergency vehicle status data, the roadway configuration data, and the emergency vehicle present ahead or behind data to determine the emergency vehicle avoidance maneuver command data representative of the emergency vehicle avoidance maneuver for directing the set of platooning vehicles away from the path of the associated emergency vehicle on the associated roadway.

Other embodiments, features and advantages of the example embodiments for brake performance monitoring for vehicle platooning operation will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 5a illustrates more detailed portions of the emergency vehicle detection portion of the general control flow of FIG. 4a.

FIGS. 5b and 5c illustrate more detailed portion alternatives of the road configuration detection of the general control flow of FIG. 4a.

FIGS. 13a-13f depict a sequence of operations for dynamically adjusting a large platoon in a high speed lane of a multi-lane roadway having plural lanes in each direction to accommodate plural high priority non-platooning emergency vehicles approaching the large platoon from behind and in the high-speed lane of the multi-lane roadway.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
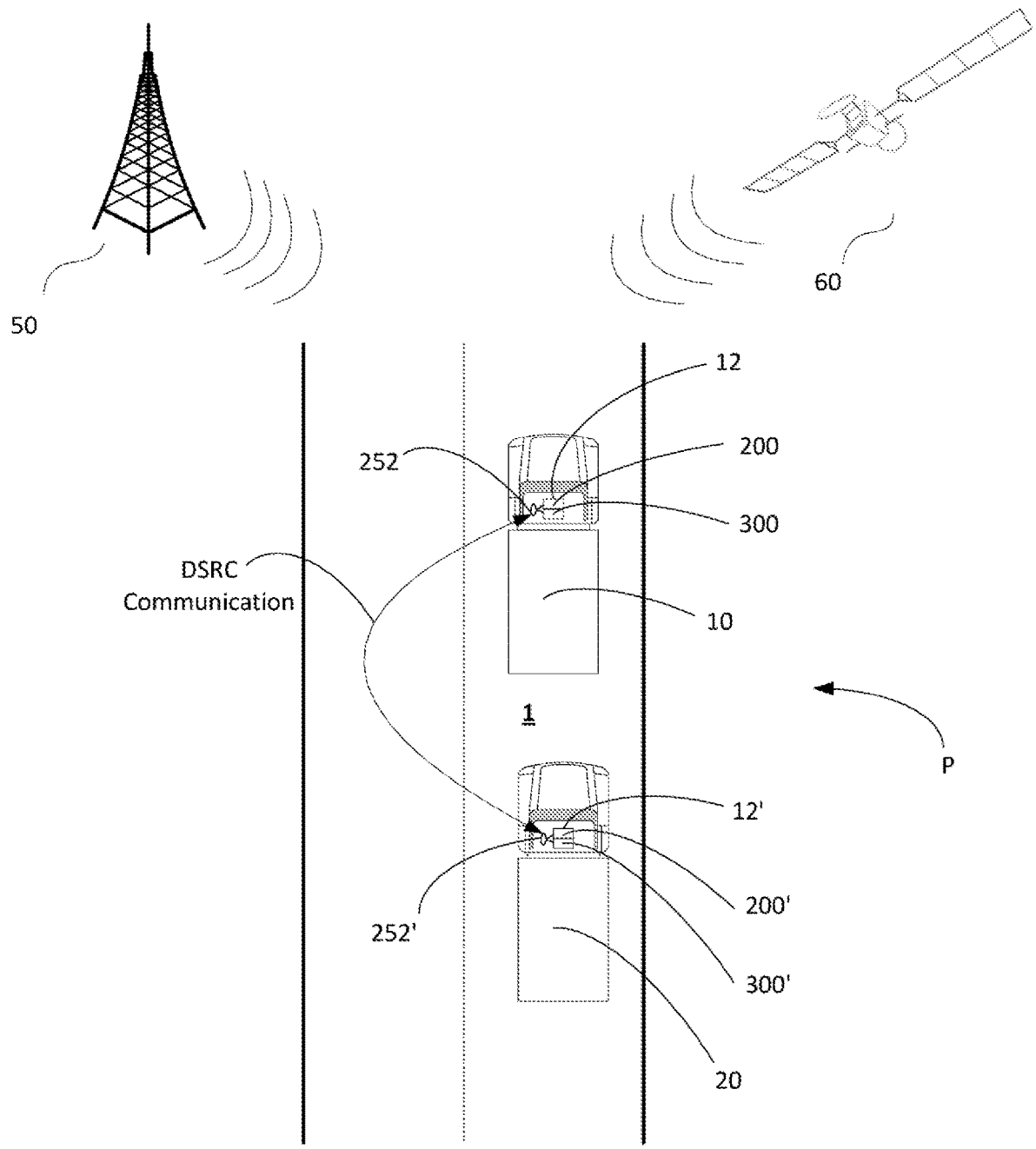
FIG. 1 is a schematic depiction of operation of an example platoon in accordance with the embodiments.

Referring now to the drawings, wherein the showings are only for the purpose of illustrating the example embodiments for dynamically controlling a set of platooning vehicles travelling on a roadway to respond to a presence of a non-platooning emergency vehicle based on situational factors such as roadway configuration and emergency vehicle status, and not for purposes of limiting the same, FIG. 1 illustrates a basic small platoon P comprising a pair of vehicles including a host or leader vehicle 10 participating in coordinated travel with a second or follower vehicle 20 in accordance with the present disclosure. As shown, the follower vehicle 20 is traveling proximate to the leader vehicle 10 in an ordered platoon P along a roadway 1. In the example embodiment shown, the follower vehicle 20 is traveling proximate to the leader vehicle 10 seriatim along the roadway 1 in the example platoon P. However, it is to be appreciated that the platoon P can take on any arrangement of vehicle conformations in accordance with further embodiments including for example that the platoon may be a large platoon comprising more than the pair of vehicles shown in the illustrated example. The leader vehicle 10 is provided with an electronic control system 12 which includes a data collection and communication module portion 200 (FIG. 2) and a platooning control system portion 300 (FIG. 3) in operative communication with the data collection and communication module portion 200 in ways to be described in greater detail below. Similarly, the follower vehicle 20 is also provided with an electronic control system 12' which includes a data collection and communication module portion 200' similar to the data collection and communication module portion 200 of the leader vehicle 10, and a platooning control system portion 300' similar to the platooning control system portion 300 of the leader vehicle 10. In the example embodiments to be described herein, each of the two or more vehicles comprising the various platoons that will be described include the same or equivalent electronic control system 12, the same or equivalent data collection and communication module portion 200, and the same or equivalent platooning control system portion 300. However, it is to be appreciated that other control systems having the functionality to be described herein may equivalently be used as necessary or desired.

In the example embodiment illustrated, the electronic control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to platoon speed and lane control in deference to non-platooning emergency vehicles or the like, and inter-vehicle platoon distance and/or spacing management i.e. platoon ordering and spacing, beneficially without the need to consult with or act under the direction of or in concert with the remote wireless communication system 50, the remote satellite system 60, the remote fleet management facility, a Network Operations Center (NOC), a Central Command Center (CCC), or the like.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple)vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon P can communicate with each other locally for platoon speed and lane placement control, and self-ordering and spacing into a platoon, without the need for input from the NOC in accordance with the embodiments herein. The vehicles forming the basic platoon P can also communicate with one or more other vehicles locally without the need for input from the NOC for negotiating the one or more other vehicles into the platoon in accordance with the embodiments herein. The vehicles forming the basic platoon P can further communicate with a fleet management facility remotely as may be necessary and/or desired for platoon speed and lane placement control, and ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the Platoon Protocol Messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Figure 2:
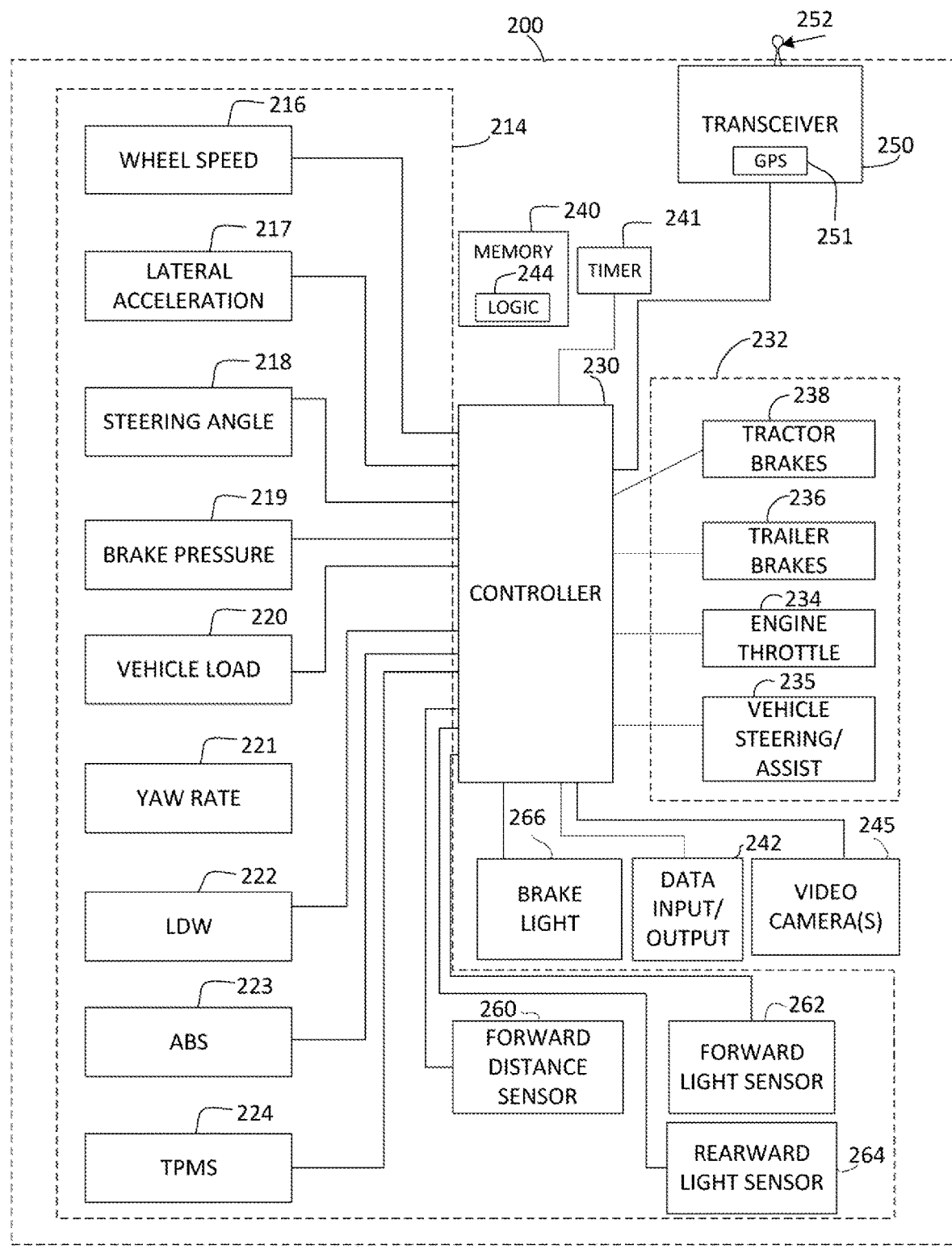
FIG. 2 is a schematic illustration of an example embodiment of a data collection and communication module portion of the subject system for dynamically controlling vehicles travelling as a platoon to respond to a presence of an emergency vehicle according to the example embodiments.

With reference next to FIG. 2, a schematic representation of a data collection and communication module portion 200 of the subject system for new and improved systems and methods for dynamically controlling a set of platooning vehicles travelling on a roadway to respond to a presence of a non-platooning emergency vehicle based on situational factors according to principles of the example embodiment is illustrated. The data collection and communication module 200 may be adapted to detect, monitor, and report a variety of operational parameters and conditions of the roadway including for example a presence of a non-platooning emergency vehicle, a direction of approach of the emergency vehicle, a level of priority of the emergency vehicle, and the configuration of the roadway such as being single or multiple lanes and having a median or not, or the like, and to selectively intervene with control of the platoon as may be needed or desired to ensure that the emergency vehicle is able to safely and efficiently pass the platoon without impediment which might otherwise slow the respond time of the emergency vehicle.

In the exemplary embodiment of FIG. 2, the data collection and communication module 200 may include one or more devices or systems 214 for providing input data indicative of one or more operating parameters or one or more conditions of a commercial vehicle such as for example of the platooning vehicles 10, 20. For example, the devices 214 may be one or more sensors, such as but not limited to, one or more wheel speed sensors 216, a lateral acceleration sensor 217, a steering angle sensor 218, a brake pressure sensor 219, a vehicle load sensor 220, a yaw rate sensor 221, a lane departure warning (LDW) sensor or system 222, an anti-lock braking system (ABS) 223, and a tire pressure (TPMS) monitoring system 224. The data collection and communication module 200 may also utilize additional devices or sensors in the exemplary embodiment including for example a forward distance sensor 260, a forward light sensor 262, and a rearward light sensor 264. Other sensors and/or actuators or energy generation devices or combinations thereof may be used of otherwise provided as well, and one or more devices and/or sensors may be combined into a single unit as may be necessary and/or desired. In addition, the forward distance sensor 260 may comprise a LASER forward distance sensor system or the like.

The data collection and communication module 200 may also include a logic applying arrangement 230, such as a controller or processor, in communication with the one or more devices or systems 214. The controller 230 may include one or more inputs for receiving input data from the devices or systems 214. The controller 230 may be adapted to process the input data and compare the raw or processed input data to a stored threshold value and/or to one or more others signal and/or data. The controller 230 may also include one or more outputs for delivering a control signal to one or more vehicle systems 232 based on the comparison. The control signal may instruct the systems 232 to intervene in the operation of the vehicle such as to initiate control and/or corrective action, and then report this corrective action to a wireless service (not shown), or to instruct the systems 232 to provide assistance to the driver in the operation of the vehicle such as to instruct such as through the input/output device 242 which may be an operator's screen for example, or help to initiate control and/or corrective action, and then report this corrective action to a wireless service such as the remote fleet management facility, the NOC, the CCC or the like, or simply store the data locally to be used for determining a driver quality. For example, the controller 230 may generate and send the control signal to an engine electronic control unit or an actuating device to reduce the engine throttle 234 for slowing the vehicle down, and/or to a vehicle steering or steering assist actuating device 235 for actively steering or assisting the operator in steering the vehicle in accordance with the type of roadway and the situation of the vehicle relative to the emergency vehicle. Further, the controller 230 may send the control signal to a vehicle brake system 236, 238 to selectively engage, disengage, or otherwise operate the brakes. The controller 230 may send the control signal to selectively activate a primary brake light 266 even though the vehicle driver ins't actively operating a physical brake pedal. The controller 230 may send control signals to an operator interface for instructing the vehicle operator on various operations to be performed for providing for right-of-way deference to non-platooning emergency and/or safety vehicles.

The controller 230 may also include a memory portion 240 for storing and accessing system information, such as for example various parameter data, system operational and context data, and system control and/or control tuning logic 244, or the like. The memory portion 240, however, may be separate from the controller 230. The sensors 214 and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for the controller 230 of the present invention. Therefore, many of the components to support the data collection and communication module 200 of the present invention may be present in a vehicle equipped with the Bendix® ESP® system, thus, not requiring, the installation of additional components. The data collection and communication module 200, however, may utilize independently installed components if desired.

The controller 230 may also include a timer portion 241 operable to time stamp one or more events and/or determine one or more timer intervals between selected one or more events. In the example embodiment, the timer is operable to determine a time interval a time interval (INT) between a first time (T1) and a second time (T2), and generate time interval data (INT_data) representative of the determined time interval (INT). In the example embodiment, the timer 241 operatively coupled with the controller 230 of the platoon control unit 200 and is configured to be used to determine a flash frequency of sensed emergency light flashes of the associated emergency vehicle. The timer 241 together with the controller 230 of the platoon control unit 200 may generate emergency vehicle status data based on the determined flash frequency of the sensed emergency light flashes of the associated emergency vehicle, wherein the flash frequency may be representative of a priority of the emergency vehicle such as for example a flash frequency of about 10 Hz being representative of a low priority non-platooning special purpose vehicle such as a snow plow, a tow truck, or the like, and a flash frequency of about 14 Hz being representative of a high priority non-platooning special purpose vehicle such as an ambulance, a police car, a firetruck, or the like.

The data collection and communication module 200 may also include a data input/output device 242 for receiving data indicative of a configuration/condition of a commercial vehicle, data indicative of environmental conditions around the vehicle, or the like. The controller 230 may sense or estimate the configuration/condition and/or the environmental conditions around the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 200 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 of the example embodiment is operatively coupled with one or more image capture devices shown in the drawing figure for simplicity as a single video camera 245 representation of one or more physical video cameras disposed on the vehicle such as, for example, a forward-directed camera, one video camera on each corner of the vehicle or a combination of a video camera on each corner of the vehicle and at least one forward-directed camera. The one or more image capture devices shown in the example embodiment may also be integrated with the forward distance sensor 260 described above into a combination intelligent system such as for example the Wingman® Fusion™ driver assistance system available from Bendix®. In the example embodiments, the camera 245 and/or the forward distance sensor 260, together with the controller 230, memory 240, and logic 244 executable by the controller operate as a roadway configuration sensor system for sensing a configuration of the roadway 1. The camera 245 and/or the forward distance sensor 260 are operatively coupled with the controller 230 and are configured to be disposed on the platooning vehicles together with the controller. The roadway configuration sensor system is operable to generate roadway configuration data representative of the sensed configuration of the roadway. The memory device 240 stores logic 244 executable by the processor 230 to use emergency vehicle presence data obtained via the camera 245 to determine a position of the emergency vehicle relative to the platooning vehicle as being approaching from ahead of the platooning vehicle or approaching from behind the first associated platooning vehicle. The logic 244 is further executable by the processor 230 to selectively, based on the determined position of the emergency vehicle to be approaching from ahead, use the emergency vehicle status data to generate an emergency vehicle avoidance platoon control command signal for use by the set of platooning vehicles 10, 20 in FIG. 1 to maneuver the platoon away from a path of the associated emergency vehicle as will be described in greater detail below. Further in accordance with the example embodiment, the logic 244 is further executable by the processor 230 to selectively, based on the determined position of the emergency vehicle to be approaching from behind, use the roadway configuration data to generate the emergency vehicle avoidance platoon control command signal for use by the set of platooning vehicles to maneuver the platoon away from a path of the associated emergency vehicle as will be described in greater detail below.

Still yet further, the data collection and communication module 200 may also include a transmitter/receiver (transceiver) module 250 such as, for example, a radio frequency (RF) transmitter including one or more antennas 252 for wireless communication of GPS data, one or more various vehicle configuration and/or condition data, or the like between the vehicles and one or more destinations such as, for example, to one or more wireless services 50, 60 (FIG. 1) having a corresponding receiver and antenna. The transmitter/receiver (transceiver) module 250 may include various functional parts of sub portions operatively coupled with the platoon control unit including for example a communication receiver and transmitter portions, and a global position sensor (GPS) receiver portion 251. For communication of specific information and/or data, the communication receiver and transmitter portions may include one or more functional and/or operational communication interface portions as well.

The controller 230 is operative to communicate the acquired data to the one or more receivers of the transmitter/receiver (transceiver) module 250 in a raw data form, that is without processing the data, in a processed form such as in a compressed form, in an encrypted form or both as may be necessary or desired. In this regard, the controller 230 may combine vehicle parameter data values into processed data representative of higher level vehicle condition data such as, for example, data from the lateral acceleration sensor 217 may be combined with the data from the steering angle sensor 218 to determine curve speed event data. Other hybrid event data relatable to the vehicle and driver of the vehicle and obtainable from combining one or more selected raw data items form the sensors includes, for example and without limitation, braking event data, curve speed event data, lane departure warning event data, lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, average ACC usage event data, and the like.

Figure 3:
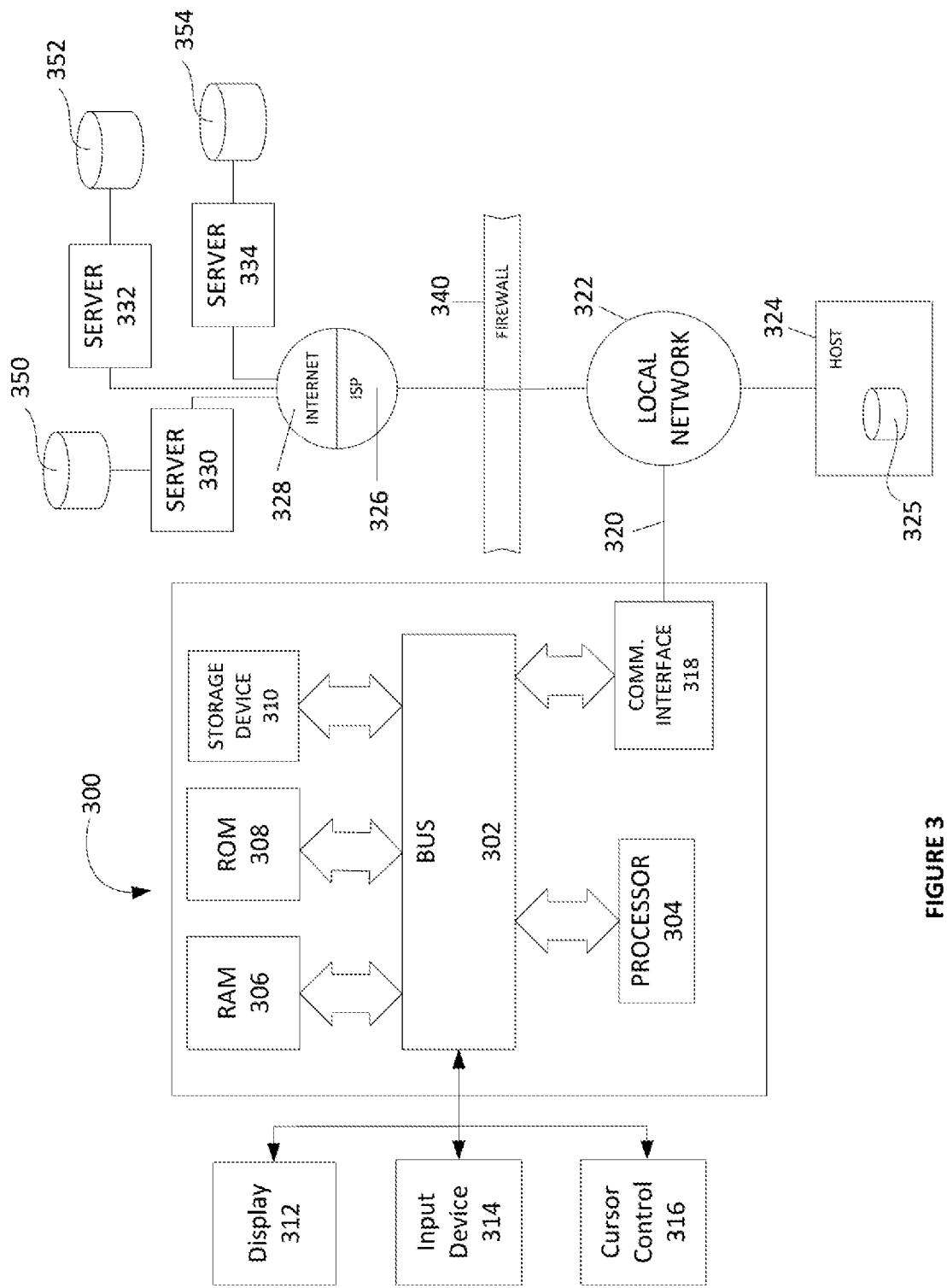
FIG. 3 is a block diagram that illustrates a platoon control system suitable for executing embodiments of one or more software systems or modules that perform road configuration and non-platoon special purpose vehicle detection for dynamic platoon management and control to accommodate non-platooning emergency and other vehicles according to the example embodiments.

FIG. 3 is a block diagram that illustrates a platoon control computer system 300 suitable for executing embodiments of one or more software systems or modules that perform emergency vehicle detection and right-of-way deference control according to the subject application. The controller 230 of FIG. 2 may in an example embodiment be provided as the computer system 300 illustrated, for example. The example system 300 of the embodiment includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the computer system 300 for accessing, aggregating, manipulating and displaying information from multiple remote resources such as, for example, indirectly from multiple fleet vehicles 10, 20 and directly from multiple wireless services 50, 60. Further, the embodiments described herein are related to the use of computer system 300 for accessing information from the multiple sources in selective combination with internal proprietary data such as driver sensitive data, sales, costs, expense records, travel data, and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps for emergency vehicle detection and right-of-way deference control described herein. In an alternative implementation, hard-wired circuitry may be used in place of or in combination with software instructions to implement the invention. Thus, implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The platoon control system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from the platoon control computer system 300, are exemplary forms of carrier waves transporting the information.

The platoon control computer system 300 can send messages and receive data, including program code, through the network(s), network link 320 and communication interface 318. In the Internet-connected example embodiment, the emergency vehicle detection and platoon right-of-way deference control system 300 is operatively connected with a plurality of external public, private, governmental or commercial servers (not shown) as one or more wireless services 50, 60 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The platoon control computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although the platoon control computer system 300 is shown in FIG. 3 as being connectable to a set of three (3) servers, 330, 332, and 334, those skilled in the art will recognize that the platoon control computer system 300 may establish connections to multiple additional servers on Internet 328. Each such server in the example embodiments includes HTTP-based Internet applications, which may provide information to the platoon control computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The platoon control computer system 300 suitably includes several subsystems or modules to perform the vehicle platoon control and management as set forth herein. One purpose of the platoon control computer system 300 is to collect and provide information to vehicle control systems, vehicle operators, and/or fleet supervisors related to performance of the vehicle over time for use in system maintenance and platoon control and management for arranging two or more vehicles cooperatively travelling cooperatively as a platoon along an associated roadway into a platoon arrangement, and to automatically control the gap distances therebetween, in accordance with their relative braking capabilities and other brake-related performance characteristics.

Other purposes of the platoon control computer system 300 in accordance with the example embodiments herein, however, include detecting the presence of a non-platooning emergency vehicle travelling relative to the platoon, detecting a direction of the non-platooning vehicle relative to the platoon such as for example heading towards the platoon from ahead or towards the platoon from behind, detecting a status of the emergency vehicle such as being an urgent priority emergency or a low priority emergency, detecting conditions of the roadway such as for example whether the roadway is a two lane divided highway or the like, and generating one or more signals for dynamically controlling the set of platooning vehicles travelling on the roadway to respond to the detected presence of the non-platooning emergency vehicle based on situational factors such as the detected roadway configuration and the detected emergency vehicle status. The platoon control computer system 300 further then generates one or more signals for controlling the operation of the platoon to selectively move or otherwise change lanes to thereby to enable the emergency vehicle to safely and efficiently pass or navigate around the laterally-moved platoon with minimum impediment to the emergency vehicle which would otherwise slow the respond time of the emergency vehicle.

FIGS. 4a-4d and 5a-5c present an illustration of a general control flow 400 performed by the controller 230 executing the logic 244 stored in the memory 240 for dynamically controlling vehicles travelling as a platoon to respond to a presence of an emergency vehicle in accordance with the example embodiments.

As described above and in general, an example embodiment herein provides a system for dynamically controlling a set of platooning vehicles travelling on an associated roadway to respond to a presence of a non-platooning emergency vehicle approaching the set of platooning vehicles on the associated roadway. The system of an example embodiment includes a platoon control unit configured to be disposed in a first associated platooning vehicle of the set of platooning vehicles, an emergency vehicle sensor unit operatively coupled with the platoon control unit and disposed in the first associated platooning vehicle, a roadway configuration sensor unit operatively coupled with the platoon control unit and disposed in the associated platooning vehicle, and a first transceiver operatively coupled with the platoon control unit and disposed in the first associated platooning vehicle.

The first platoon control unit includes a processor, a non-transient memory device operatively coupled with the processor, and logic stored in the non-transient memory and executable by the processor to control a platooning operation of the first associated platooning vehicle. The first emergency vehicle sensor unit is operable to sense a presence of an associated emergency vehicle near to the first associated platooning vehicle and, based on sensing the presence of the associated emergency vehicle near to the first associated platooning vehicle: determine a position of the emergency vehicle relative to the first associated platooning vehicle, generate emergency vehicle position data representative of the determined position of the associated emergency vehicle relative to the first associated platooning vehicle, determine a status of the associated emergency vehicle, and generate emergency vehicle status data representative of the determined status of the associated emergency vehicle. The roadway configuration sensor unit is operable to: sense the associated roadway, determine a configuration of the associated roadway, and generate roadway configuration data representative of the determined configuration of the associated roadway. The first transceiver is operable to receive signals from the set of platooning vehicles that are not the first associated platooning vehicle, and to transmit signals to the set of platooning vehicles that are not the first associated platooning vehicle. The logic of the platoon control unit is executable by the processor to, based on the first emergency vehicle sensor unit sensing the presence of the associated emergency vehicle near to the first associated platooning vehicle use the emergency vehicle position data, the emergency vehicle status data, and the roadway configuration data to determine emergency vehicle avoidance maneuver command data representative of an emergency vehicle avoidance maneuver for directing the set of platooning vehicles away from a path of the associated emergency vehicle on the associated roadway. In an example embodiment, the first transceiver operates to transmit the emergency vehicle avoidance maneuver command data as an emergency vehicle avoidance maneuver command signal to the set of platooning vehicles that are not the first associated platooning vehicle for directing the set of platooning vehicles away from a path of the associated emergency vehicle on the associated roadway.

In a further example embodiment, the emergency vehicle sensor unit may include forward and backward directed sensors. The forward directed sensor may be operatively coupled with the platoon control unit and configured to be disposed on a front portion of the first associated platooning vehicle. The forward directed sensor is operable to sense from the front of the first associated platooning vehicle emergency light flashes emanating from the associated emergency vehicle, and generate emergency vehicle present ahead data as the emergency vehicle position data based on the emergency light flashes sensed as being from ahead of the first associated platooning vehicle. The rearward directed sensor is operatively coupled with the platoon control unit and configured to be disposed on a rear portion of the first associated platooning vehicle. The rearward directed sensor is operable to sense from the rear of the first associated platooning vehicle the emergency light flashes emanating from the associated emergency vehicle, and generate emergency vehicle present behind data as the emergency vehicle position data based on the emergency light flashes sensed as being from behind the first associated platooning vehicle In a further example embodiment the logic of the platoon control unit is executable by the processor to, based on the first emergency vehicle sensor unit sensing the presence of the associated emergency vehicle near to the first associated platooning vehicle, use the emergency vehicle status data, the roadway configuration data, and the emergency vehicle present ahead or behind data to determine the emergency vehicle avoidance maneuver command data representative of the emergency vehicle avoidance maneuver for directing the set of platooning vehicles away from the path of the associated emergency vehicle on the associated roadway.

In a particular example embodiment, the emergency vehicle sensor unit includes a timer operatively coupled with the platoon control unit, wherein the timer is configured to determine a flash frequency of the sensed emergency light flashes of the associated emergency vehicle, and generate high priority emergency vehicle status data as the emergency vehicle status data based on the determined flash frequency being about 14 Hz or generate low priority emergency vehicle status data as the emergency vehicle status data based on the determined flash frequency being about 10 Hz, the high priority emergency vehicle status data being representative of a status of the associated emergency vehicle being a high priority emergency vehicle and the low priority emergency vehicle status data being representative of a status of the associated emergency vehicle being a low priority special purpose vehicle. In the example embodiment, the logic of the platoon control unit is executable by the processor to, based on the first emergency vehicle sensor unit sensing the presence of the associated emergency vehicle near to the first associated platooning vehicle, use the high or low priority emergency vehicle status data, the roadway configuration data, and the emergency vehicle present ahead or behind data to determine the emergency vehicle avoidance maneuver command data representative of the emergency vehicle avoidance maneuver for directing the set of platooning vehicles away from the path of the associated emergency vehicle on the associated roadway.

Figure 4A:
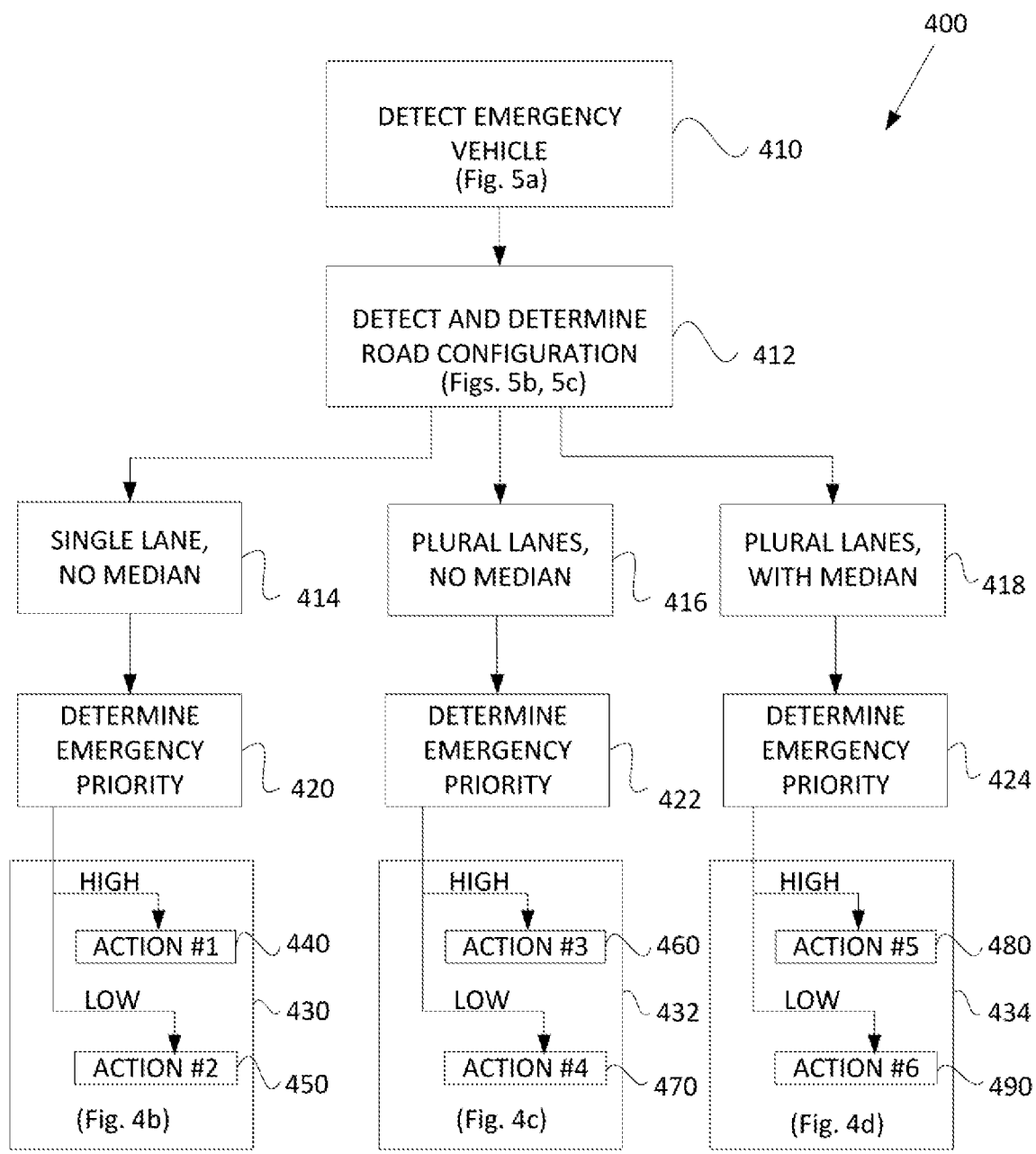
FIGS. 4a-4d illustrate a general control flow for dynamically controlling vehicles travelling as a platoon to respond to a presence of an emergency vehicle based on a priority of the emergency vehicle, a roadway configuration, a size of the platoon, and other factors in accordance with the example embodiments.

With the above in mind and with reference now to FIG. 4a, a non-platooning special purpose vehicle such as for example an emergency vehicle is detected in control block 410. In the example embodiment, the emergency vehicle sensor unit of the platoon management control systems disposed in each of the vehicles forming the platoon includes a forward-directed vehicle sensor such as for example the forward light sensor 262 that operates to detect a presence of an emergency vehicle heading towards the platoon from ahead of the platooning vehicle. In addition, the emergency vehicle sensor unit of the platoon management control systems disposed in each of the vehicles forming the platoon includes a rearward-directed sensor such as for example the rearward directed light sensor 264 that operates to detect a presence of an emergency vehicle heading towards the platoon from behind the platooning vehicle. It is to be appreciated, however, that in a further example embodiment a forwardly directed video camera 245 and/or the forward distance sensor 260 when formed as the RADAR may be used to determine the presence of a non-platooning vehicle moving towards the platoon from ahead, and a rearwardly directed video camera 245 and/or a rearward distance sensor (not shown) may be used to determine the presence of a non-platooning vehicle moving towards the platoon from behind.

Figure 5A:
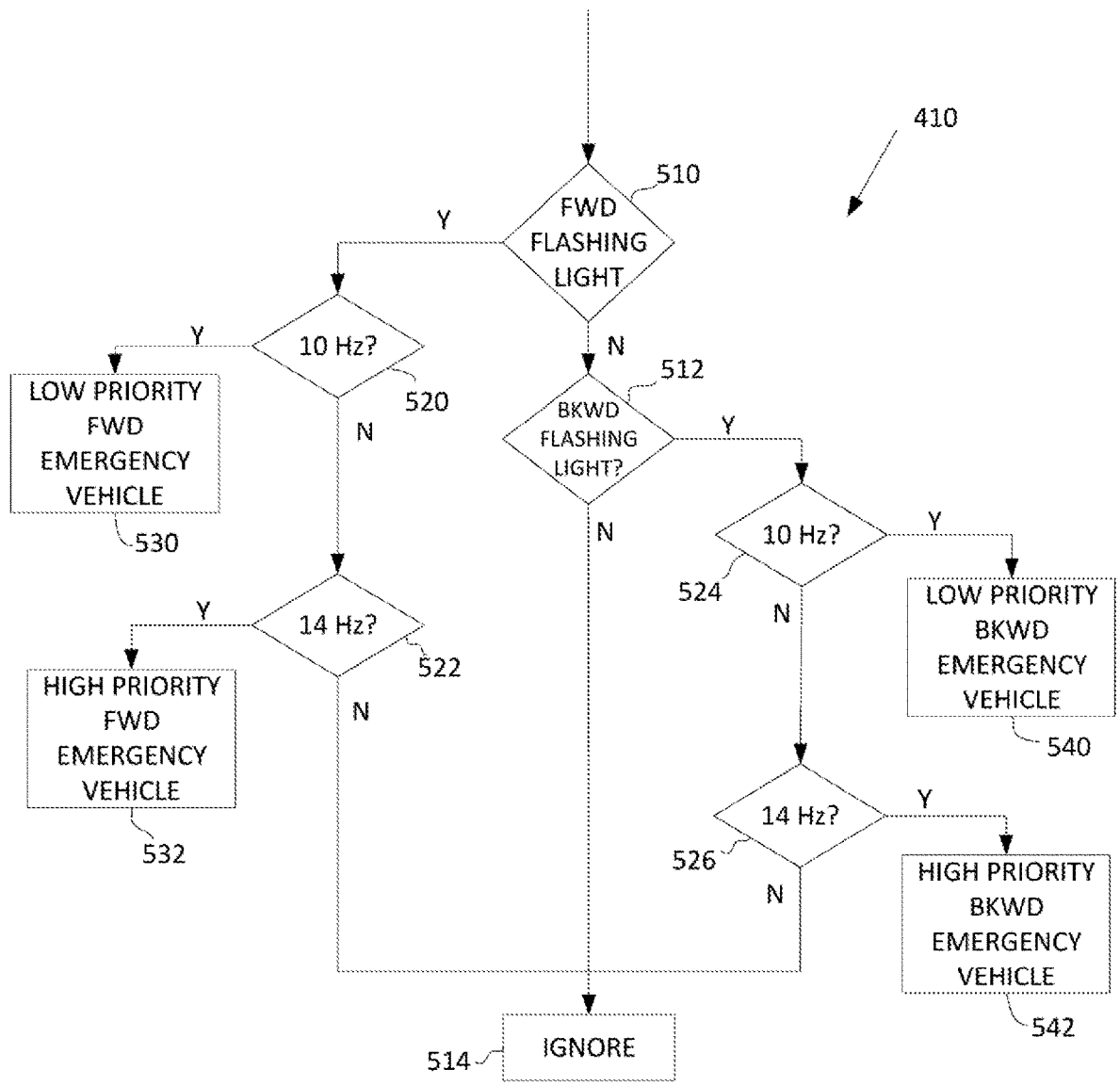

FIG. 5a shows a flow diagram of the controller 230 executing the logic 244 stored in the memory 240 for detecting an emergency vehicle in accordance with an example embodiment. If the forward light sensor 262 or a forward-directed camera 245 detects a flashing light in control block 510, it is determined in block 520 whether the flash frequency is about 10 Hz. If the flash frequency is determined in block 520 to be about 10 Hz, then the control system may confirm detection of an emergency vehicle ahead of the platoon and having a low priority. However, if the flash frequency is determined in block 520 to not be about 10 Hz, then the control system determines in block 522 whether the flash frequency is about 14 Hz. If the flash frequency is determined in block 522 to be about 14 Hz, then the control system may confirm detection of an emergency vehicle ahead of the platoon and having a high priority. If the flash frequency is determined in block 522 to not be about 14 Hz, then the control system may take no action and simply ignore the sensed flashing light in block 514 as not being related to an emergency vehicle in accordance with an example embodiment.

In the example embodiments herein, if the forward light sensor 262 or the forward-directed camera 245 does not detect a flashing light of the emergency vehicle, it is determined in block 512 by the controller 230 executing the logic 244 whether the rearward light sensor 264 or a rearward-directed camera 245 detects a flashing light. If the rearward light sensor 264 or the rearward-directed camera 245 detects a flashing light, it is determined in block 524 whether the flash frequency is about 10 Hz. If the flash frequency is determined in step 524 to be about 10 Hz, then the control system may confirm in step 540 detection of an emergency vehicle behind the platoon and having a low priority. However, if the flash frequency is determined in step 524 to not be about 10 Hz, then the controller 230 executing the logic 244 stored in the memory 240 determines in step 526 whether the flash frequency is about 14 Hz. If the flash frequency is determined in step 526 to be about 14 Hz, then the control system may confirm in step 542 detection of an emergency vehicle behind the platoon and having a high priority. If the flash frequency is determined in block 526 to not be about 14 Hz, then the control system may take no action and simply ignore the sensed flashing light in block 514 as not being related to an emergency vehicle in accordance with an example embodiment.

In accordance with the example embodiment, the forward and rearward light sensors 262, 264 and the forward and/or rearward-directed cameras 245 may be are used together with the timer 241 and logic 244 executed by the controller 230 to determine the rate of the flashing emergency vehicle lights. The forward directed light sensor 262 or/or cameras 245 are operable to sense from the front of the first associated platooning vehicle of the set of platooning vehicles emergency light flashes emanating from the associated emergency vehicle, and generate emergency vehicle present ahead data based on the emergency light flashes sensed as being from ahead of the first associated platooning vehicle. Similarly, a rearward directed light sensor 264 and/or cameras 245 operatively coupled with the platoon control unit 200 is configured to be disposed on a rear portion of the last platooning vehicle. The rearward directed camera 264 is operable to sense from the rear of the platooning vehicle the emergency light flashes emanating from the associated emergency vehicle, and generate emergency vehicle present behind data based on the emergency light flashes sensed as being from behind the first associated platooning vehicle.

The timer 241 operatively coupled with the controller 230 of the platoon control unit 200 is used by the controller 230 executing the logic 244 stored in the memory 240 for determining a flash frequency of the sensed emergency light flashes of the associated emergency vehicle, and for generating the emergency vehicle status data based on the determined flash frequency. The timer 241 acting together with the logic 244 executed by the controller 230 is configured to determine the flash frequency of the sensed emergency light flashes of the associated emergency vehicle and generate high priority emergency vehicle status data based on the determined flash frequency being about 14 Hz or generate low priority emergency vehicle status data based on the determined flash frequency being about 10 Hz.

Figure 5B:
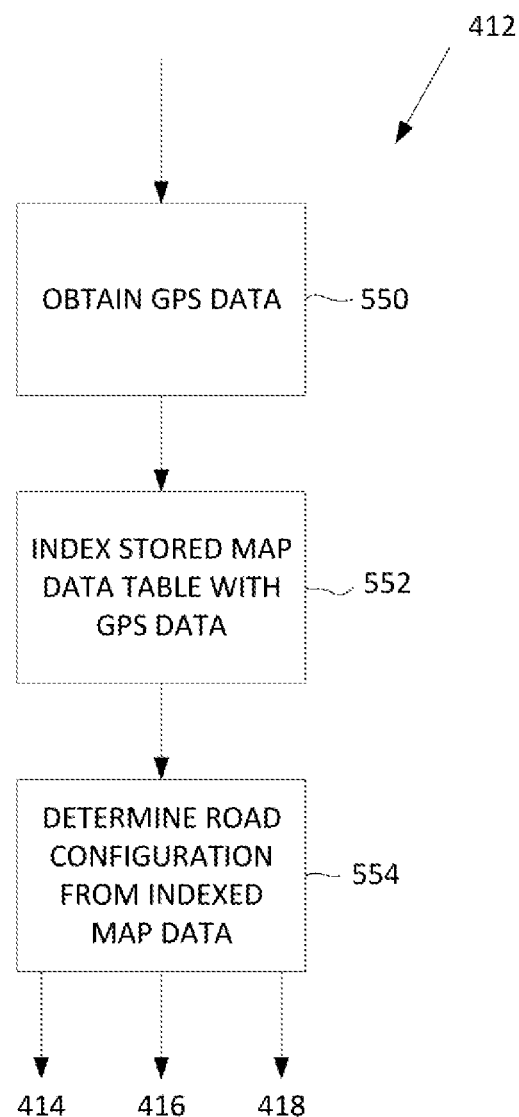
Figure 5C:
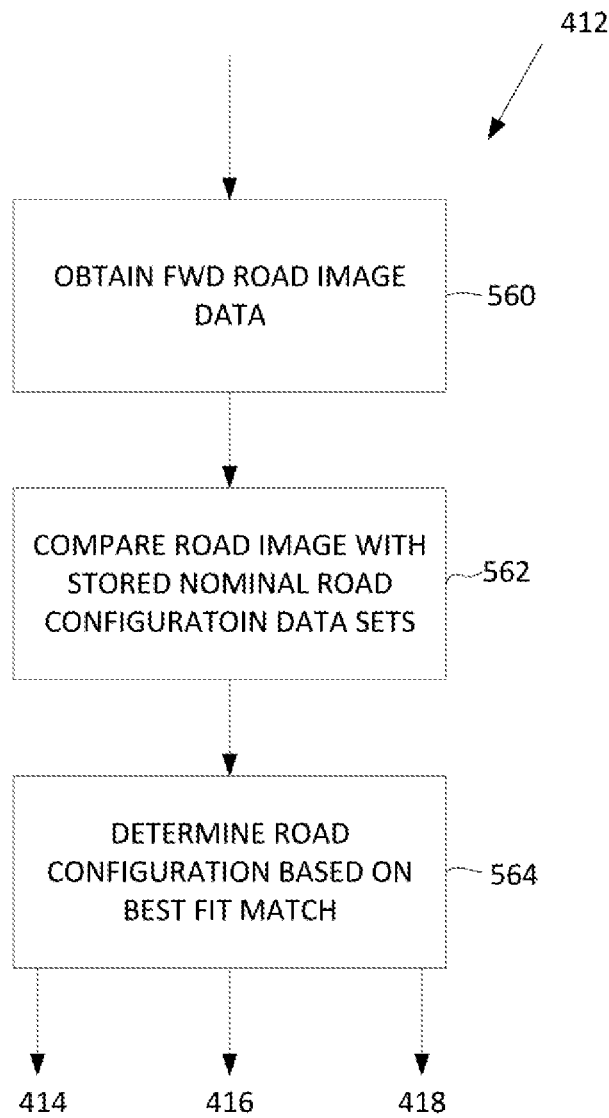

With reference back again to FIG. 4a and also with reference to FIGS. 5b and 5c, in accordance with the position of the emergency vehicle being detected in control block 410, the configuration of the roadway is detected and determined in control block 412. In an example embodiment, the camera 245 is used in step 412 by the controller 230 executing the logic 244 stored in the memory 240 to obtain images of the roadway, and image data corresponding to the obtained images is processed by the controller 230 to determine the roadway configuration. In the example embodiment, the one or more cameras 245 together with the controller 230 executing the logic 244 stored in the memory device 240 functionally operate as a roadway configuration sensor unit to sense a configuration of the roadway and to generate roadway configuration data representative of the sensed configuration of the roadway. The roadway configuration may be sensed, for example, by comparing the imaged roadway with one or more images of roadways stored in the memory 240, wherein the one or more images of roadways stored in the memory 240 are representative of the various roadways expected to be encountered during use of the vehicle. In accordance with an aspect of an example embodiment, the roadway configuration sensor unit operates to sense a configuration of the roadway and to generate roadway configuration data representative of the sensed configuration of the roadway. In one example embodiment such as shown in FIG. 5b for example, the roadway configuration sensor unit may include a GPS sensor and a database of roadway configurations wherein a current location determined by obtaining in step 550 GPS data and using the GPS data in step 552 by the controller 230 executing the logic 244 stored in the memory 240 to index into the roadway configuration database to determine in step 554 the configuration of the current roadway. In another form such as shown in FIG. 5c for example, the roadway configuration sensor unit may include one or more cameras and/or one or more LASER sensors for obtaining an image of the current roadway in step 560 wherein current roadway image data may be used by the controller 230 executing the logic 244 stored in the memory 240 to index a database for comparison in step 562 against a plurality of stored pairings of roadway image data sets and their respective configuration types for determining in step 564 a configuration of the current roadway using the stored roadway images.

In the example, embodiment, the controller 230, the memory portion 240, the logic 244, the video cameras 245, and the GPS system 251 collectively effectively form a composite roadway configuration sensor system. The composite roadway configuration sensor system 230, 240, 244, 245, 251 may operate to detect and determine the roadway configuration and select in step 414 a multi-lane roadway having a single lane in each direction and without a median dividing the single lanes in each direction. In accordance with a further aspect, the composite roadway configuration sensor system 230, 240, 244, 245, 251 may operate to detect and determine the roadway configuration and select in step 416 a multi-lane roadway having multiple (two or more) lanes in each direction, and without a median dividing the multiple (two or more) lanes in each direction. In accordance with yet a further aspect, the composite roadway configuration sensor system 230, 240, 244, 245, 251 may operate to detect and determine the roadway configuration and select in step 418 a multi-lane roadway having multiple (two or more) lanes in each direction, and having a median dividing the multiple (two or more) lanes in each direction.

If the roadway configuration sensor system 230, 240, 244, 245, 251 determines in control block 414 that the roadway configuration comprises a multi-lane roadway having a single lane in each direction and without a median dividing the single lanes in each direction, the priority of the emergency vehicle determined in control block 410 is examined in step 420 prior to generating platooning control signals in block 430 to determine whether the emergency vehicle priority is HIGH, whereupon the controller 230 executes the logic 244 stored in the memory 240 to perform Action #1 440. However, when the priority of the emergency vehicle is determined to be LOW, the controller 230 executes the logic 244 stored in the memory 240 to perform Action #2 450.

Platooning control signals are generated by the controller 230 executing the logic 244 stored in the memory 240 in block 430 based on the platoon travelling on a multi-lane roadway having a single lane in each direction and without a median dividing the single lanes in each direction in accordance with whether the emergency vehicle is approaching the platoon from ahead or behind of the platoon and in accordance with a priority of the emergency vehicle. In this regard and with reference first to FIG. 4b, in the event of the platoon moving on a single lane highway with no median and regardless of the relative moving direction of the emergency vehicle towards or away from the platoon, it is desirable to move the platoon over to the most right of the roadway that is safe for the platoon, such as for example to the shoulder of the roadway if one exists or as far to the right in the lane as possible, and to come to a stop for high priority emergency vehicles. The control system in accordance with the example embodiment generates a signal in block 442 and transmits the signal by V2V communications to the other vehicles in the platoon via the transceiver 250 for controlling the platoon to move over to the most right of the roadway that is safe such as for example to the shoulder if one exists or as far to the right in the lane as possible, and to come to a stop in order to make room for the high priority emergency vehicle. The controls 10, 20 in the other vehicles of the platoon that receive the signal respond to the signal by generating signals for instructing the operator of the vehicle or for controlling the vehicle to move over to the most right of the roadway that is safe such as for example to the shoulder if one exists or as far to the right in the lane as possible, and to come to a stop in order to make room for the high priority emergency vehicle. The platooning vehicle that detects the emergency vehicle, generates the signal, and transmits the generated signal to the other vehicles of the platoon also generates internal signals for instructing the operator of the vehicle or for controlling the vehicle to move over to the most right of the roadway that is safe such as for example to the shoulder if one exists or as far to the right in the lane as possible, and to come to a stop in order to make room for the high priority emergency vehicle.

Figure 4B:
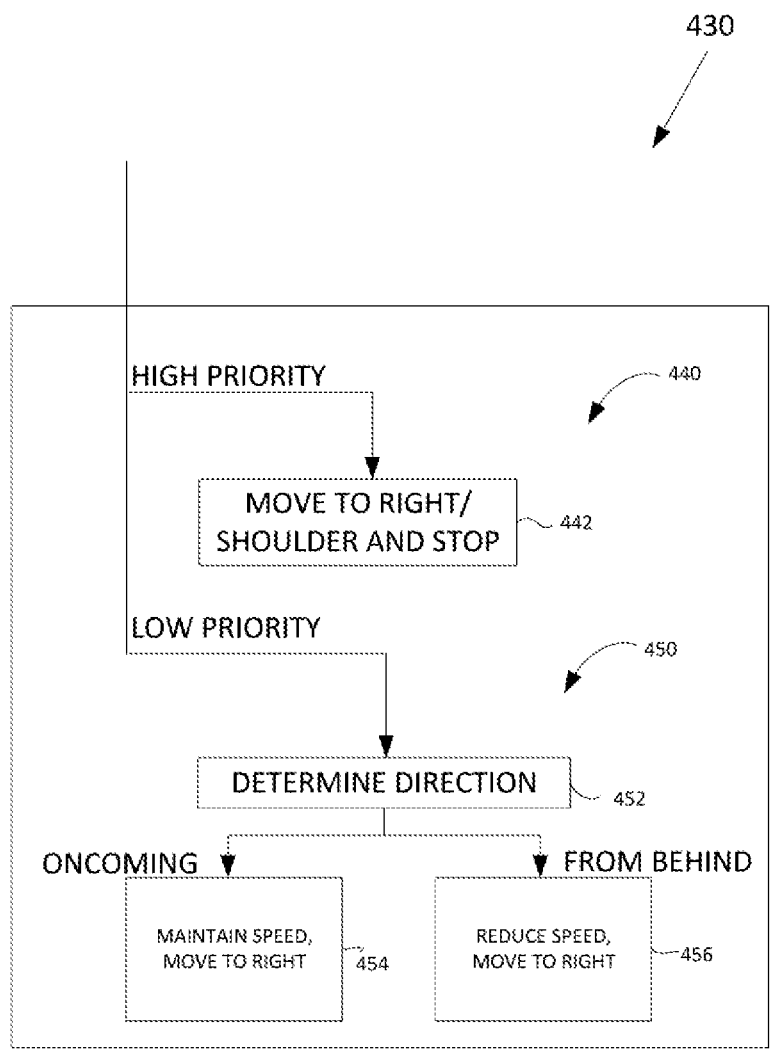

With continued reference to FIG. 4b, in the event of the platoon moving on a single lane highway with no median, the relative direction of the LOW priority emergency vehicle is determined in step 452. When the emergency vehicle is determined to be oncoming from the front of the platoon, the control system in accordance with the example embodiment generates a signal at step 454 for the platooning vehicles to maintain their speed and to move to the right in the single lane or to the rightmost portion of the lane. The control system further transmits the signal by V2V communications to the other vehicles in the platoon for controlling the platoon to move in that manner by maintaining their speed and moving to the right in the single lane or to the rightmost portion of the lane. When the emergency vehicle is determined to be oncoming from the rear of the platoon, however, the control system in accordance with the example embodiment generates a signal at step 456 for the platooning vehicles to reduce their speed and to move to the right in the single lane or to the rightmost portion of the lane, and transmits the signal by V2V communications to the other vehicles in the platoon for controlling the platoon to move in that manner by reducing their speed and moving to the right in the single lane or to the rightmost portion of the lane.

If the roadway configuration sensor system 230, 240, 244, 245, 251 determines in control block 416 (FIG. 4a) that the roadway configuration comprises a multi-lane roadway having multiple (two or more) lanes in each direction, and without a median dividing the multiple (two or more) lanes in each direction, the emergency vehicle priority determined in control block 410 is examined in step 422 prior to generating platooning control signals in block 432 to determine whether the emergency vehicle priority is HIGH whereupon the control flows to perform Action #3 460, or whether the emergency vehicle priority is LOW whereupon the control flows to perform Action #4 470.

Platooning control signals are generated in block 432 on multi-lane roadways having multiple (two or more) lanes in each direction, and without a median dividing the multiple (two or more) lanes in each direction in accordance with whether the emergency vehicle is approaching the platoon from ahead or behind of the platoon and in accordance with a priority of the emergency vehicle. In this regard and with reference to FIG. 4c, in the event of the platoon moving on a multi-lane roadways having multiple (two or more) lanes in each direction, and without a median dividing the multiple (two or more) lanes in each direction the relative direction of the HIGH priority emergency vehicle is determined in step 462. When the emergency vehicle is determined to be oncoming from the front of the platoon, the control system in accordance with the example embodiment generates a signal at step 464 for the platooning vehicles to clear the leftmost lane and to reduce their speed, and transmits the signal by V2V communications to the other vehicles in the platoon for controlling the platoon to move in that manner. When the HIGH priority emergency vehicle is determined to be oncoming from the rear of the platoon, the control system in accordance with the example embodiment generates a signal at step 466 for the platooning vehicles to move out of the lane occupied by the emergency vehicle, to increase inter-vehicle distances, and to abort the platoon if there are two (2) or more emergency vehicles detected, and transmits the signal by V2V communications to the other vehicles in the platoon for controlling the platoon to move in that manner.

Figure 4C:
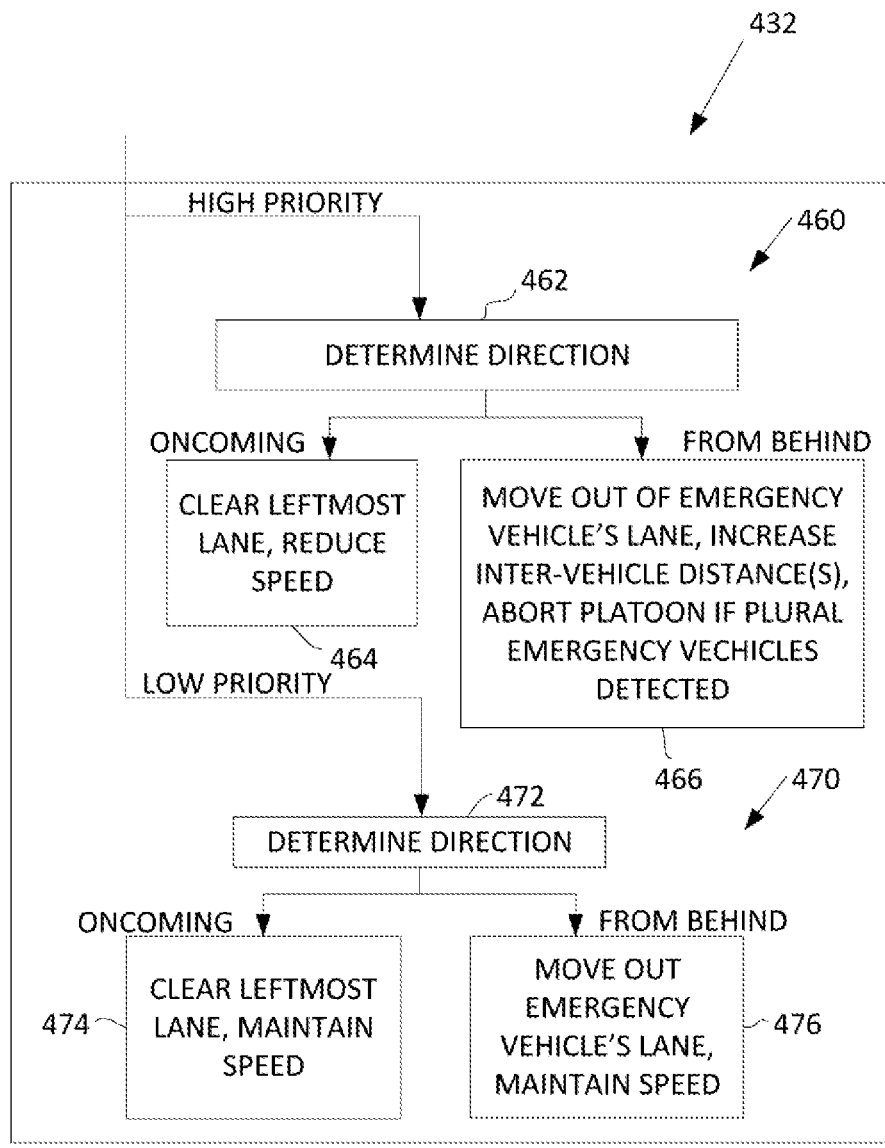

With continued reference to FIG. 4c, in the event of the platoon moving on a multi-lane roadways having multiple (two or more) lanes in each direction, and without a median dividing the multiple (two or more) lanes, the relative direction of the LOW priority emergency vehicle is determined in step 472. When the emergency vehicle is determined to be oncoming from the front of the platoon, the control system in accordance with the example embodiment generates a signal at step 474 for the platooning vehicles to clear the leftmost lane and to maintain their speed, and transmits the signal by V2V communications to the other vehicles in the platoon for controlling the platoon to move in that manner. When the emergency vehicle is determined to be oncoming from the rear of the platoon, the control system in accordance with the example embodiment generates a signal at step 476 for the platooning vehicles to move out of the lane occupied by the emergency vehicle and to maintain their speed, and transmits the signal by V2V communications to the other vehicles in the platoon for controlling the platoon to move in that manner If the roadway configuration sensor system 230, 240, 244, 245, 251 determines in control block 418 (FIG. 4*a*) that the roadway configuration comprises a multi-lane roadway having multiple (two or more) lanes in each direction, and having a median dividing the multiple (two or more) lanes in each direction, the emergency vehicle priority determined in control block 410 is examined in step 424 prior to generating platooning control signals in block 434 to determine whether the emergency vehicle priority is HIGH whereupon the control flows to perform Action #5 480, or whether the emergency vehicle priority is LOW whereupon the control flows to Action #6 490.

Platooning control signals are generated in block 434 on multi-lane roadways having multiple (two or more) lanes in each direction, and having a median dividing the multiple (two or more) lanes in each direction in accordance with whether the emergency vehicle is approaching the platoon from ahead or behind of the platoon and in accordance with a priority of the emergency vehicle. In this regard and with reference to FIG. 4*d*, in the event of the platoon moving on a multi-lane roadways having multiple (two or more) lanes in each direction, and with a median dividing the multiple (two or more) lanes in each direction the relative direction of the HIGH priority emergency vehicle is determined in step 482. When the emergency vehicle is determined to be oncoming from the front of the platoon, the control system in accordance with the example embodiment generates no signal at step 484 for the platooning vehicles to react at all to the emergency vehicle on the opposite side of the median. When the HIGH priority emergency vehicle is determined to be oncoming from the rear of the platoon, the control system in accordance with the example embodiment generates a signal at step 486 for the platooning vehicles to move out of the lane occupied by the emergency vehicle, increase inter-vehicle distances, and to abort the platoon if there are two (2) or more emergency vehicles detected, and transmits the signal by V2V communications to the other vehicles in the platoon for controlling the platoon to move in that manner.

Figure 4D:
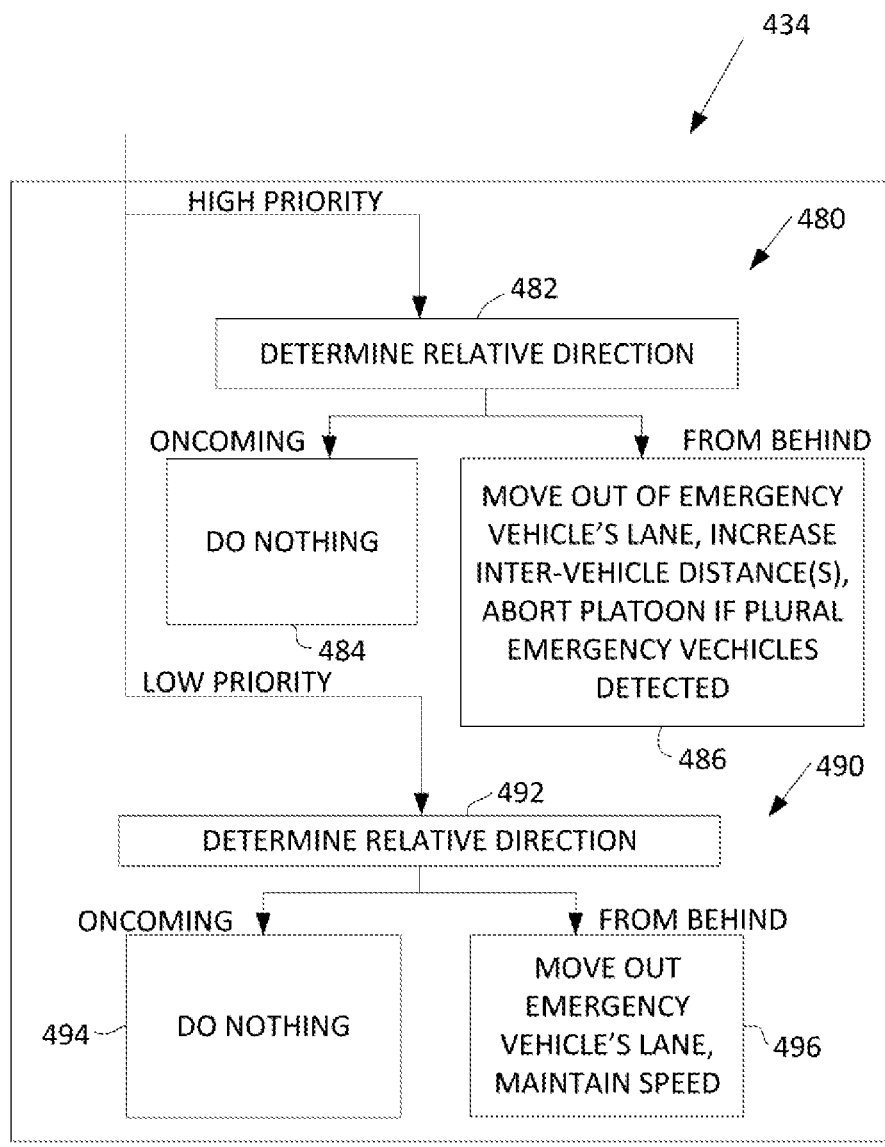

With continued reference to FIG. 4*d*, in the event of the platoon moving on a multi-lane roadway having multiple (two or more) lanes in each direction, and with a median dividing the multiple (two or more) lanes, the relative direction of the LOW priority emergency vehicle is determined in step 492. When the emergency vehicle is determined to be oncoming from the front of the platoon, the control system in accordance with the example embodiment generates no signal at step 494 for the platooning vehicles to react at all to the emergency vehicle on the opposite side of the median. When the emergency vehicle is determined to be oncoming from the rear of the platoon, the control system in accordance with the example embodiment generates a signal at step 496 for the platooning vehicles to move out of the lane occupied by the emergency vehicle and to maintain their speed, and transmits the signal by V2V communications to the other vehicles in the platoon for controlling the platoon to move in that manner.

The position of the non-platooning vehicle relative to the platoon is determined in control block 410 (FIGS. 4*a*, 5*a*). The non-platooning vehicle may be moving towards the platoon from ahead of the platoon, or it may be moving towards the platoon from behind the platoon. In the example embodiment, a forward light sensor 262 may be used to determine that the non-platooning vehicle is moving towards the platoon from ahead of the platoon. Similarly in the example embodiment, a rearward directed light sensor 264 may be used to determine that the non-platooning vehicle is moving towards the platoon from behind the platoon.

In general and in accordance with the example embodiments, in the event of the platoon travelling on a single lane highway having no median and encountering a high priority emergency vehicle moving in either direction relative to the platoon, the platooning vehicles move over to the most right of the roadway that is safe; i.e. if there is a shoulder onto that shoulder if not a shoulder as far to the right in the lane as possible and come to a stop. This will be described below with reference for example to FIGS. 6*a*-6*f*. In the event of the platoon travelling on a single lane highway having no median and encountering a low priority emergency vehicle headed towards the platoon from ahead, the platooning vehicles maintain their speeds and move to the rightmost portion of the lane. This is also described below with reference for example to FIGS. 6*a*-6*f*. In the event of the platoon travelling on a single lane highway having no median and encountering a low priority emergency vehicle headed towards the platoon from behind, the platooning vehicles reduce their speeds and move over to rightmost portion of the lane to allow the vehicle to pass. This will be described below with reference for example to FIGS. 6*a*-6*f*.

In an example embodiment the system includes a roadway configuration sensor unit is operable to determine a configuration of the associated roadway as being a single lane highway without a median, and to generate single lane highway roadway configuration data as the roadway configuration data. The single lane highway roadway configuration data is representative of the determined configuration of the associated roadway as being a single lane highway without a median. In addition, the logic of the platoon control unit of the example embodiment is executable by the processor to use the high priority emergency vehicle status data described above, the single lane highway roadway configuration data, and the emergency vehicle present ahead or behind data described above to determine steer platoon right and stop maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles as far right in the roadway or into a shoulder of the associated roadway and to come to a stop. The transceiver operates to transmit the steer platoon right and stop maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to come to a stop.

In accordance with a further example embodiment, the roadway configuration sensor unit of the system is operable to determine a configuration of the associated roadway as being a single lane highway without a median, and generate single lane highway roadway configuration data as the roadway configuration data. The single lane highway roadway configuration data is representative of the determined configuration of the associated roadway as being a single lane highway without a median. In addition, the logic of the platoon control unit is executable by the processor to use the low priority emergency vehicle status data described above, the single lane highway roadway configuration data, and the emergency vehicle present ahead data described above to determine steer platoon right and maintain speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles as far right in the roadway or into a shoulder of the associated roadway and to maintain speed of the platoon. In the example embodiment described, the transceiver transmits the steer platoon right and maintain speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to maintain speed of the platoon.

FIGS. 6a-6f depict a sequence of operations for dynamically adjusting a large platoon (a platoon having three (3) or more participating vehicles) on a multi-lane roadway 600 having a single lane 602, 606 in each direction to accommodate a non-platooning emergency vehicle approaching the large platoon from ahead and in the opposite direction and in a different multi-lane roadway lane as the large platoon. In FIGS. 6a-6f the single lanes 602, 606 in each direction are separate by a double yellow line 604 or any other suitable indicia indicating passing to the left of the line (over the line) is forbidden in accordance with current road marking conventions in the United States.

Figure 6A:
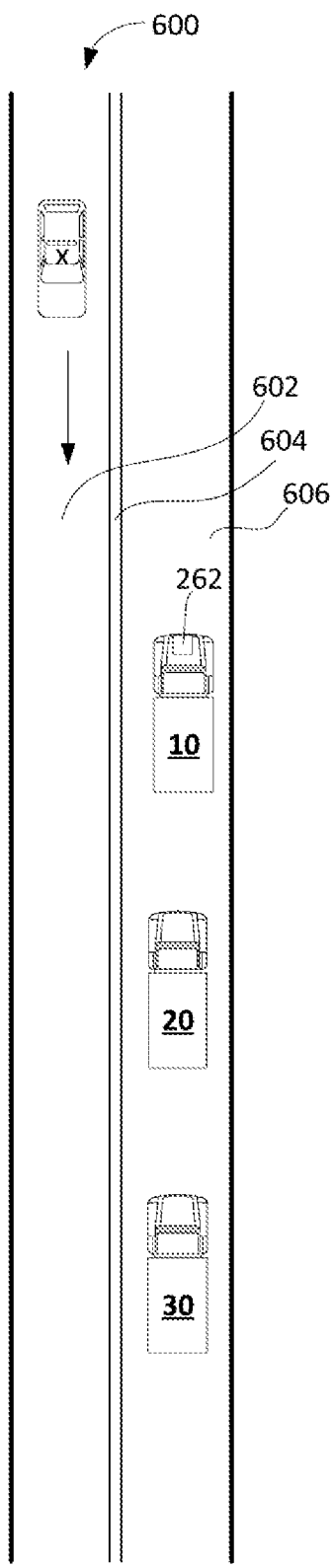
FIGS. 6a-6f depict a sequence of operations for dynamically adjusting a large platoon on a multi-lane roadway having a single lane in each direction to accommodate a non-platooning emergency vehicle approaching the large platoon from ahead and traveling in the opposite direction and in a different multi-lane roadway lane as the large platoon.

In FIG. 6a, the forward directed sensor 262 of the leading vehicle 10 detects the presence of the emergency vehicle X, and may also detect the flashing rate of the safety lights of the emergency vehicle X as necessary or desired. The control 200, 300 of the leading vehicle 10 therefore determines the safety vehicle X to be heading towards the platoon from ahead of the platoon. The camera 245 of the leading vehicle 10 determines a configuration of the roadway 600 as a multi-lane roadway 600 having a single lane 602, 606 in each direction, wherein the single lanes 602, 606 in each direction are separate by a double yellow line 604 or any other suitable indicia indicating passing to the left of the line (over the line) is forbidden. The camera 245 of the leading vehicle 10 also determines that the platoon is in the single lane 606 of the multi-lane roadway 600.

Figure 6B:
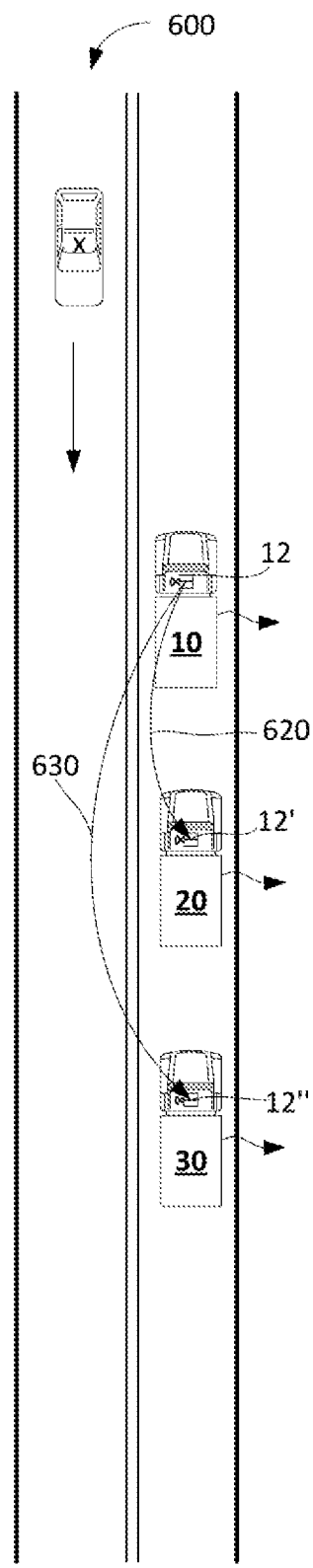

In FIG. 6b, the transceiver 250 in the leading platooning vehicle 10 transmits a platoon control signal 620 to the intermediate platooning vehicle 20 to change lanes to move to the right of the single lane 606 and either off of the roadway 600 altogether and stopping in a berm 607 in a first example embodiment (FIG. 6c), or as far as possible to the rightmost portion of the roadway 600 in a second example embodiment (FIG. 6d) such as may be practical when a roadway berm or shoulder is unavailable. The transceiver 250 in the leading platooning vehicle 10 similarly transmits the platoon control signal 630 to the trailing platooning vehicle 30 as well to change lanes to move to the right of the single lane 606 and into a position 607 (FIG. 6c) off of the roadway 600 altogether, or into the position 608 (FIG. 6d) as far as possible to the rightmost portion of the roadway 600.

Figure 6C:
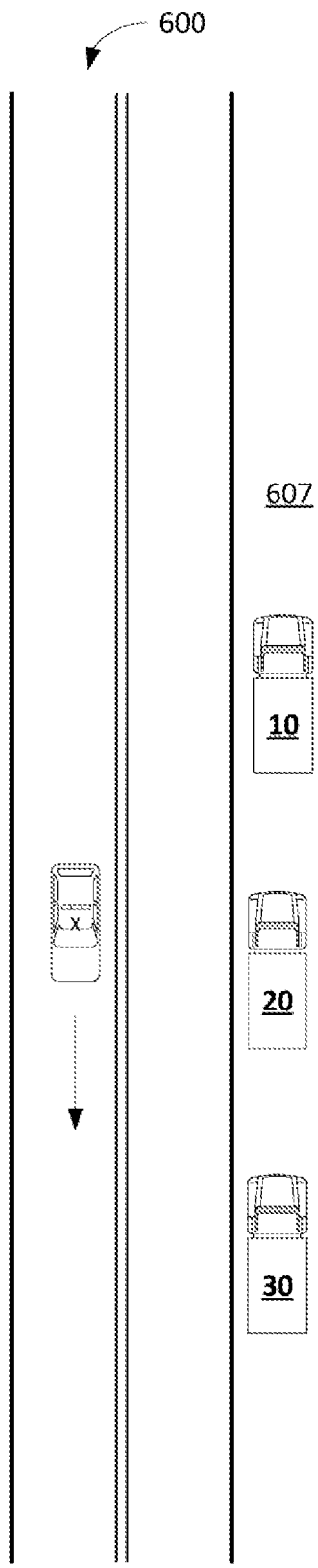

FIG. 6c shows the platoon comprising the set of platooning vehicles 10, 20, 30 of the example embodiment moved over to the right of the single lane 606 and in the position 607 off of the roadway 600 altogether after successfully executing the lane shift maneuver. This allows the emergency vehicle X to pass the platoon via the other lane 602 of the roadway 600 while the platooning vehicles are but leaving a margin of safety being provided by the now-empty lane 606.

The controller 230 executes the logic 244 stored in the memory 240 for detecting an emergency vehicle and also for detecting the priority level of the emergency vehicle in accordance with an example embodiment as shown for example in FIG. 5a. In the example embodiment for high priority safety vehicles approaching the platoon from ahead, the transceiver 250 in the leading platooning vehicle 10 transmits the platoon control signals 620, 630 to the intermediate and trailing platooning vehicles 20, 30 including information instructing the intermediate and trailing platooning vehicles 20, 30 to move to the right of the single lane 606 and into a position 607 (FIG. 6c) off of the roadway 600 altogether, or into the position 608 (FIG. 6d) as far as possible to the rightmost portion of the roadway 600, and come to a full stop or rest such as shown for example at step 442 of the flow diagram 430 in FIG. 4b. In the example embodiment, the transceiver transmits steer platoon right and stop maneuver data as the emergency vehicle avoidance maneuver command data as the emergency vehicle avoidance maneuver command signal 620, 630 to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to come to a stop.

Further in the example embodiment for emergency vehicles approaching the platoon from ahead that are determined to be low priority safety vehicles (FIG. 5a), the transceiver 250 in the leading platooning vehicle 10 transmits the platoon control signals 620, 630 to the intermediate and trailing platooning vehicles 20, 30 including information instructing the intermediate and trailing platooning vehicles 20, 30 to move to the right of the single lane 606 and into a position 607 (FIG. 6c) off of the roadway 600 altogether, or into the position 608 (FIG. 6d) as far as possible to the rightmost portion of the roadway 600, and maintain their respective speeds as shown for example at step 454 of the flow diagram 430 in FIG. 4b. In the example embodiment, the transceiver transmits steer platoon right and maintain speed maneuver data as emergency vehicle avoidance maneuver command data as the emergency vehicle avoidance maneuver command signal 620, 630 to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to maintain speed of the platoon.

Figure 6D:
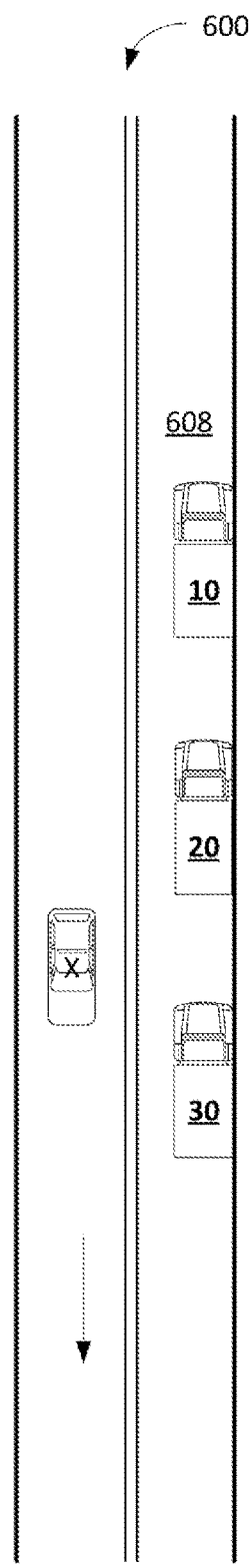

FIG. 6d shows the platoon comprising the set of platooning vehicles 10, 20, 30 of the example embodiment moved over to the right of the single lane 606 and in the position 608 after successfully executing the lane shift maneuver. This allows the emergency vehicle X to pass the platoon via the other lane 602 of the roadway 600 but leaving a margin of safety being provided by the now partially cleared lane 606.

Figure 6E:
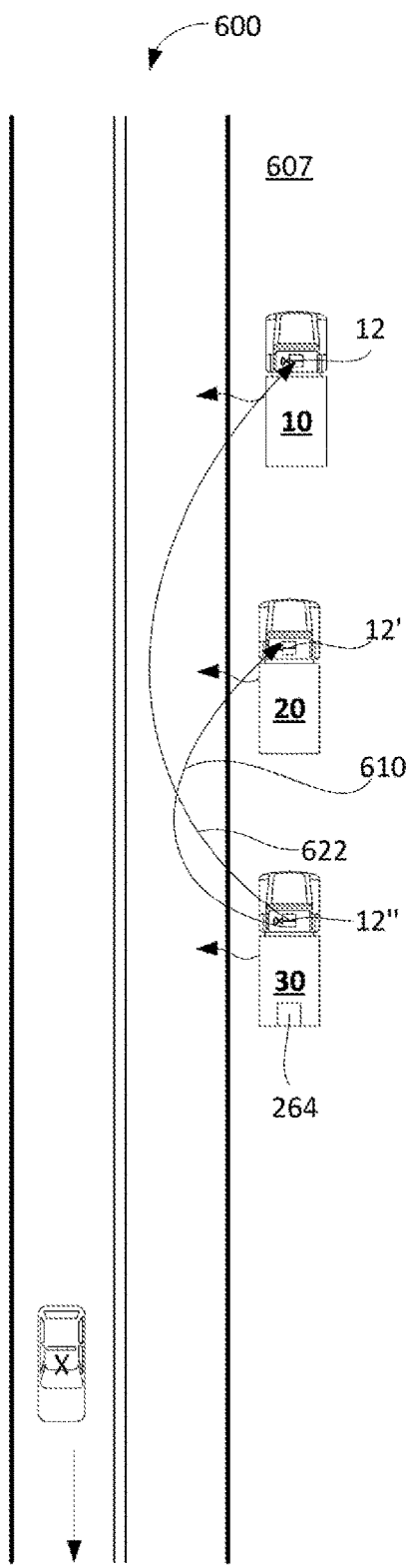

In FIG. 6e, the rearward directed sensor 264 of the trailing vehicle 30 detects the presence of the emergency vehicle X behind the platoon having successfully passed the platoon as shown in FIGS. 6c and 6d. The control 200, 300 of the trailing vehicle 30 therefore determines the safety vehicle X no longer needs access to either of the lanes 602, 606 of the roadway 600. In FIG. 6e the transceiver 250 in the trailing platooning vehicle 30 transmits a platoon control signal 610 to the intermediate platooning vehicle 20 to change lanes back to the single speed lane 606. Similarly, the transceiver 250 in the trailing platooning vehicle 30 transmits an equivalent platoon control signal 622 to the leading platooning vehicle 10 to change lanes back to the single speed lane 606.

Figure 6F:
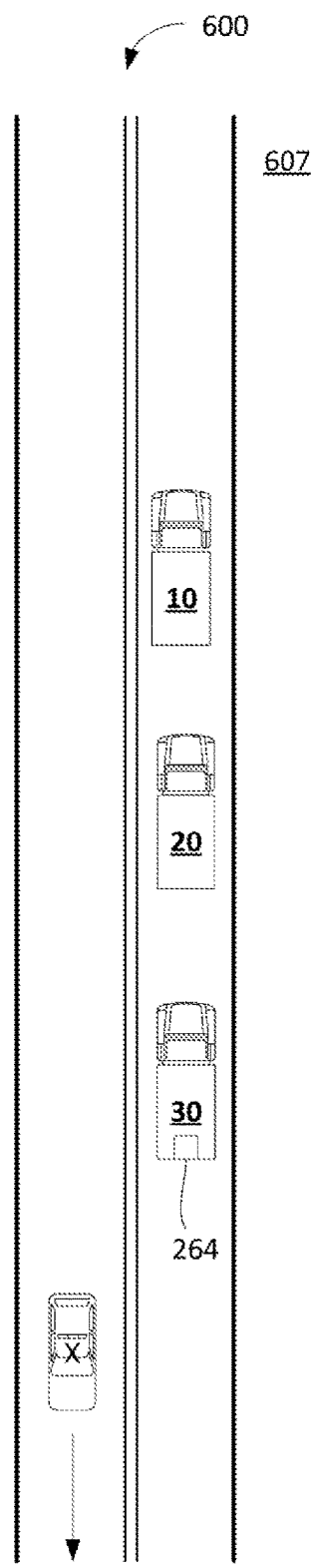

FIG. 6f shows the platoon moved over back into the single lane 606 after successfully executing the lane shift maneuver. The above protocol allows an emergency vehicle X approaching the platoon from ahead to maintain travel in its lane 602 of the multi-lane roadway 600 while leaving a platoon free gap lane 606 available to provide sufficient space for the emergency vehicle to navigate without compromising safety and efficiency.

FIGS. 7a-7f depict a sequence of operations for dynamically adjusting a large platoon on a multi-lane roadway 700 having a single lane 702, 706 in each direction to accommodate a non-platooning emergency vehicle approaching the large platoon from behind the platoon and in the same direction and in the same multi-lane roadway lane as the large platoon. In the example embodiment shown in FIGS. 7a-7f the emergency vehicle approaching the platoon from behind is determined to be a low priority safety vehicle (FIG. 5a), In FIGS. 7a-7f the single lanes 702, 706 in each direction are separate by a double yellow line 704 or any other suitable indicia indicating passing to the left of the line (over the line) is forbidden in accordance with current road marking conventions in the United States.

Figure 7A:
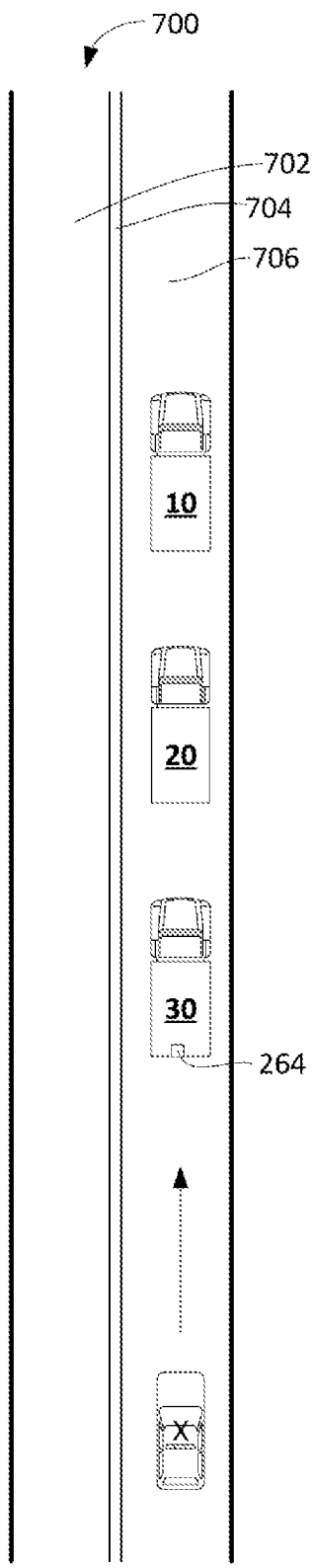
FIGS. 7a-7f depict a sequence of operations for dynamically adjusting a large platoon on the multi-lane roadway having a single lane in each direction of FIGS. 6a-6f to accommodate the non-platooning low priority emergency vehicle approaching the large platoon from behind and traveling in the same low-speed roadway lane as the large platoon.

In FIG. 7a, the control 200, 300 of the trailing vehicle 30 uses the rearward directed sensor 264 of the trailing vehicle 30 to detect the presence of an emergency vehicle X, and also to detect the flashing rate of the safety lights of the emergency vehicle X as necessary or desired. The control 200, 300 of the trailing vehicle 30 therefore determines the safety vehicle X to be heading towards the platoon from behind the platoon. The control 200, 300 of the trailing vehicle 30 also uses the camera 245 of the trailing vehicle 30 to determine a configuration of the roadway 700 as a multi-lane roadway 700 having a single lane 702, 706 in each direction, wherein the single lanes 702, 706 in each direction are separated by a double yellow line 704 or any other suitable indicia indicating passing to the left of the line (over the line) is forbidden. The camera 245 of the trailing vehicle 30 also determines that the platoon is in the single lane 706 of the multi-lane roadway 700.

In accordance with a further example embodiment, the roadway configuration sensor unit of the system is operable to determine a configuration of the associated roadway as being a single lane highway without a median, and to generate single lane highway roadway configuration data as the roadway configuration data. The single lane highway roadway configuration data is representative of the determined configuration of the associated roadway as being a single lane highway without a median. The logic of the platoon control unit is executable by the processor to use the low priority emergency vehicle status data described above, the single lane highway roadway configuration data, and the emergency vehicle present behind data described above to determine steer platoon right and reduce speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles as far right in the roadway or into a shoulder of the associated roadway and to reduce speed of the platoon. The transceiver transmits the steer platoon right and reduce speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to reduce speed of the platoon.

Figure 7B:
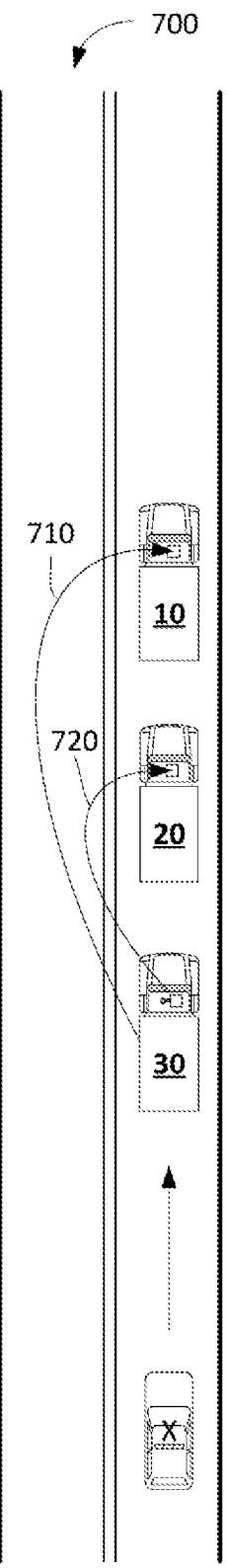

In FIG. 7b, the transceiver 250 in the trailing platooning vehicle 30 transmits a platoon control signal 720 to the intermediate platooning vehicle 20 to change lanes to move to the right of the single lane 706 and either off of the roadway 700 altogether in a first example embodiment (FIG. 7c), or as far as possible to the rightmost portion of the roadway 700 in a second example embodiment (FIG. 7d) such as may be practical when a roadway berm or shoulder is unavailable. The transceiver 250 in the trailing platooning vehicle 30 similarly transmits the platoon control signal 710 to the leading platooning vehicle 10 as well to change lanes to move to the right of the single lane 706 and into a position 707 off of the roadway 700 altogether, or into the position 708 as far as possible to the rightmost portion of the roadway 700. The transceiver may transmit the steer platoon right and reduce speed maneuver data as emergency vehicle avoidance maneuver command data as the emergency vehicle avoidance maneuver command signals 710, 720 to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to reduce speed of the platoon.

Figure 7C:
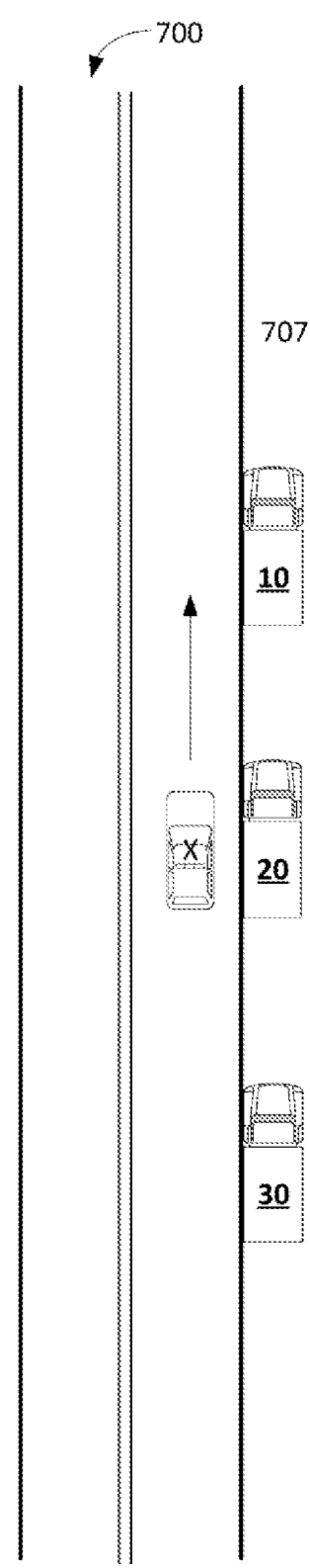

FIG. 7c shows the platoon comprising the set of platooning vehicles 10, 20, 30 of the example embodiment moved over to the right of the single lane 706 and in the position 707 off of the roadway 700 altogether after successfully executing the lane shift maneuver. This allows the emergency vehicle X to pass the platoon via the other lane 702 of the roadway 700 while the platooning vehicles are but leaving a margin of safety being provided by the now-empty lane 706.

Figures 7D, 7E, 7F:
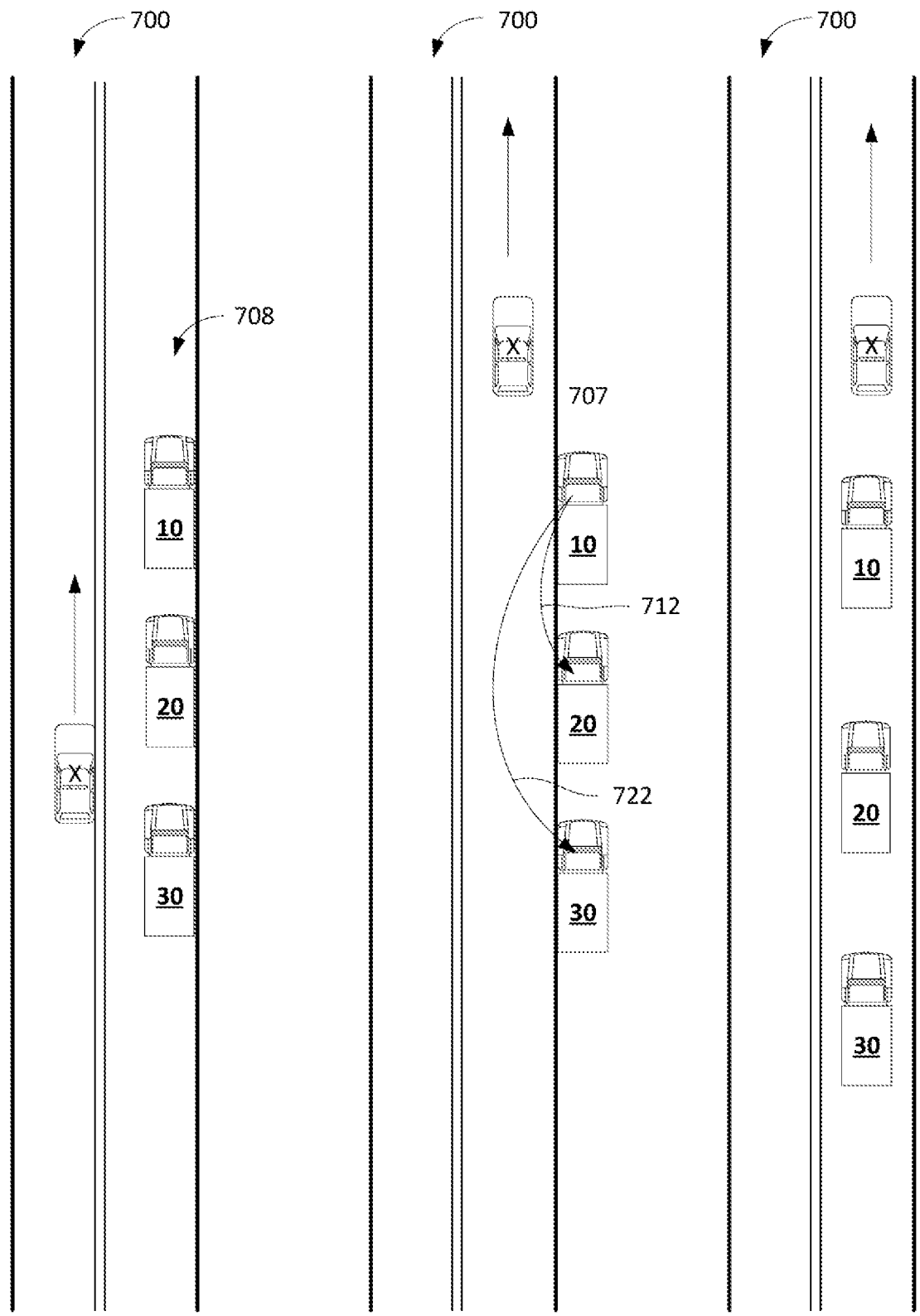

FIG. 7d shows the platoon comprising the set of platooning vehicles 10, 20, 30 of the example embodiment moved over to the right of the single lane 706 and in the position 708 after successfully executing the lane shift maneuver. This allows the emergency vehicle X to pass the platoon via the other lane 702 of the roadway 700 but leaving a margin of safety being provided by the now partially cleared lane 706.

In FIG. 7e, the forward directed sensor 262 of the leading vehicle 10 detects the presence of the emergency vehicle X ahead of the platoon having successfully passed the platoon as shown in FIGS. 7c and 7d. The control 200, 300 of the leading vehicle 10 therefore determines the safety vehicle X no longer needs access to either of the lanes 702, 706 of the roadway 700. In FIG. 7e the transceiver 250 in the leading platooning vehicle 10 transmits a platoon control signal 712 to the intermediate platooning vehicle 20 to change lanes back to the single speed lane 706. Similarly, the transceiver 250 in the leading platooning vehicle 10 transmits an equivalent platoon control signal 722 to the trailing platooning vehicle 30 to change lanes back to the single speed lane 706.

FIG. 7f shows the platoon moved over back into the single lane 706 after successfully executing the lane shift maneuver. The above protocol allows an emergency vehicle X approaching the platoon from behind to maintain travel in its lane 702 of the multi-lane roadway 700 while leaving a platoon free gap lane 706 available to provide sufficient space for the emergency vehicle to navigate without compromising safety and efficiency.

In the event of the platoon travelling on a multiple lane highway in each direction (greater or equal to 2 lanes in each direction) with no median and encountering a high priority emergency vehicle moving towards the platoon from ahead, if the platoon is in the leftmost lane the platoon moves to the other lane and the vehicles each reduce their speeds. This will be described below with reference for example to FIGS. 8a-8e.

In the event of the platoon travelling on a multiple lane highway in each direction (greater or equal to 2 lanes in each direction) with no median and encountering a high priority emergency vehicle moving towards the platoon from behind, the platooning vehicles move to a lane not occupied by emergency vehicle and reduce their respective speeds. This will be described below with reference for example to FIGS. 9a-9e and 11a-11f.

In the event of a large platoon having 3 or more vehicles travelling on a multiple lane highway in each direction (greater or equal to 2 lanes in each direction) with no median and encountering a high priority emergency vehicle moving towards the platoon from behind, the platooning vehicles move to a lane not occupied by emergency vehicle and, once moved over a lane, increase distance between platooning trucks to allow additional vehicles to pass safely between trucks. This will be described below with reference for example to FIGS. 12a-12e.

In the event of a large platoon having 3 or more vehicles travelling on a multiple lane highway in each direction (greater or equal to 2 lanes in each direction) with no median and encountering two or more high priority emergency vehicles moving towards the platoon from behind, the platoon is disbanded. This will be described below with reference for example to FIGS. 13a-13f.

In the event of a large platoon having 3 or more vehicles travelling on a multiple lane highway in each direction (greater or equal to 2 lanes in each direction) with no median and encountering a low priority emergency vehicle moving towards the platoon from ahead, if the platoon is in leftmost lane, the platoon clears the leftmost lane maintains speed. This will be described below with reference for example to FIGS. 8a-8f.

In the event of a large platoon having 3 or more vehicles travelling on a multiple lane highway in each direction (greater or equal to 2 lanes in each direction) with no median and encountering a low priority emergency vehicle moving towards the platoon from behind, the platooning vehicles move to a lane not occupied by the emergency vehicle and maintain their speed. This will be described below with reference for example to FIGS. 14a-14f and 15a-15f.

In accordance with a further example embodiment, the roadway configuration sensor unit of the system is operable to determine a configuration of the associated roadway as being a multiple lane highway in each direction without a median, and to generate multiple lane highway roadway configuration data as the roadway configuration data. The multiple lane highway roadway configuration data is representative of the determined configuration of the associated roadway as being a multiple lane highway without a median.

For any priority of emergency vehicle, the logic of the platoon control unit is executable by the processor to use the high priority emergency vehicle status data, the roadway configuration data, and the emergency vehicle present ahead data to determine steer platoon from leftmost lane and reduce speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles away from the leftmost lane of the multiple lane highway and to reduce speed of the platoon. The transceiver transmits the steer platoon from leftmost lane and reduce speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles away from the leftmost lane of the multiple lane highway and to reduce speed of the platoon.

FIGS. 8a-8e depict a sequence of operation for dynamically adjusting a large platoon in a high speed lane 803 of a multi-lane roadway 800 having pairs of lanes 801, 802 and 803, 804 in each direction to accommodate a non-platooning emergency vehicle X approaching the large platoon from ahead and in the high-speed lane of the opposite direction of the multi-lane roadway. In FIGS. 8a-8e the pairs of lanes 801, 802 and 803, 804 in each direction are separate by a double yellow line 805 or any other suitable indicia indicating passing to the left of the line (over the line) is forbidden in accordance with current road marking conventions in the United States.

Figure 8A:
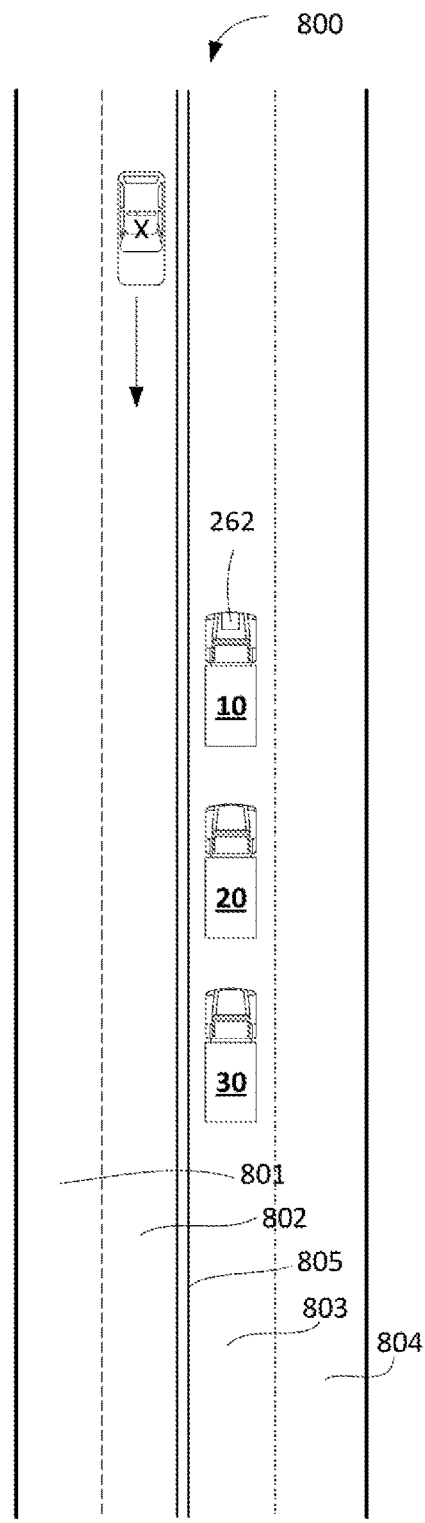
FIGS. 8a-8e depict a sequence of operations for dynamically adjusting a large platoon in a high speed lane of a multi-lane roadway having plural of lanes in each direction to accommodate a non-platooning emergency vehicle approaching the large platoon from ahead and in the high-speed lane of the opposite direction of the multi-lane roadway.

In FIG. 8a, the forward directed sensor 262 of the leading vehicle 10 detects the presence of the emergency vehicle X, and may also detect the flashing rate of the safety lights of the emergency vehicle X as necessary or desired. The control 200, 300 of the leading vehicle 10 therefore determines the safety vehicle X to be heading towards the platoon from ahead of the platoon. The camera 245 of the leading vehicle 10 determines a configuration of the roadway 800 as a multi-lane roadway 800 having pairs of lanes 801, 802 and 803, 804 in each direction, wherein the single lane pairs 801, 802 and 803, 804 in each direction are separate by a double yellow line 805 or any other suitable indicia indicating passing to the left of the line (over the line) is forbidden. The camera 245 of the leading vehicle 10 also determines that the platoon is in the high speed lane 801 of the multi-lane roadway 800.

Figure 8B:
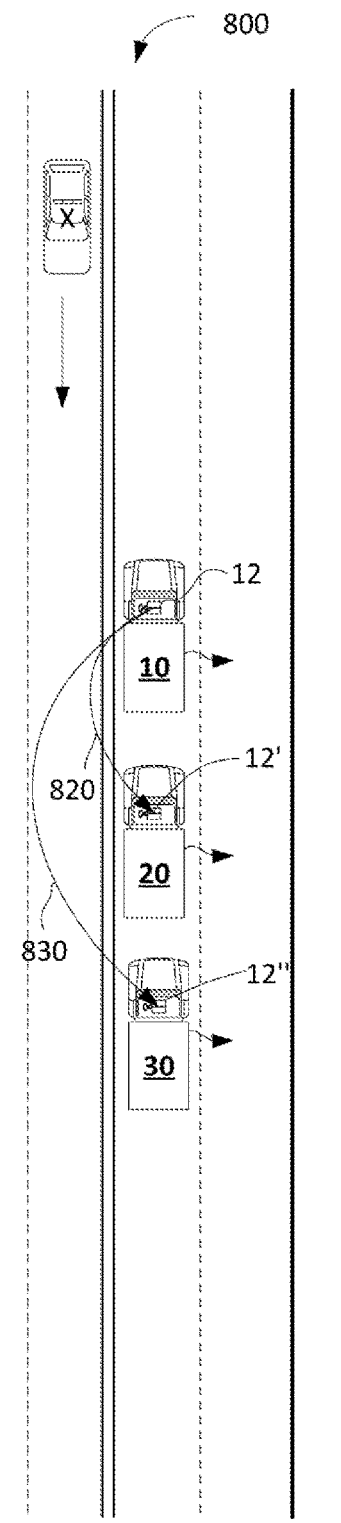
Figure 8C:
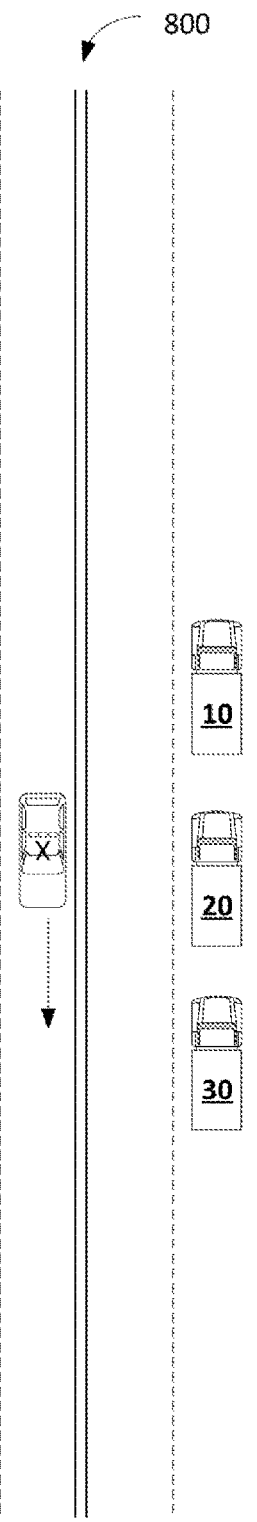

In FIG. 8b, the transceiver 250 in the leading platooning vehicle 10 transmits a platoon control signal 820 to the intermediate platooning vehicle 20 to change lanes to move to the right of the high speed lane 803 and into the low speed lane 804. The transceiver 250 in the leading platooning vehicle 10 similarly transmits the platoon control signal 830 to the trailing platooning vehicle 30 as well to change lanes to move to the right and into the slow lane 804 of the roadway 800 altogether. In the example embodiment, the transceiver transmits steer platoon from leftmost lane and reduce speed maneuver data as emergency vehicle avoidance maneuver command data as the emergency vehicle avoidance maneuver command signal 820, 830 to the set of platooning vehicles that are not the first associated platooning vehicle for directing the set of platooning vehicles away from a path of the associated emergency vehicle on the associated roadway by moving the set of platooning vehicles away from the leftmost lane of the multiple lane highway and to reduce speed of the platoon FIG. 8c shows the platoon comprising the set of platooning vehicles 10, 20, 30 of the example embodiment moved over to the right and into the slow lane 804 of the roadway 800 after successfully executing the lane shift maneuver. This allows the emergency vehicle X to pass the platoon via the high speed lane 802 of the roadway 800 but leaving a margin of safety being provided by the now-empty high speed lane 803.

Figures 8D, 8E:
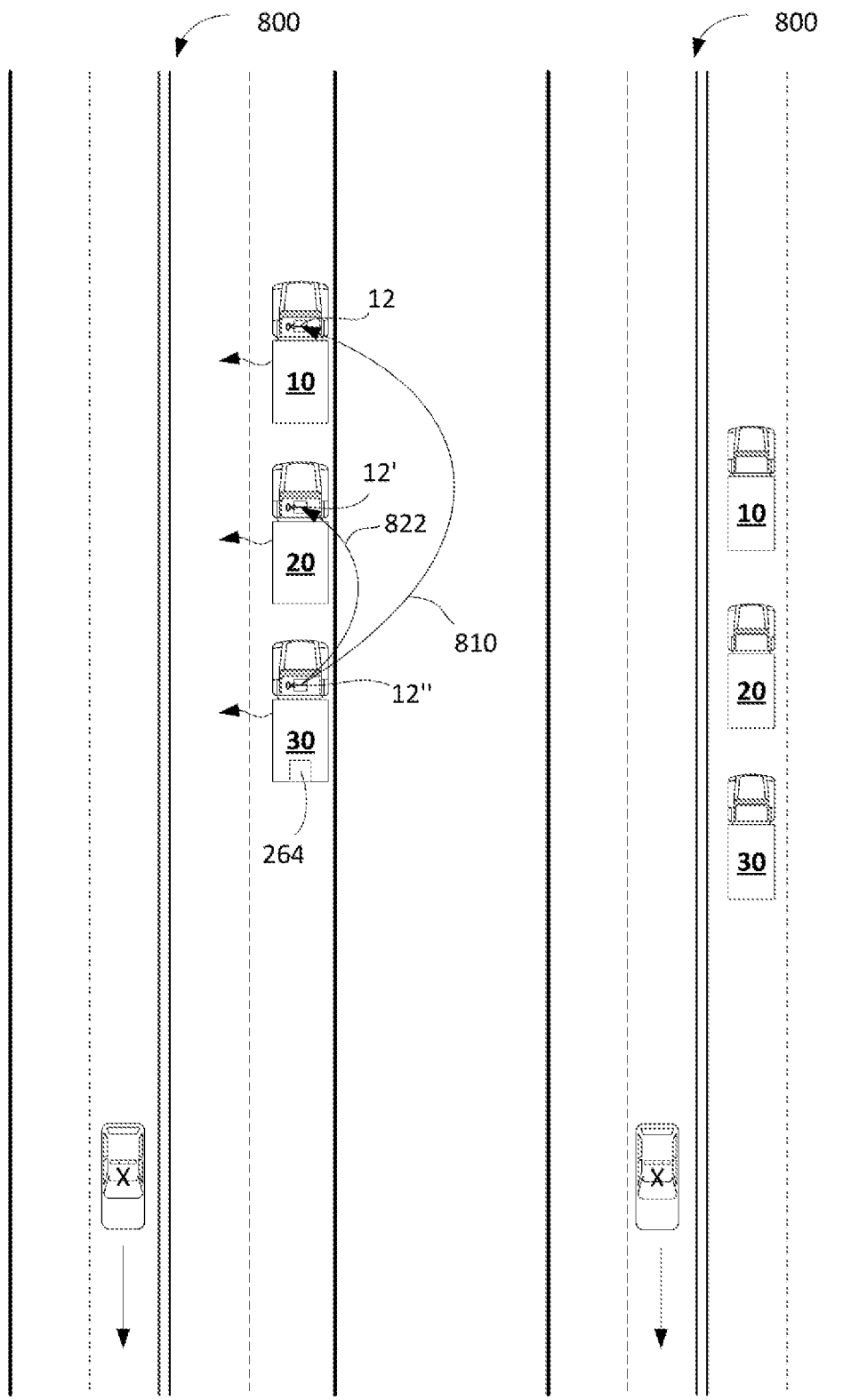

In FIG. 8d, the rearward directed sensor 264 of the trailing vehicle 30 detects the presence of the emergency vehicle X behind the platoon having successfully passed the platoon as shown in FIGS. 8c and 8d. The control 200, 300 of the trailing vehicle 30 therefore determines the safety vehicle X no longer needs access to either of the lanes 803, 804 of the roadway 800. In FIG. 8d the transceiver 250 in the trailing platooning vehicle 30 transmits a platoon control signal 822 to the intermediate platooning vehicle 20 to change lanes back to the high speed lane 803. Similarly, the transceiver 250 in the trailing platooning vehicle 30 transmits an equivalent platoon control signal 810 to the leading platooning vehicle 10 to change lanes back to the high speed lane 803.

FIG. 8e shows the platoon completely moved over back into the high speed lane 803 after successfully executing the lane shift maneuver. The above protocol allows an emergency vehicle X approaching the platoon from ahead to maintain travel in its high speed lane 802 of the multi-lane roadway 800 while leaving a platoon free gap lane 803 available to provide sufficient space for the emergency vehicle to navigate without compromising safety and efficiency.

Figure 9A:
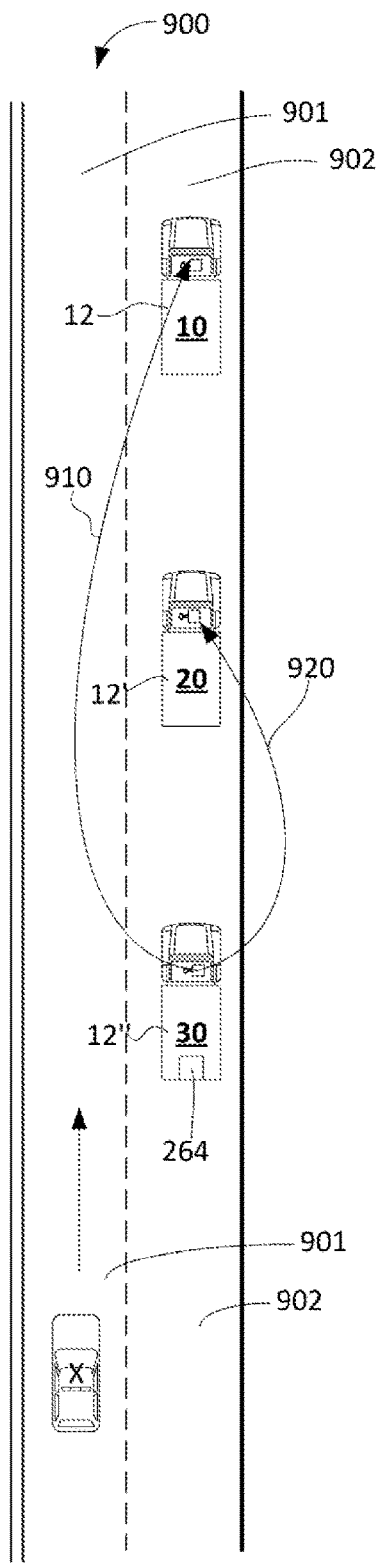
FIGS. 9a-9c depict a sequence of operations for dynamically adjusting a large platoon in a low-speed lane of a multi-lane roadway having plural lanes in each direction to accommodate a non-platooning high priority emergency vehicle approaching the large platoon from behind, but in a different and high-speed roadway lane than the roadway lane of the large platoon.
Figure 9B:
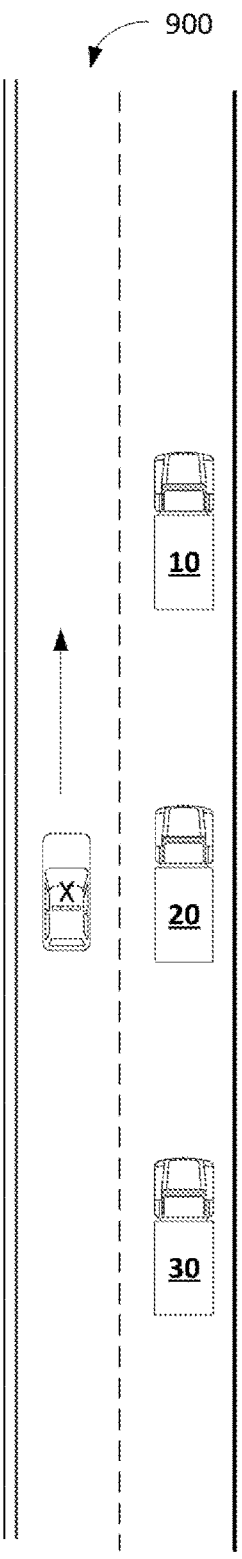
Figure 9C:
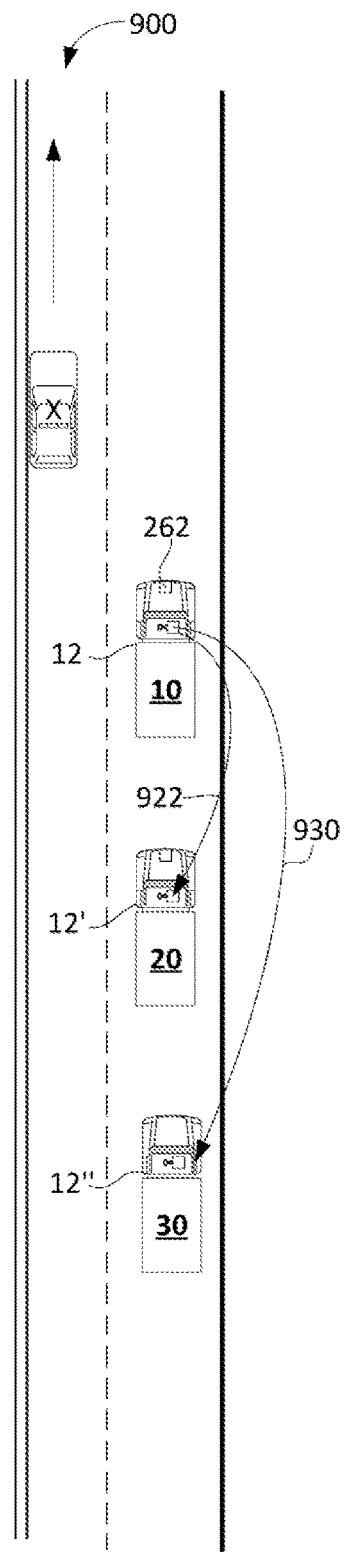

FIGS. 9a-9c depict a sequence of operation for dynamically adjusting the large platoon of the previous Figures in the low-speed lane 902 of the two lane roadway 900 to accommodate the non-platooning low priority emergency vehicle X approaching the large platoon from behind, but in the high-speed 901 and different roadway lane than the low-speed roadway lane 902 of the large platoon P.

In accordance with a further example embodiment, the roadway configuration sensor unit of the system is operable to determine a configuration of the associated roadway as being a multiple lane highway in each direction, and to generate multiple lane highway roadway configuration data as the roadway configuration data, the multiple lane highway roadway configuration data being representative of the determined configuration of the associated roadway as being a multiple lane highway. The logic of the platoon control unit is executable by the processor to use the high priority emergency vehicle status data, the roadway configuration data, and the emergency vehicle present behind data to determine steer platoon to lane not occupied by emergency vehicle and reduce speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles into a lane of the multiple lane highway not occupied by the emergency vehicle and to reduce speed of the platoon. The transceiver transmits the steer platoon to lane not occupied by emergency vehicle and reduce speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles into a lane of the multiple lane highway not occupied by the emergency vehicle and to reduce speed of the platoon.

In FIG. 9a, the rearward directed sensor 264 of the trailing vehicle 30 detects the presence of the emergency vehicle X and also detects the flashing rate of the safety lights of the emergency vehicle X as being about 10 Hz. The control 200, 300 of the trailing vehicle 30 therefore determines the safety vehicle X to be a low priority safety vehicle. The camera 245 of the leading vehicle 10 determines a configuration of the roadway 900 as a two lane roadway 900, and also that the platoon is in the low speed lane 902 of the two lane roadway 900. In FIG. 9b, the transceiver 250 in the trailing platooning vehicle 30 transmits a platoon control signal 910 to the lead platooning vehicle 10 and a similar platoon control signal 920 to the intermediate platooning vehicle 20 to maintain lane in the high speed lane 902. The transceiver may transmit steer platoon to lane not occupied by emergency vehicle and reduce speed maneuver data as emergency vehicle avoidance maneuver command data as the emergency vehicle avoidance maneuver command signal 910, 920 to the set of platooning vehicles that are not the first associated platooning vehicle for directing the set of platooning vehicles away from a path of the associated emergency vehicle on the associated roadway by moving the set of platooning vehicles into a lane of the multiple lane highway not occupied by the emergency vehicle and to reduce speed of the platoon.

FIG. 9b shows the platoon in the low speed lane 902 allowing the emergency vehicle X to pass via the high speed lane 902.

In FIG. 9c, the forward directed sensor 262 of the leading vehicle 10 detects the presence of the emergency vehicle X ahead of the platoon having successfully passed the platoon as shown in FIGS. 9b and 9c. The control 200, 300 of the leading vehicle 10 therefore determines the safety vehicle X no longer needs access to the any portion of the roadway 900 shared with the platoon P. In FIG. 9c the transceiver 250 in the leading platooning vehicle 10 transmits a platoon control signal 922 to the intermediate platooning vehicle 20 and a similar platoon control signal 930 to the trailing platooning vehicle 30 to maintain lane platoon control in the low speed lane 902. The above protocol allows a low urgency emergency vehicle X to maintain travel in a high speed lane 901 of a two lane roadway 900 while passing a platoon traveling in a low speed lane 902 of the two lane roadway 900.

Figure 10A:
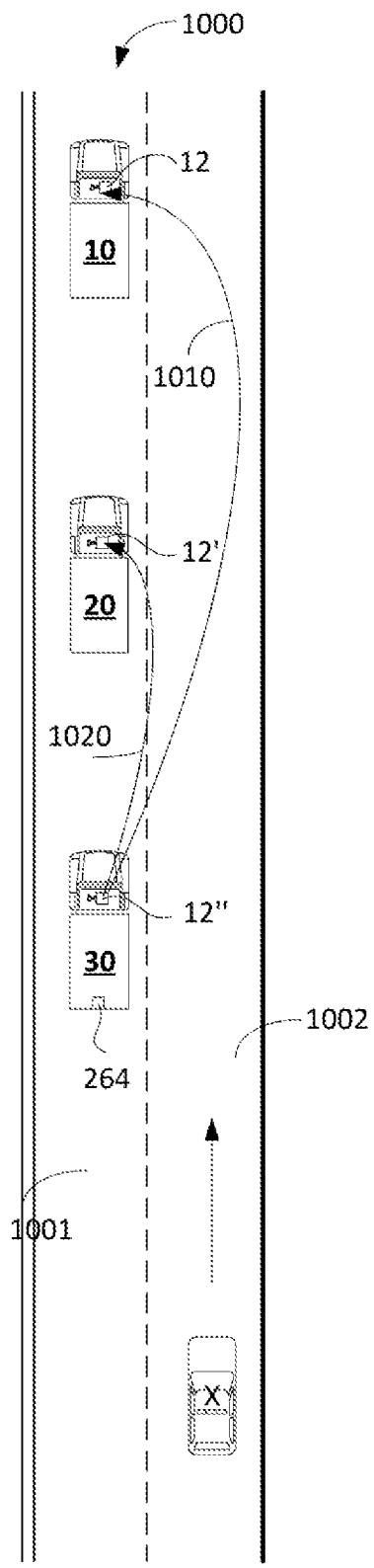
FIGS. 10a-10c depict a sequence of operations for dynamically adjusting a large platoon in a high speed lane of a multi-lane roadway having plural lanes in each direction to accommodate a non-platooning high priority emergency vehicle approaching the large platoon from behind, but in a different and low speed roadway lane than the roadway lane of the large platoon.
Figure 10B:
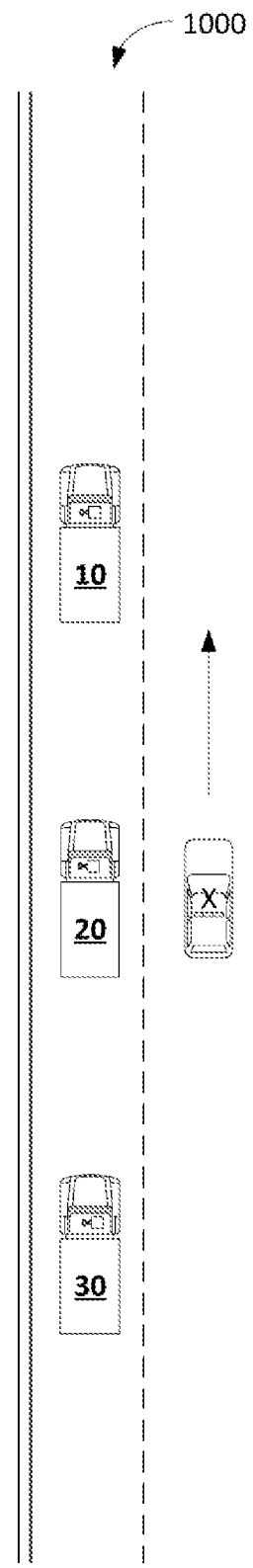
Figure 10C:
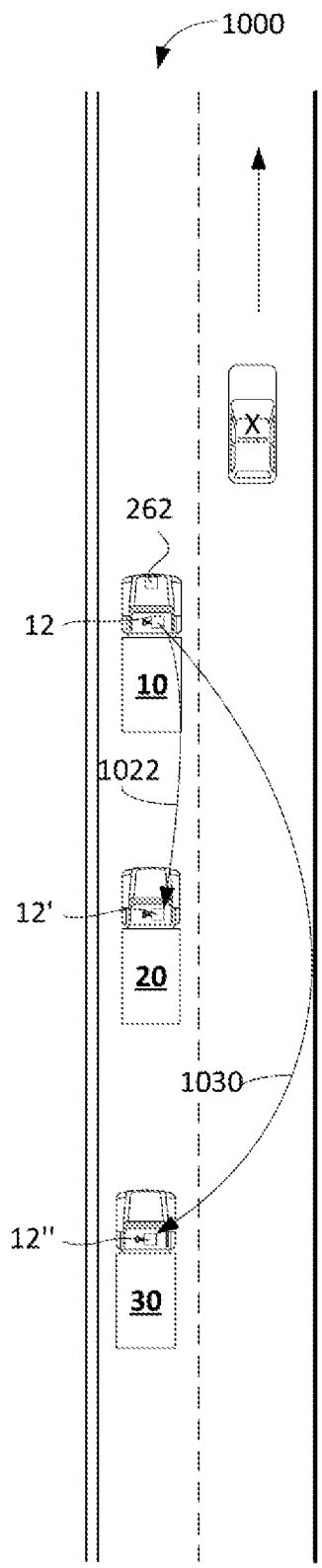

FIGS. 10a-10c depict a sequence of operation for dynamically adjusting the large platoon of the previous Figures in the high-speed lane 1002 of the two lane roadway 1000 to accommodate the non-platooning low priority emergency vehicle X approaching the large platoon from behind, but in a low-speed 1001 and different roadway lane than the high-speed roadway lane 1002 of the large platoon P.

In FIG. 10a, the rearward directed sensor 264 of the trailing vehicle 30 detects the presence of the emergency vehicle X and also detects the flashing rate of the safety lights of the emergency vehicle X as being about 10 Hz. The control 200, 300 of the trailing vehicle 30 therefore determines the safety vehicle X to be a low priority safety vehicle. The camera 245 of the leading vehicle 10 determines a configuration of the roadway 1000 as a two lane roadway 1000, and also that the platoon is in the high speed lane 1001 of the two lane roadway 1000. In FIG. 10b, the transceiver 250 in the trailing platooning vehicle 30 transmits a platoon control signal 1010 to the lead platooning vehicle 10 and a similar platoon control signal 620 to the intermediate platooning vehicle 20 to maintain lane in the high speed lane 1001.

FIG. 10b shows the platoon in the high speed lane 1001 allowing the emergency vehicle X to pass via the low speed lane 1002.

In FIG. 10c, the forward directed sensor 262 of the leading vehicle 10 detects the presence of the emergency vehicle X ahead of the platoon having successfully passed the platoon as shown in FIGS. 10b and 10c. The control 200, 300 of the leading vehicle 10 therefore determines the safety vehicle X no longer needs access to the any portion of the roadway 1000 shared with the platoon P. In FIG. 10c the transceiver 250 in the leading platooning vehicle 10 transmits a platoon control signal 1022 to the intermediate platooning vehicle 20 and a similar platoon control signal 1030 to the trailing platooning vehicle 30 to maintain lane platoon control in the high speed lane 1001. The above protocol allows a low urgency emergency vehicle X to maintain travel in a low speed lane 1002 of a two lane roadway 1000 while passing a platoon traveling in a high speed lane 1002 of the two lane roadway 1000.

Figure 11A:
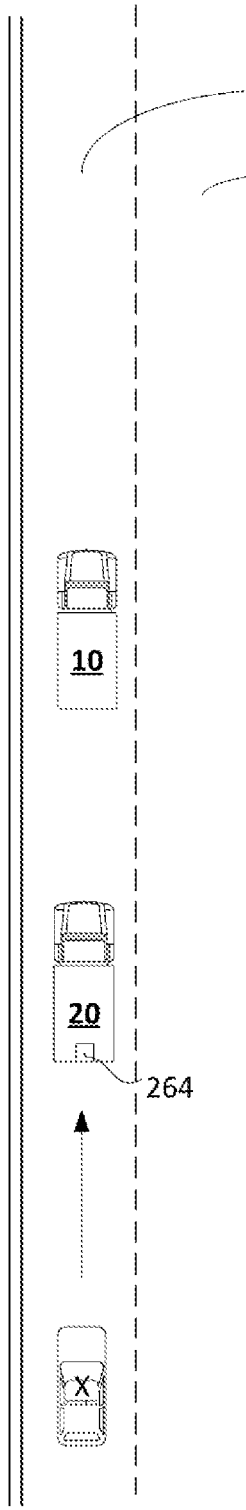
FIGS. 11a-11f depict a sequence of operations for dynamically adjusting a small platoon in the high-speed lane of a multi-lane roadway having plural lanes in each direction to accommodate a non-platooning high priority emergency vehicle approaching the large platoon from behind and in the same high-speed roadway lane as the small platoon.
Figure 11B:
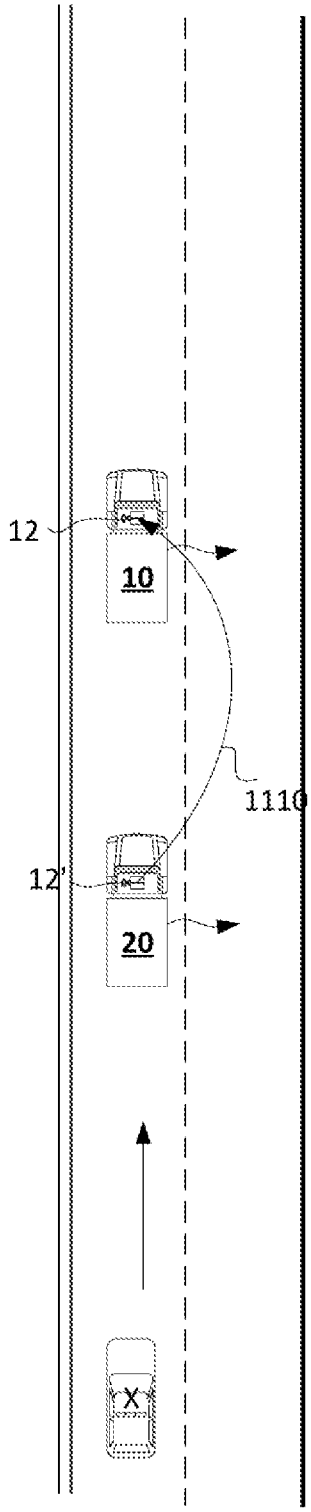
Figure 11C:
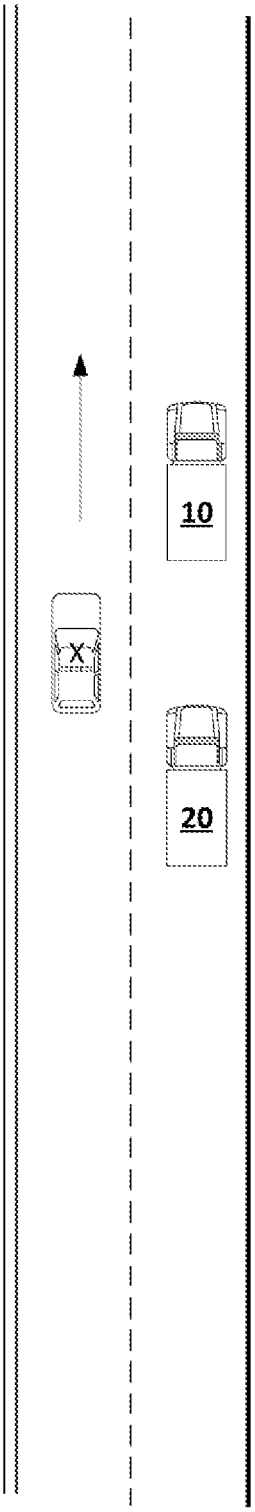

FIGS. 11a-11c depict a sequence of operation for dynamically adjusting a small platoon of less than three vehicles in the high-speed lane 1101 of a two lane roadway 1100 of the previous Figures to accommodate the non-platooning low priority emergency vehicle X approaching the small platoon from behind, and in the same high-speed lane 1001 as the high-speed roadway lane 1101 of the small platoon P.

In FIG. 11a, the rearward directed sensor 264 of the trailing vehicle 20 detects the presence of the emergency vehicle X and also detects the flashing rate of the safety lights of the emergency vehicle X as being about 14 Hz. The control 200, 300 of the trailing vehicle 20 therefore determines the safety vehicle X to be a high priority safety vehicle. The camera 245 of the leading vehicle 10 determines a configuration of the roadway 1100 as a two lane roadway 1100, and also that the platoon is in the high speed lane 1101 of the two lane roadway 1100. In FIG. 11b, the transceiver 250 in the trailing platooning vehicle 20 transmits a platoon control signal 1110 to the lead platooning vehicle 10 to move from the high speed lane 1101 to the low speed lane 1102.

FIG. 11b shows the platoon in the high speed lane 1101 and beginning to move to the low speed lane 1102 to allow the emergency vehicle X to pass via the high speed lane 1101.

In FIG. 11c, the small platoon is shown in the low speed lane 1102 and the emergency vehicle X being in the high speed lane 1101 having been vacated by the platoon and in the process of passing the small platoon. FIG. 11c shows the platoon comprising the set of platooning vehicles 10 and 20 of the example embodiment moved over to the right lane 1102. This allows the emergency vehicle X to pass the platoon via the other lane 1101 of the roadway 1100 while the platooning vehicles are but leaving a margin of safety being provided by the now-empty lane 1101.

Figure 11D:
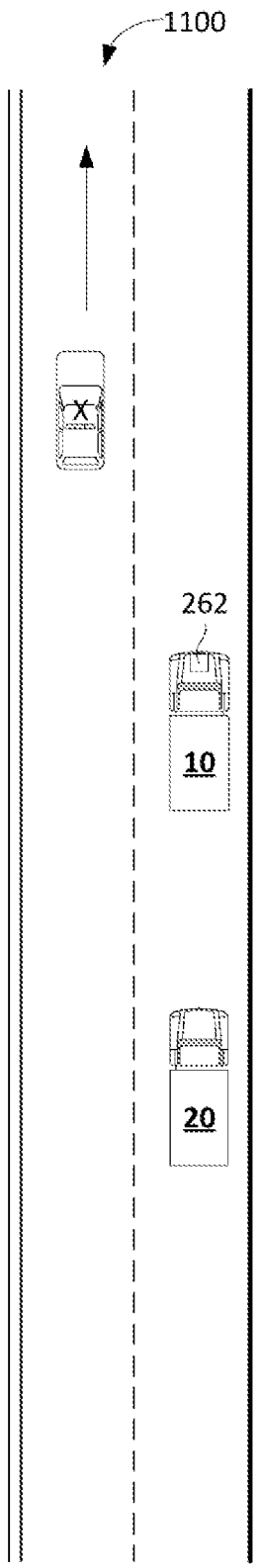

FIG. 11d shows the platoon comprising the set of platooning vehicles 10, 20 of the example embodiment moved over to the right of the low speed lane 1102 and the emergency vehicle X after having successfully passed the platoon executing the maneuver described above. This allows the emergency vehicle X to pass the platoon via the other lane 1101 of the roadway 1100 leaving a large margin of safety provided by the fully cleared lane 1101.

Figure 11E:
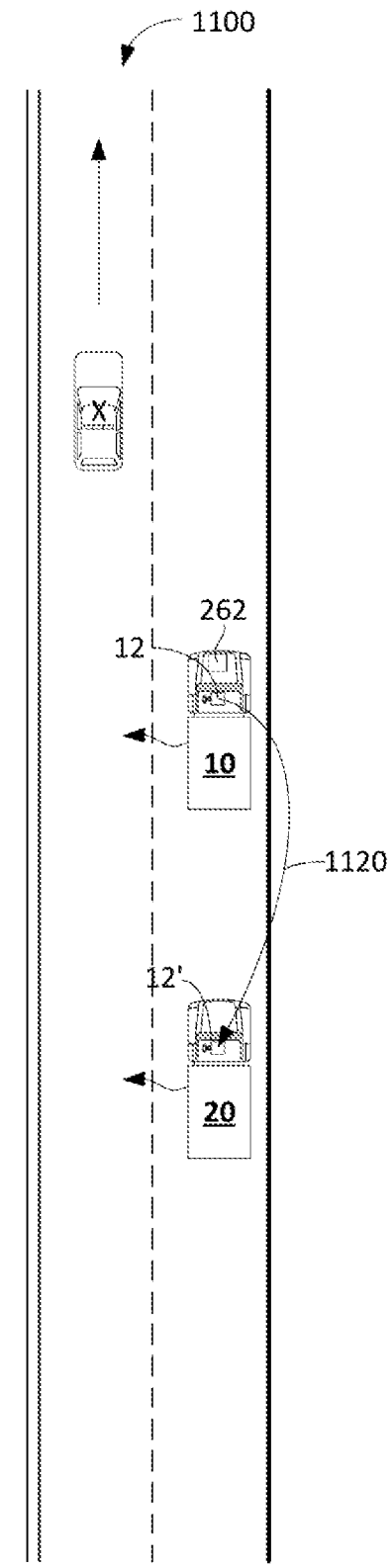

In FIG. 11e, the forward directed sensor 262 of the leading vehicle 10 detects the presence of the emergency vehicle X ahead of the platoon having successfully passed the platoon as shown in FIGS. 11c and 11d. The control 200, 300 of the leading vehicle 10 therefore determines the safety vehicle X no longer needs access to either of the lanes 1101, 1102 of the roadway 1100. In FIG. 11e the transceiver 250 in the leading platooning vehicle 10 transmits a platoon control signal 1120 to the trailing platooning vehicle 20 to change lanes back to the high speed lane 1101.

Figure 11F:
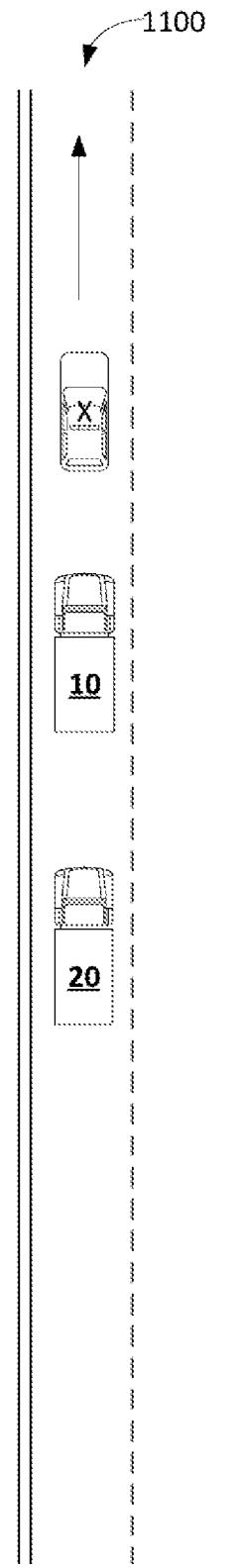

FIG. 11f shows the platoon moved over back into the high speed lane 1101 after successfully executing the lane shift maneuver. The above protocol allows an emergency vehicle X approaching the platoon from behind to maintain travel in the high speed lane 1101 of the multi-lane roadway 1100 without the need for the emergency vehicle to change lanes, and while leaving a free lane 1101 available to provide sufficient space for the emergency vehicle to navigate without compromising safety and efficiency.

In accordance with a further example embodiment, the logic of the platoon control unit is executable by the processor to determine a quantity of platooning vehicles that are not the first associated platooning vehicle and, based on the determined quantity of platooning vehicles that are not the first associated platooning vehicle being three or more, determine increase in inter-vehicle distance data, wherein the increase in inter-vehicle distance data is representative of an increase in inter-vehicle distance to be performed by the set of platooning vehicles. The transceiver operates to transmit the increase in inter-vehicle distance data as emergency vehicle avoidance maneuver command data as an emergency vehicle avoidance maneuver command signal to the set of platooning vehicles that are not the first associated platooning vehicle for directing the set of platooning vehicles to increase the inter-vehicle distance between the platooning vehicles.

Figure 12A:
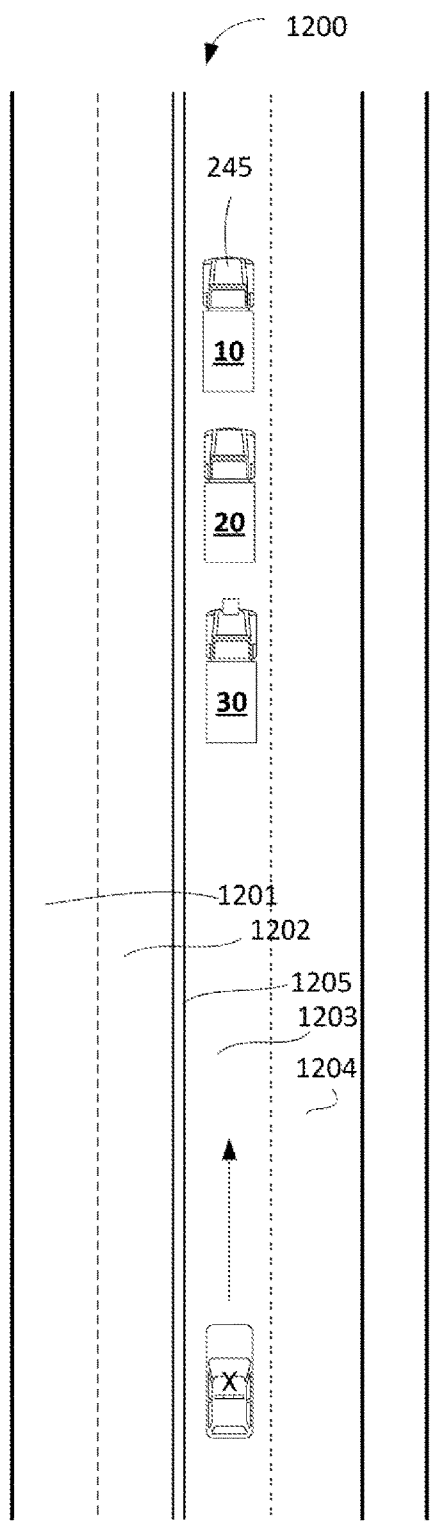
FIGS. 12a-12e depict a sequence of operations for dynamically adjusting a large platoon in a high speed lane of a multi-lane roadway having plural lanes in each direction to accommodate a high priority non-platooning emergency vehicle approaching the large platoon from behind and in the high-speed lane of the multi-lane roadway.
Figure 12B:
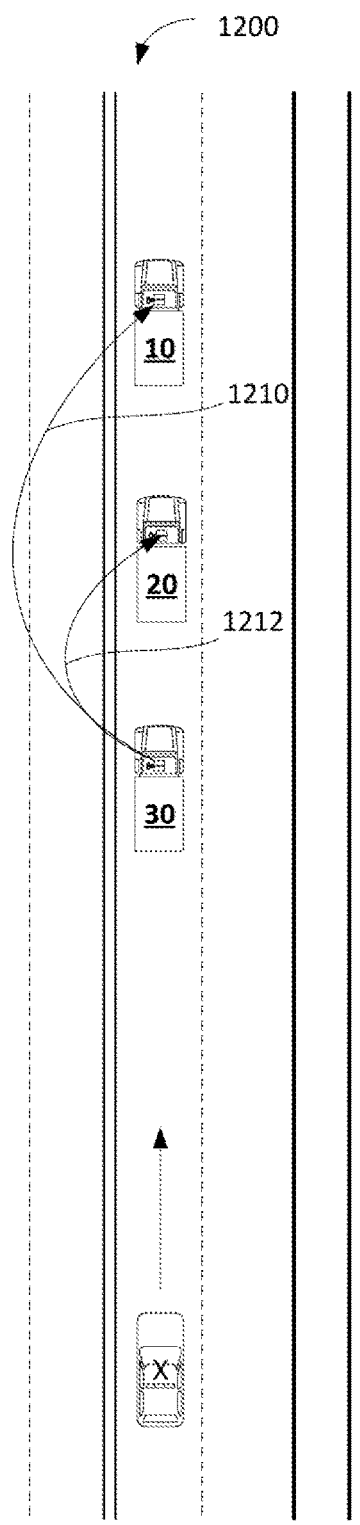
Figure 12C:
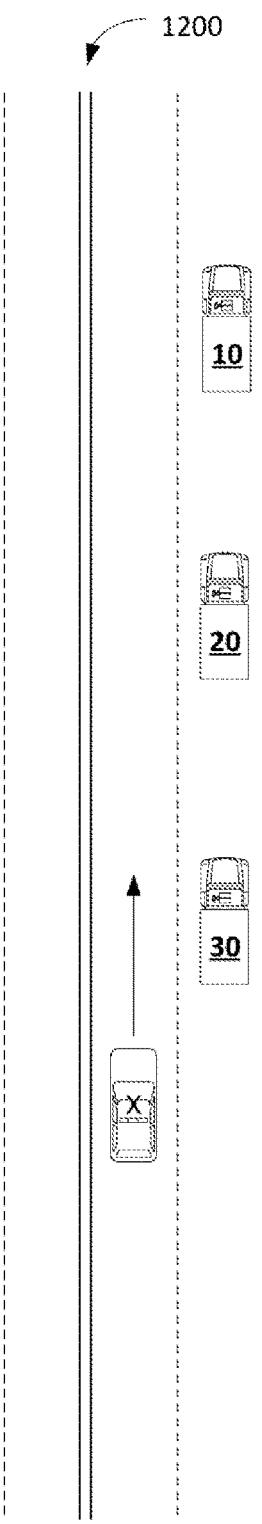

FIGS. 12a-12c depict a sequence of operation for dynamically adjusting a large platoon of three vehicles or more (only 3 are shown) in the high-speed lane 1203 of a two lane roadway 1200 of the previous Figures to accommodate a non-platooning high priority emergency vehicle X approaching the large platoon from behind, and in the same high-speed lane 1203 as the high-speed roadway lane 1203 of the large platoon.

In FIG. 12a, the rearward directed sensor 264 of the trailing vehicle 30 detects the presence of the emergency vehicle X and also detects the flashing rate of the safety lights of the emergency vehicle X as being about 14 Hz. The control 200, 300 of the trailing vehicle 30 therefore determines the safety vehicle X to be a high priority safety vehicle. The camera 245 of the leading vehicle 10 determines a configuration of the roadway 1200 as a two lane roadway 1200, and also that the platoon is in the high speed lane 1203 of the two lane roadway 1200. In FIG. 12b, the transceiver 250 in the trailing platooning vehicle 30 transmits a platoon control signal 1210 to the lead platooning vehicle 10 to move from the high speed lane 1203 to the low speed lane 1204. The transceiver 250 in the trailing platooning vehicle 30 also transmits a platoon control signal 1212 to the intermediate platooning vehicle 20 to move from the high speed lane 1203 to the low speed lane 1204. The transceiver may operate in the example embodiment to transmit increase in inter-vehicle distance data as emergency vehicle avoidance maneuver command data as the emergency vehicle avoidance maneuver command signal 1210, 1212 to the set of platooning vehicles that are not the first associated platooning vehicle for directing the set of platooning vehicles to increase the inter-vehicle distance between the platooning vehicles.

FIG. 12*b* shows the platoon in the high speed lane 1203 and beginning to move to the low speed lane 1204 to allow the emergency vehicle X to pass via the high speed lane 1203.

In FIG. 12*c*, the platoon is shown in the low speed lane 1204 and the emergency vehicle X being in the high speed lane 1203 having been vacated by the platoon and in the process of passing the platoon. In accordance with the example embodiment, the inter-vehicle distances between the vehicles of the large platoon is increased owing to the emergency vehicle being determined to be a high priority emergency vehicle. FIG. 12*c* shows the platoon comprising the set of platooning vehicles 10, 20, 30 of the example embodiment moved over to the right lane 1204 and having larger inter-vehicle spacing than was being performed while platooning in the high speed lane 1203 before the arrival of the high priority emergency vehicle X. This allows the emergency vehicle X to pass the platoon via the other lane 1203 of the roadway 1200 while the platooning vehicles may remain in the platoon, but also leaving a margin of safety being provided by the now-empty lane 1203. The increased inter-vehicle spacing also provides the opportunity for other non-platooning vehicles to make evasive moves or the like as may be necessary or desired given the combined presence of the high priority emergency vehicle in combination with the platooning vehicles on the roadway.

Figures 12D, 12E:
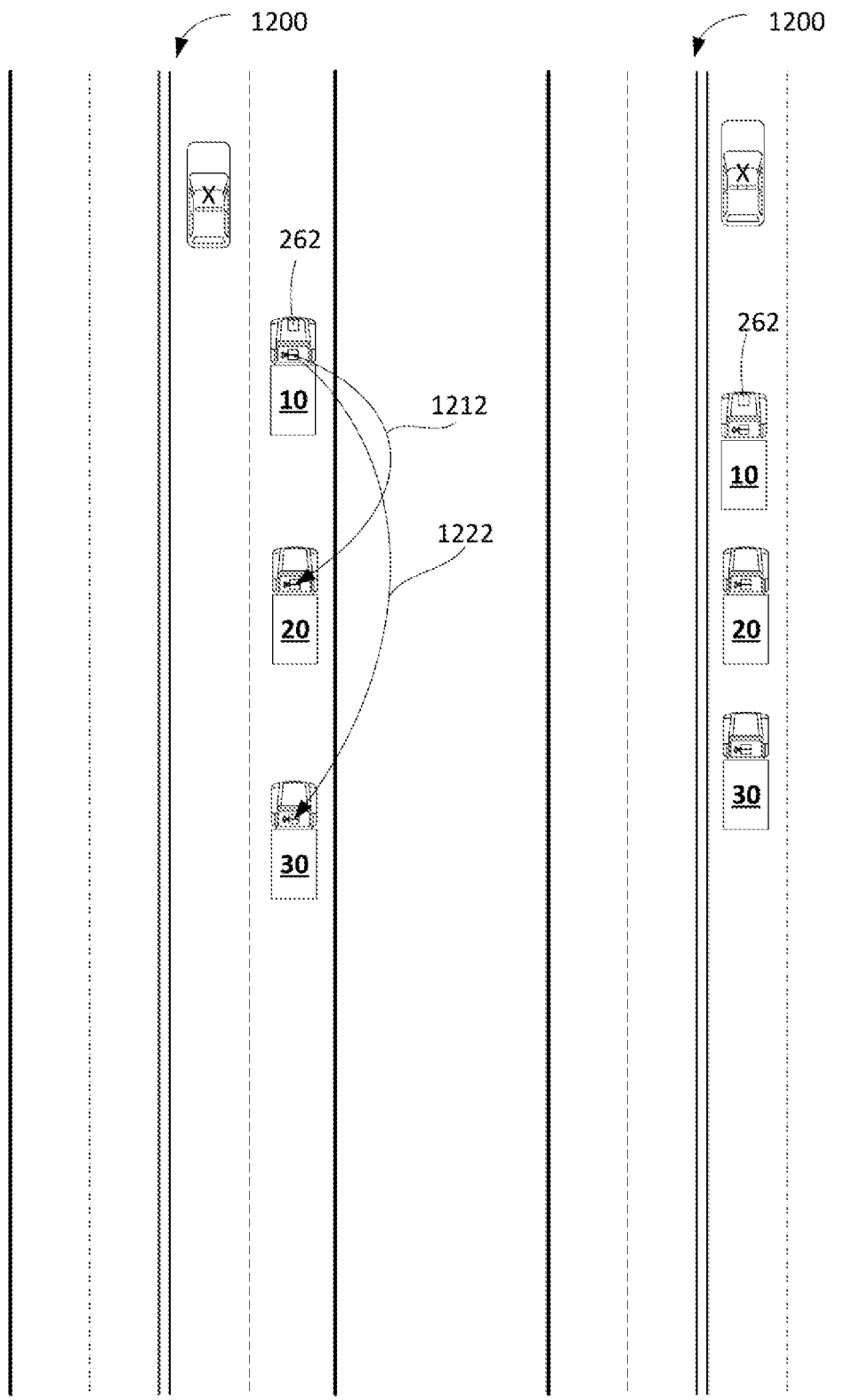

FIG. 12*d* shows the platoon comprising the set of platooning vehicles 10, 20, 30 of the example embodiment moved over to the right of the low speed lane 1204 and the emergency vehicle X executing the maneuver described above. This allows the emergency vehicle X to pass the platoon via the other lane 1203 of the roadway 1200 leaving a large margin of safety provided by the fully cleared lane 1203.

In FIG. 12*e*, the forward directed sensor 262 of the leading vehicle 10 detects the presence of the emergency vehicle X ahead of the platoon having successfully passed the platoon as shown in FIGS. 12*c* and 12*d*. The control 200, 300 of the leading vehicle 10 therefore determines the safety vehicle X no longer needs access to either of the lanes 1203 or 1204 of the roadway 1200. In FIG. 12*e* the transceiver 250 in the leading platooning vehicle 10 transmits a platoon control signal 1212 to the trailing platooning vehicle 20 to change lanes back to the high speed lane 1203. Similarly, the transceiver 250 in the leading platooning vehicle 10 transmits an equivalent platoon control signal 1222 to the trailing platooning vehicle 30 to change lanes back to the high speed lane 1203.

In accordance with a further example embodiment, the logic of the platoon control unit is executable by the processor to determine a quantity of emergency vehicles and, based on the determined quantity of emergency vehicles being two or more, determine platoon disband platoon disband data, wherein the platoon disband data is representative of disbanding of the platoon to be performed by the set of platooning vehicles. The transceiver transmits the platoon disband data as emergency vehicle avoidance maneuver command data as an emergency vehicle avoidance maneuver command signal to the set of platooning vehicles for directing the set of platooning vehicles to disband the platoon.

FIGS. 13*a*-13*f* depict a sequence of operation for dynamically adjusting a large platoon of three (3) or more vehicles in the high-speed lane of a two lane roadway 1300 to accommodate two (2) or more non-platooning high priority emergency vehicles approaching the large platoon from behind and in the same high-speed roadway lane as the large platoon.

Figure 13A:
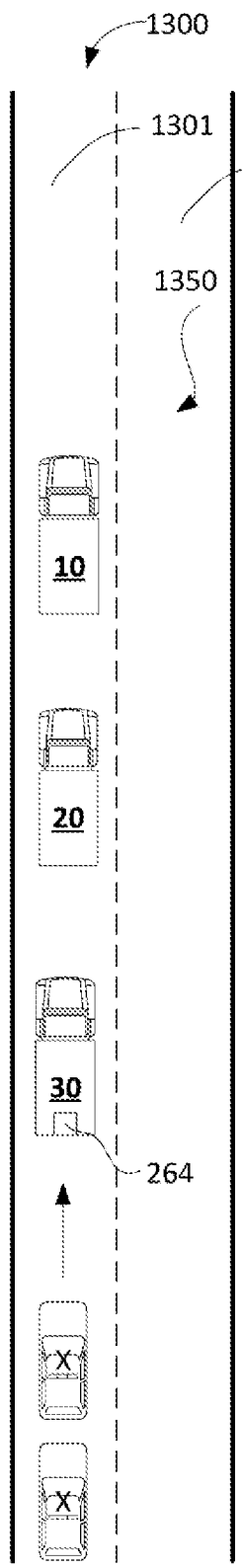

In FIG. 13*a*, the rearward directed sensor 264 of the trailing vehicle 30 detects the presence of the emergency vehicles X, X' and also detects the flashing rate of the safety lights of one or more of the emergency vehicles X, X' as being about 14 Hz. The control 200, 300 of the trailing vehicle 30 therefore determines that one or more of the safety vehicles X, X' is/are high priority safety vehicle(s). The camera 245 of the leading vehicle 10 determines a configuration of the roadway 1300 as a two lane roadway 1300, and also that the platoon is in the high speed lane 1301 of the two lane roadway 1300.

Figure 13B:
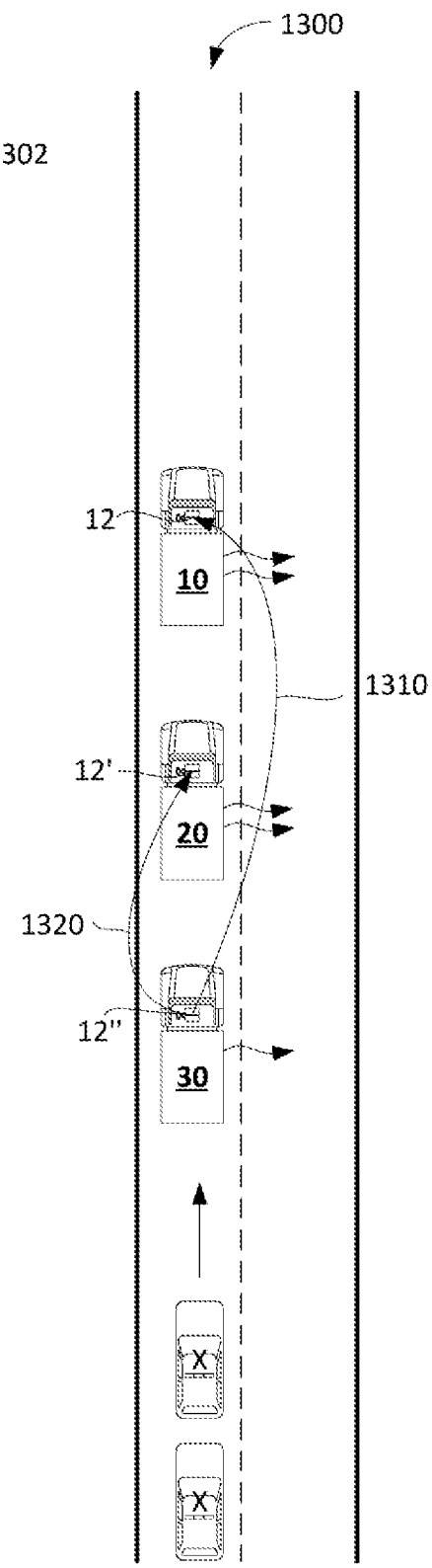

In FIG. 13*b*, the transceiver 250 in the trailing platooning vehicle 30 transmits a first platoon control signal 1310 to the lead platooning vehicle 10 to change lanes to the low speed lane 1302. The transceiver 250 in the trailing platooning vehicle 30 also transmits a second platoon control signal 1320 to the intermediate platooning vehicle 20 to change lanes to the low speed lane 1302 together with the leading vehicle as a sub-platoon 1352, wherein the large original platoon 1350 is to be divided into two (2) separate and smaller platoon halves 1352, 1354 as denoted in the drawing FIG. 13*b* by the single and double arrow notations with the larger half being in the lead when the number of vehicles travelling in the original larger platoon 1350 is an odd number. If the number of vehicles travelling in the original larger platoon 1350 is an even number, the original platoon 1350 is divided in the example embodiment into two (2) separate sub-platoons 1352, 1354 of equal size. The transceiver may transmit platoon disband data as emergency vehicle avoidance maneuver command data as an emergency vehicle avoidance maneuver command signal 1310, 1320 to the set of platooning vehicles for directing the set of platooning vehicles to disband the platoon.

Figure 13C:
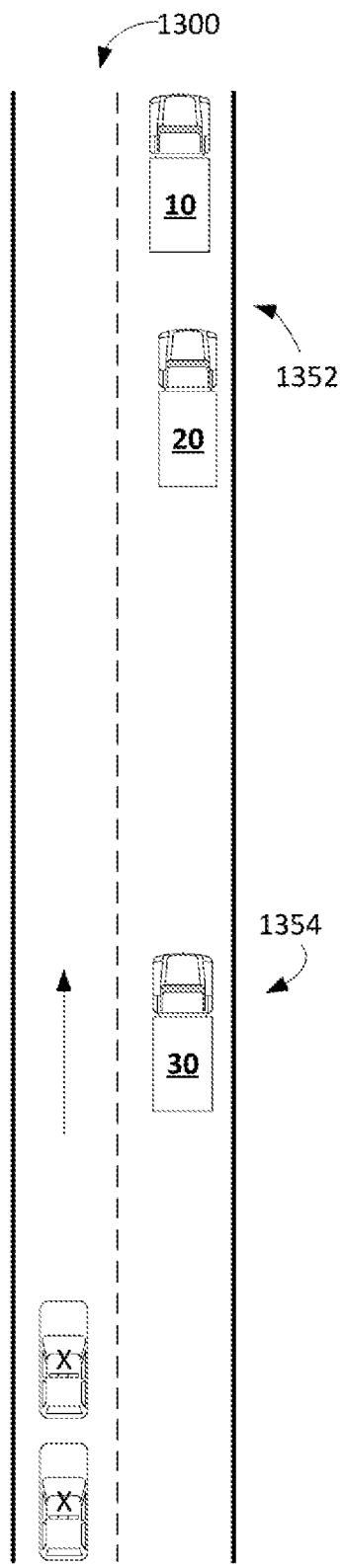

FIG. 13*c* shows the platoons 1352, 1354 moved over into the low speed lane 1302 after successfully executing the lane shift maneuver. This allows the emergency vehicles X, X' to pass via the now-empty high speed lane 1301 as shown in FIG. 13*d*.

In FIG. 13*e*, the forward directed sensor 262 of the leading vehicle 10 detects the presence of the emergency vehicles X, X' ahead of the lead sub-platoon 1352 having successfully passed both sub-platoons 1352, 1354 as shown in FIGS. 13*d* and 13*e*. The control 200, 300 of the leading vehicle 10 therefore determines the safety vehicles X, X' no longer need access to the high speed lane 1301.

In FIG. 13*e* the transceiver 250 in the leading platooning vehicle 10 transmits a platoon control signal 1330 to the trailing platooning vehicle 20 to change lanes back to the high speed lane 1301 and a similar signal 1322 to the intermediate vehicle 20 to change lanes back to the high speed lane 1301. In this embodiment the signals 1322, 1330 sent to the intermediate and trailing vehicles 20, 30, respectively, also communicate command instructions to reform the original large platoon conformation 1352 as shown and as denoted in the drawing Figure by the single arrow notation.

FIG. 13*f* shows the platoon moved over back into the high speed lane 1301 after successfully executing the lane shift maneuver. The above protocol allows a high urgency emergency vehicle X to maintain travel in a high speed lane 1301 of a two lane roadway 1300 while passing a platoon previously traveling in the high speed lane 1301 of the two lane roadway 1300.

In accordance with a further example embodiment, the roadway configuration sensor unit is operable to determine a configuration of the associated roadway as being a multiple lane highway in each direction, and to generate multiple lane highway roadway configuration data as the roadway configuration data, wherein the multiple lane highway roadway configuration data is representative of the determined configuration of the associated roadway as being a multiple lane highway. The logic of the platoon control unit is executable by the processor to use the low priority emergency vehicle status data, the roadway configuration data, and the emergency vehicle present behind data to determine steer platoon to lane not occupied by emergency vehicle and maintain speed maneuver data as emergency vehicle avoidance maneuver command data representative of an emergency vehicle avoidance maneuver for directing the set of platooning vehicles away from the path of the associated emergency vehicle on the associated roadway by moving the set of platooning vehicles into a lane of the multiple lane highway not occupied by the emergency vehicle and to maintain speed of the platoon. The transceiver transmits the steer platoon to lane not occupied by emergency vehicle and maintain speed maneuver data as emergency vehicle avoidance maneuver command data as an emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles into a lane of the multiple lane highway not occupied by the emergency vehicle and to maintain speed of the platoon.

FIGS. 14*a*-14*f* depict a sequence of operation for dynamically adjusting a large platoon comprising the set of platooning vehicles including a lead platooning vehicle 10, an intermediate platooning vehicle 20, and a following platooning vehicle 30 on a two lane roadway 1400 to accommodate a non-platooning low priority emergency vehicle X approaching the large platoon from behind and in the same high-speed roadway lane 1401 as the large platoon. The roadway 1400 also includes a low speed lane 1402 as shown.

Figures 14A, 14B, 14C:
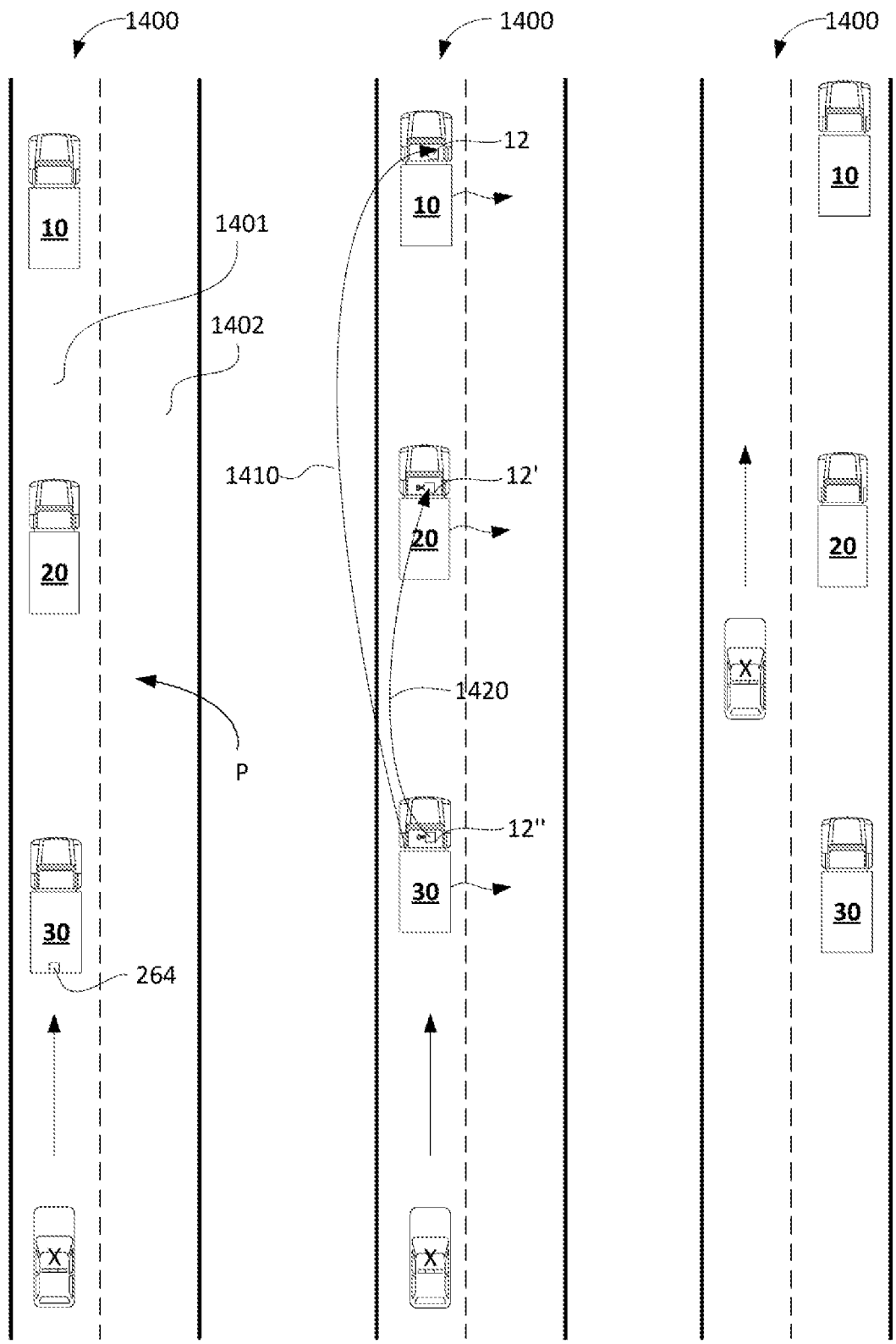
FIGS. 14a-14f depict a sequence of operations for dynamically adjusting a large platoon in a high speed lane of a multi-lane roadway having plural lanes in each direction to accommodate a low priority non-platooning emergency vehicle approaching the large platoon from behind and in the high-speed lane of the multi-lane roadway.

In FIG. 14*a*, the rearward directed sensor 264 of the trailing vehicle 30 detects the presence of the emergency vehicle X and also detects the flashing rate of the safety lights of the emergency vehicle X as being about 10 Hz. The control 200, 300 of the trailing vehicle 30 therefore determines the safety vehicle X to be a low priority safety vehicle. The camera 245 of the leading vehicle 10 determines a configuration of the roadway 1400 as a two lane roadway 1400, and also that the platoon is in the high speed lane 1401 of the two lane roadway 1400.

In FIG. 14*b*, the transceiver 250 in the trailing platooning vehicle 30 transmits a platoon control signal 1410 to the lead platooning vehicle 10 and a similar platoon control signal 1420 to the intermediate platooning vehicle 20 to change lanes to the low speed lane 1402. The transceiver may transmit steer platoon to lane not occupied by emergency vehicle and maintain speed maneuver data as emergency vehicle avoidance maneuver command data as the emergency vehicle avoidance maneuver command signal 1410, 1420 to the set of platooning vehicles that are not the first associated platooning vehicle for directing the set of platooning vehicles away from a path of the associated emergency vehicle on the associated roadway by moving the set of platooning vehicles into a lane of the multiple lane highway not occupied by the emergency vehicle and to maintain speed of the platoon.

FIG. 14*c* shows the platoon moved over into the low speed lane 1402 after successfully executing the lane shift maneuver. This allows the emergency vehicle X to pass via the now-empty high speed lane 1401.

Figure 14D:
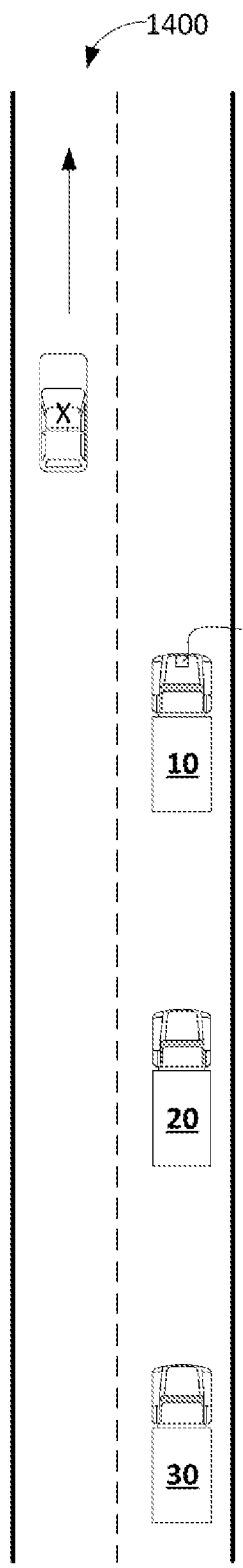

In FIG. 14*d*, the forward directed sensor 262 of the leading vehicle 10 detects the presence of the emergency vehicle X ahead of the platoon having successfully passed the platoon as shown in FIGS. 14*c* and 14*d*. The control 200, 300 of the leading vehicle 10 therefore determines the safety vehicle X no longer needs access to the high speed lane 1401.

Figure 14E:
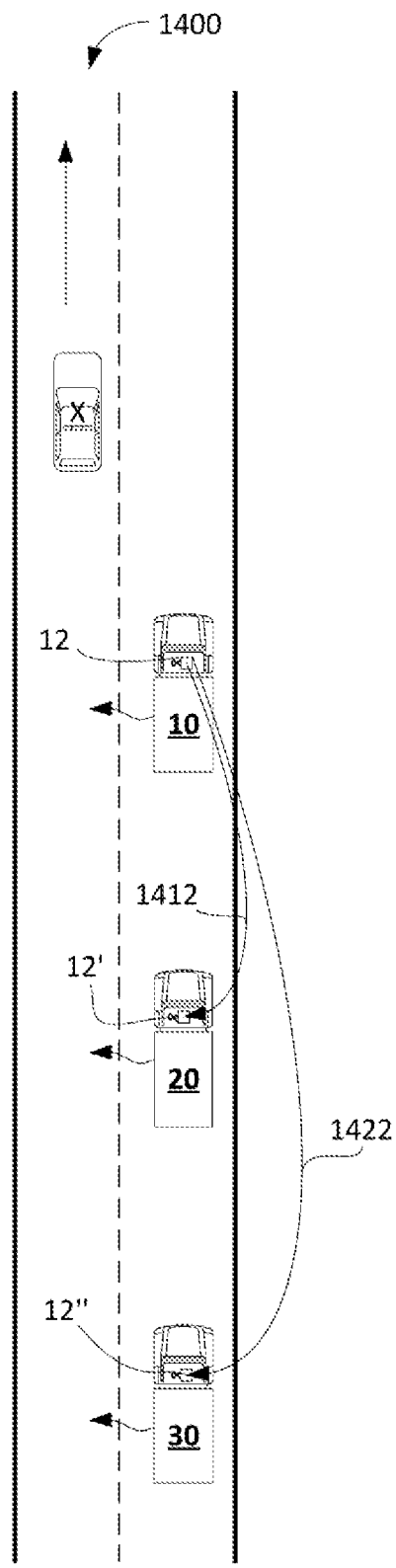

In FIG. 14*e* the transceiver 250 in the leading platooning vehicle 10 transmits a platoon control signal 1412 to the intermediate platooning vehicle 20 and a similar platoon control signal 1422 to the trailing platooning vehicle 30 to change lanes back to the high speed lane 1401.

Figure 14F:
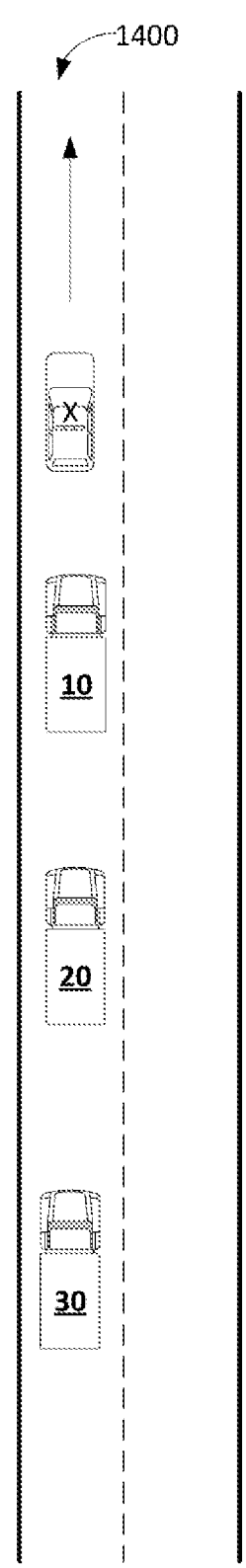

FIG. 14*f* shows the platoon moved over back into the high speed lane 1401 after successfully executing the lane shift maneuver. The above protocol allows a low priority or urgency emergency vehicle X to maintain travel in a high speed lane 1401 of a two lane roadway 1400 while passing a platoon previously traveling in the high speed lane 1401 of the two lane roadway 1400.

FIGS. 15*a*-15*f* depict a sequence of operation for dynamically adjusting a large platoon comprising the set of platooning vehicles including a lead platooning vehicle 10, an intermediate platooning vehicle 20, and a following platooning vehicle 30 on a two lane roadway 1500 to accommodate a non-platooning low priority emergency vehicle X approaching the large platoon from behind and in the same low-speed roadway lane 1502 as the large platoon. The roadway 1500 also includes a high speed lane 1501 as shown.

Figure 15A:
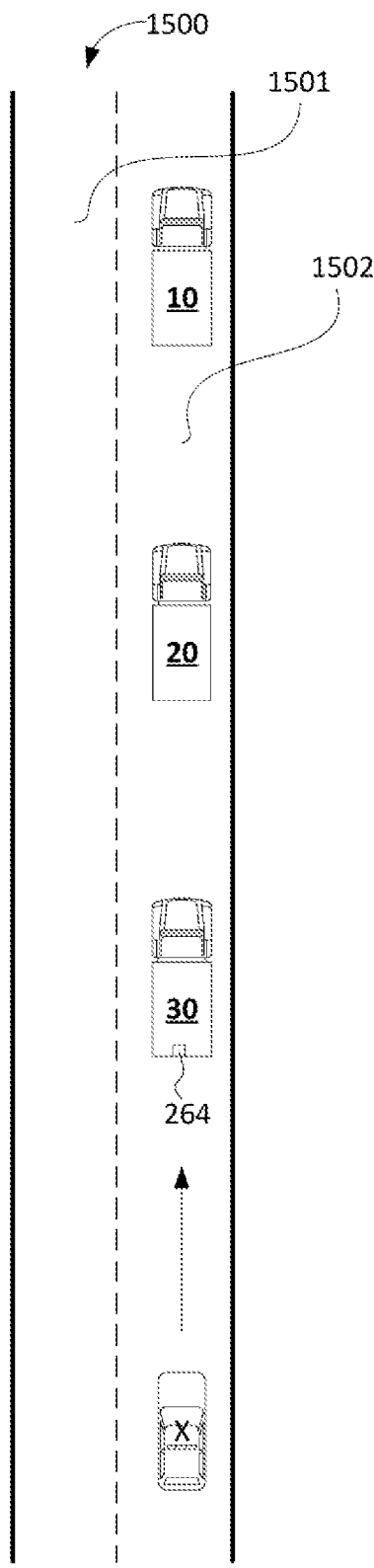
FIGS. 15a-15f depict a sequence of operations for dynamically adjusting a large platoon in a low speed lane of a multi-lane roadway having plural lanes in each direction to accommodate a low priority non-platooning emergency vehicle approaching the large platoon from behind and in the low-speed lane of the multi-lane roadway.

In FIG. 15*a*, the rearward directed sensor 264 of the trailing vehicle 30 detects the presence of the emergency vehicle X and also detects the flashing rate of the safety lights of the emergency vehicle X as being about 10 Hz. The control 200, 300 of the trailing vehicle 30 therefore determines the safety vehicle X to be a low priority safety vehicle. The camera 245 of the leading vehicle 10 determines a configuration of the roadway 1500 as a two lane roadway 1500, and also that the platoon is in the low speed lane 1502 of the two lane roadway 1500.

Figure 15B:
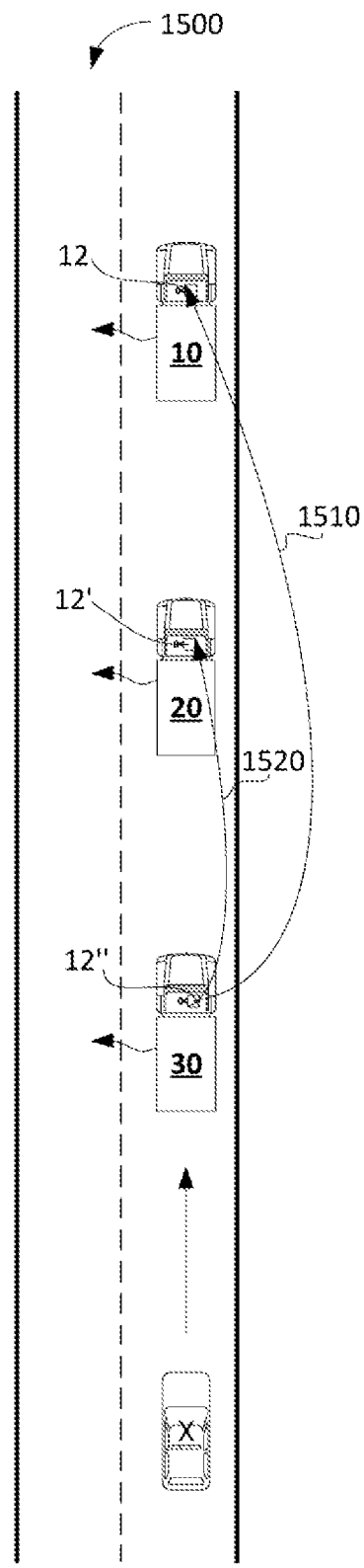

In FIG. 15*b*, the transceiver 250 in the trailing platooning vehicle 30 transmits a platoon control signal 1510 to the lead platooning vehicle 10 and a similar platoon control signal 1520 to the intermediate platooning vehicle 20 to change lanes to the high speed lane 1501.

Figure 15C:
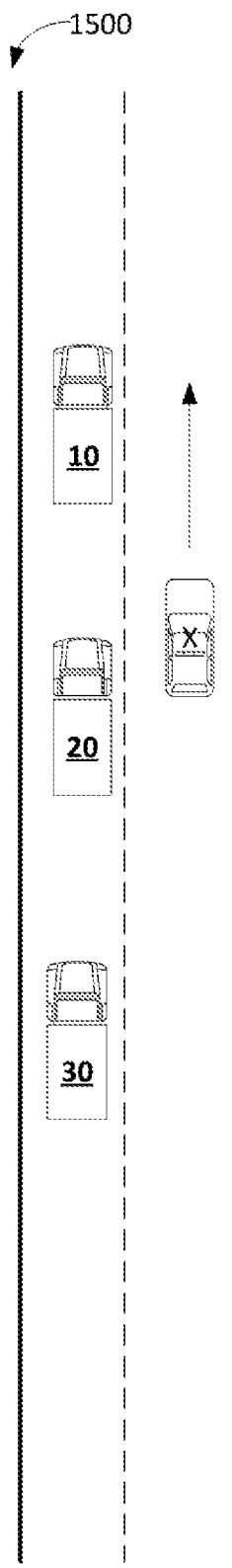

FIG. 15*c* shows the platoon moved over into the high speed lane 1501 after successfully executing the lane shift maneuver. This allows the emergency vehicle X to pass via the now-empty low speed lane 1502.

Figure 15D:
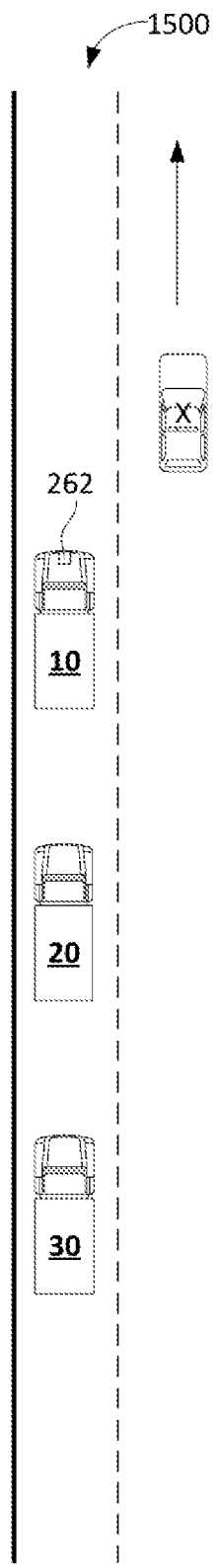

In FIG. 15*d*, the forward directed sensor 262 of the leading vehicle 10 detects the presence of the emergency vehicle X ahead of the platoon having successfully passed the platoon as shown in FIGS. 15*c* and 15*d*. The control 200, 300 of the leading vehicle 10 therefore determines the safety vehicle X no longer needs access to the low speed lane 1502.

Figure 15E:
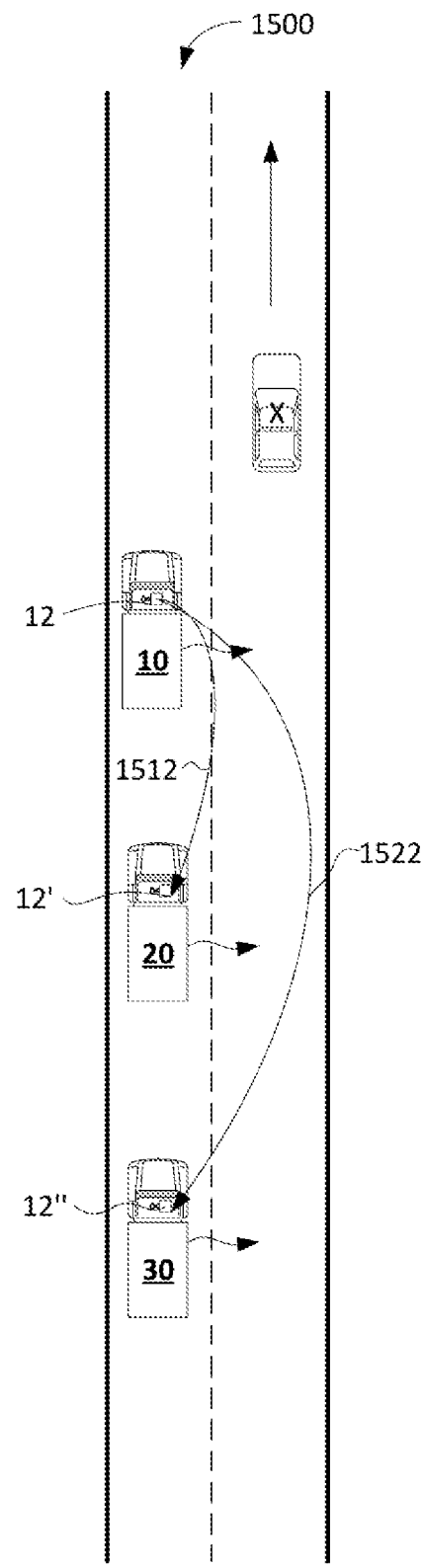

In FIG. 15*e* the transceiver 250 in the leading platooning vehicle 10 transmits a platoon control signal 1512 to the intermediate platooning vehicle 20 and a similar platoon control signal 1522 to the trailing platooning vehicle 30 to change lanes back to the low speed lane 1502.

Figure 15F:
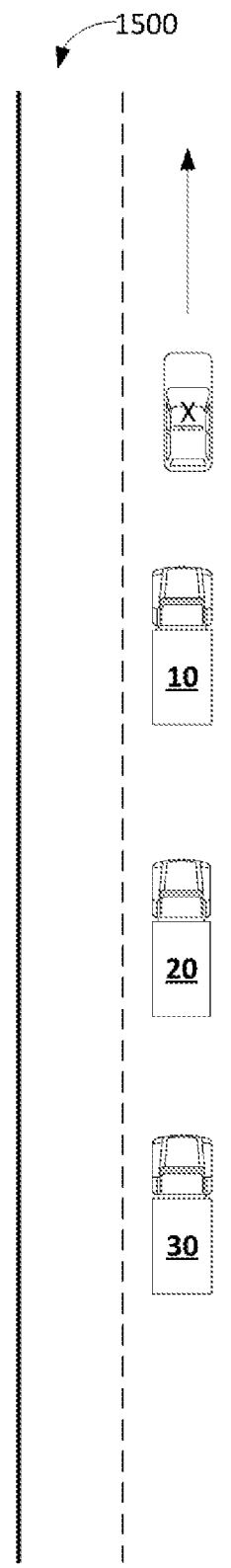

FIG. 15*f* shows the platoon moved over back into the low speed lane 1502 after successfully executing the lane shift maneuver. The above protocol allows a low priority or urgency emergency vehicle X to maintain travel in a low speed lane 1502 of a two lane roadway 1500 while passing a platoon previously traveling in the low speed lane 1502 of the two lane roadway 1500.

In the event of the platoon travelling on a multiple lane highway in each direction (greater or equal to 2 lanes in each direction) with a median and encountering any type of emergency vehicle including both high and low priority emergency vehicles headed towards the platoon from ahead, the platooning vehicles need not perform any avoidance maneuvers. This will be described below with reference for example to FIGS. 16*a*-16*c*.

Figures 16A, 16B, 16C:
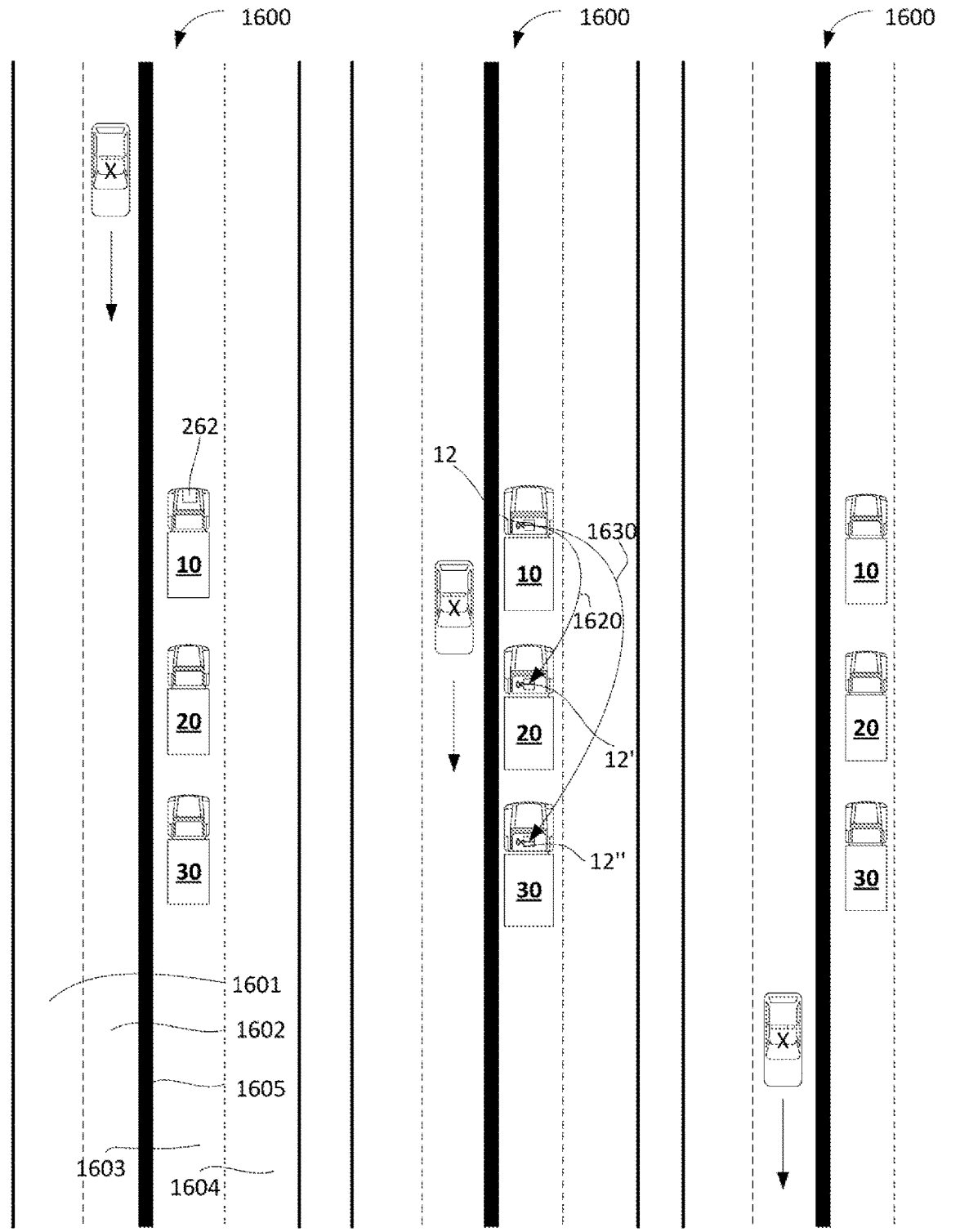
FIGS. 16a-16c depict a sequence of operations for dynamically adjusting a large platoon in a high speed lane of a highway roadway divided by a physical median and having two or more lanes in each direction to accommodate a non-platooning emergency vehicle travelling towards the large platoon from ahead and in the high-speed lane of the opposite direction of the median-divided highway roadway.

FIGS. 16*a*-16*c* depict a sequence of operation for dynamically adjusting a large platoon comprising a set of vehicles 10, 20, 30 in a high speed lane 1603 of a divided highway roadway 1600 having lane pairs 1601, 1602 and 1603, 1604 in each direction to accommodate a non-platooning emergency vehicle approaching the large platoon from ahead and in the high-speed lane 1602 of the opposite direction of the divided highway roadway. In FIGS. 16*a*-16*c* the pairs of lanes 1601, 1602 and 1603, 1604 in each direction are separate by a physical median strip 1605 such as a concrete wall or the like, making it physically impossible for the platoon to pass into the lanes 1601, 1602 of the emergency vehicle, and also making it physically impossible for the emergency vehicle to pass into the lanes 1603, 1604 of the platoon.

In FIG. 16*a*, the forward directed sensor 262 of the leading vehicle 10 detects the presence of the emergency vehicle X and may also detect the flashing rate of the safety lights of the emergency vehicle X as desired. The control 200, 300 and the camera 245 of the leading vehicle 10 determines a configuration of the roadway 1600 as a divided highway roadway 1600 having pairs of lanes 1601, 1602 and 1603, 1604 in each direction separate by a physical median strip 1605 such as a concrete wall or the like, making it physically impossible for the platoon to pass into the lanes 1601, 1602 of the emergency vehicle, and also making it physically impossible for the emergency vehicle to pass into the lanes 1603, 1604 of the platoon.

In FIG. 16*b*, the transceiver 250 in the leading platooning vehicle 10 transmits a platoon control signal 1620 to the intermediate platooning vehicle 20 and a similar platoon control signal 1630 to the trailing platooning vehicle 30 to maintain lane in the high speed lane 1603 or to maintain lane in the low speed lane 1604.

FIG. 16*b* shows the platoon in the high speed lane 1603 allowing the emergency vehicle X to safely pass via the high speed lane 1602 opposite of the median strip 1605.

In FIG. 16*c*, the rearward directed sensor 264 of the trailing vehicle 30 may detect the presence of the emergency vehicle X well behind the platoon having successfully passed the platoon as shown in FIGS. 16*b* and 16*c*. The control 200, 300 of the trailing vehicle 10 therefore determines the safety vehicle X is no longer adjacent to but on opposite sides of the median strip relative to the platoon.

The above protocol allows an emergency vehicle X to maintain travel in a high speed lane 1602 of a divided highway 1600 while passing a platoon traveling in the high speed lane 1603 of the divided highway 1600, but on opposite sides of a physical median strip.

In the event of the platoon travelling on a multiple lane highway in each direction (greater or equal to 2 lanes in each direction) with a median and encountering any type of emergency vehicle including both high and low priority emergency vehicles headed towards the platoon from either ahead or behind, the platooning vehicles move to lane not occupied by emergency vehicle and reduce their respective speeds. This will be described below with reference for example to FIGS. 17*a*-17*e*. In the event of a large platoon having 3 or more vehicles travelling on a multiple lane highway in each direction (greater or equal to 2 lanes in each direction) with a median and encountering a high priority emergency vehicle headed towards the platoon from behind, the platooning vehicles move to lane not occupied by emergency vehicle, reduce their respective speeds, and increase their respective inter-vehicle distances. This will also be described below with reference for example to FIGS. 17*a*-17*e*.

Figures 17A, 17B, 17C:
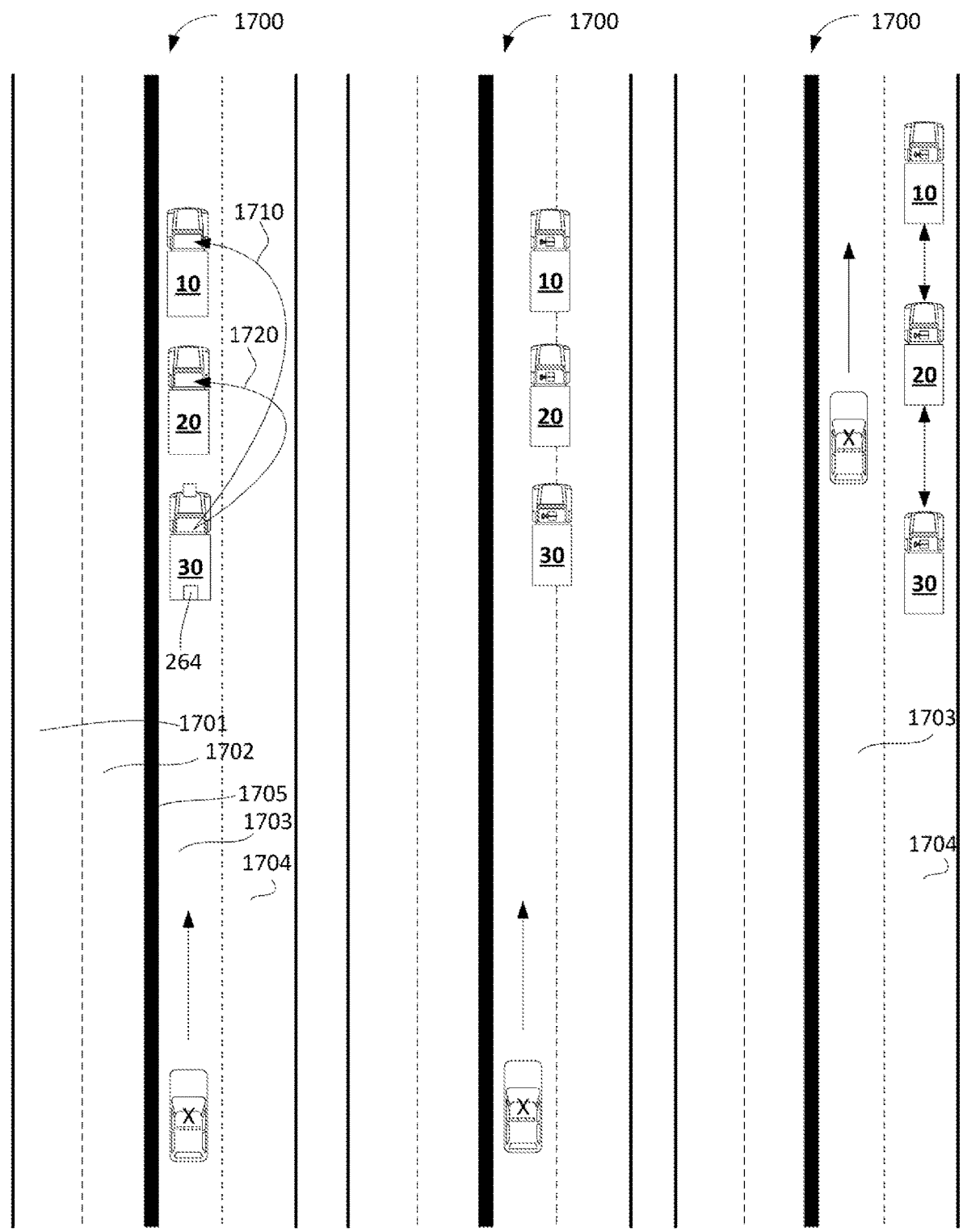
FIGS. 17a-17e depict a sequence of operations for dynamically adjusting a large platoon in a high speed lane of a highway roadway divided by a physical median having two or more lanes in each direction to accommodate a non-platooning emergency vehicle approaching the large platoon from behind and in the same high-speed lane of the median-divided highway roadway as the platoon.

FIGS. 17*a*-17*c* depict a sequence of operation for dynamically adjusting a large platoon of three vehicles or more (only 3 are shown) in the high-speed lane 1703 of a divided highway roadway 1700 having lane pairs 1701, 1702 and 1703, 1704 in each direction to accommodate a non-platooning emergency vehicle approaching the large platoon from behind and in the high-speed lane 1703 of the divided highway roadway. In FIGS. 17*a*-17*c* the pairs of lanes 1701, 1702 and 1703, 1704 in each direction are separate by a physical median strip 1705 such as a concrete wall or the like, making it physically impossible for either the emergency vehicle or the platoon to pass into the lanes 1701, 1702 of the divided highway roadway 1700.

In FIG. 17*a*, the rearward directed sensor 264 of the trailing vehicle 30 detects the presence of the emergency vehicle X and also detects the flashing rate of the safety lights of the emergency vehicle X as being about 14 Hz. The control 200, 300 of the trailing vehicle 30 therefore determines the safety vehicle X to be a high priority safety vehicle. The camera 245 of the leading vehicle 10 determines a configuration of the roadway 1700 as a divided highway roadway 1700, and also that the platoon is in the high speed lane 1703 of the divided highway roadway 1700. In FIG. 17*b*, the transceiver 250 in the trailing platooning vehicle 30 transmits a platoon control signal 1710 to the lead platooning vehicle 10 to move from the high speed lane 1703 to the low speed lane 1704. The transceiver 250 in the trailing platooning vehicle 30 also transmits a platoon control signal 1720 to the intermediate platooning vehicle 20 to move from the high speed lane 1703 to the low speed lane 1704, and also to increase its inter-vehicle distance relative to the leading vehicle 10. The trailing vehicle 30 also adjusts its inter-vehicle distance control parameters relative to the intermediate vehicle in response to the determined road configuration and emergency vehicle types.

FIG. 17*b* shows the platoon in the high speed lane 1703 and beginning to move to the low speed lane 1704 to allow the emergency vehicle X to pass via the high speed lane 1703.

In FIG. 17*c*, the large platoon is shown in the low speed lane 1704 in an increased inter-vehicle spacing conformation relative to the inter-vehicle spacing conformation while travelling normally in the high speed lane 1703, and the emergency vehicle X being in the high speed lane 1703 having been vacated by the platoon and in the process of passing the large platoon. In accordance with the example embodiment, the inter-vehicle distances between the vehicles of the large platoon is increased owing to the emergency vehicle being determined to be a high priority emergency vehicle. FIG. 17c shows the platoon comprising the set of platooning vehicles 10, 20, 30 of the example embodiment moved over to the right lane 1704 and having larger inter-vehicle spacing than was being performed while platooning in the high speed lane 1403 before the arrival of the high priority emergency vehicle X. This allows the emergency vehicle X to pass the platoon via the other lane 1703 of the roadway 1700 while the platooning vehicles may remain in the platoon, but also leaving a margin of safety being provided by the now-empty lane 1703. The increased inter-vehicle spacing also provides the opportunity for other non-platooning vehicles to make evasive maneuvers or the like as may be necessary or desired given the combined presence of the high priority emergency vehicle in combination with the platooning vehicles on the roadway.

Figure 17D:
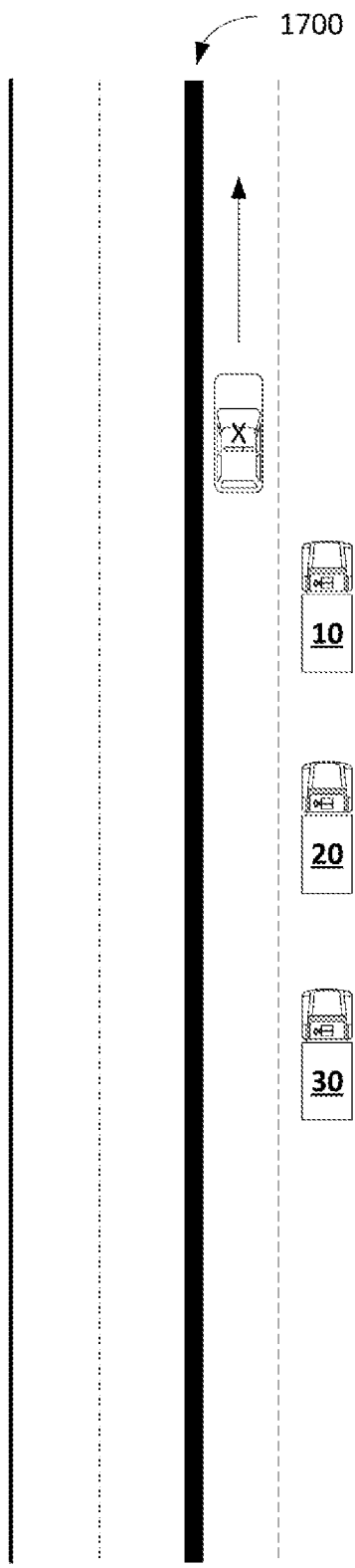

FIG. 17d shows the platoon comprising the set of platooning vehicles 10, 20, 30 of the example embodiment moved over to the right of the low speed lane 1704 and the emergency vehicle X executing the maneuver described above. This allows the emergency vehicle X to pass the platoon via the other lane 1703 of the roadway 1700 leaving a large margin of safety provided by the fully cleared lane 1703.

Figure 17E:
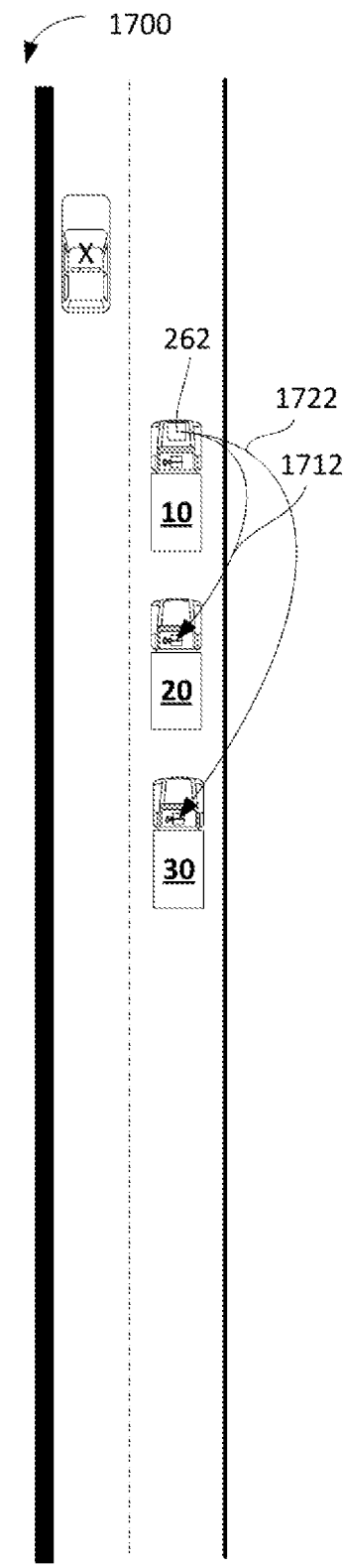

In FIG. 17e, the forward directed sensor 262 of the leading vehicle 10 detects the presence of the emergency vehicle X ahead of the platoon having successfully passed the platoon as shown in FIGS. 17c and 17d. The control 200, 300 of the leading vehicle 10 therefore determines the safety vehicle X no longer needs access to either of the lanes 1703, 1704 of the roadway 1200. In FIG. 17e the transceiver 250 in the leading platooning vehicle 10 transmits a platoon control signal 1712 to the trailing platooning vehicle 20 to change lanes back to the high speed lane 1703. Similarly, the transceiver 250 in the leading platooning vehicle 10 transmits an equivalent platoon control signal 1712 to the trailing platooning vehicle 30 to change lanes back to the high speed lane 1703.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A system for dynamically controlling a set of platooning vehicles travelling on an associated roadway to respond to a presence of a non-platooning emergency vehicle approaching the set of platooning vehicles on the associated roadway, the system comprising:
a first platoon control unit configured to be disposed in a first associated platooning vehicle of the set of platooning vehicles, the first platoon control unit comprising:
a processor;
a non-transient memory device operatively coupled with the processor; and
logic stored in the non-transient memory and executable by the processor to control a platooning operation of the first associated platooning vehicle;
a first emergency vehicle sensor unit operatively coupled with the first platoon control unit and being configured to be disposed in the first associated platooning vehicle, the first emergency vehicle sensor unit being operable to:
sense a presence of an associated emergency vehicle near to the first associated platooning vehicle;
based on sensing the presence of the associated emergency vehicle near to the first associated platooning vehicle:
determine a position of the emergency vehicle relative to the first associated platooning vehicle;
generate emergency vehicle position data representative of the determined position of the associated emergency vehicle relative to the first associated platooning vehicle;
determine a status of the associated emergency vehicle; and
generate emergency vehicle status data representative of the determined status of the associated emergency vehicle;
a roadway configuration sensor unit operatively coupled with the first platoon control unit and being configured to be disposed in the first associated platooning vehicle, the roadway configuration sensor unit being operable to:
sense the associated roadway;
determine a configuration of the associated roadway; and
generate roadway configuration data representative of the determined configuration of the associated roadway;
a first transceiver operatively coupled with the first platoon control unit and being configured to be disposed in the first associated platooning vehicle, the first transceiver being operable to receive signals from the set of platooning vehicles that are not the first associated platooning vehicle, and to transmit signals to the set of platooning vehicles that are not the first associated platooning vehicle,
wherein the logic of the platoon control unit is executable by the processor to:
based on the first emergency vehicle sensor unit sensing the presence of the associated emergency vehicle near to the first associated platooning vehicle:
use the emergency vehicle position data, the emergency vehicle status data, and the roadway configuration data to determine emergency vehicle avoidance maneuver command data representative of an emergency vehicle avoidance maneuver for directing the set of platooning vehicles away from a path of the associated emergency vehicle on the associated roadway,
wherein the first transceiver operates to transmit the emergency vehicle avoidance maneuver command data as an emergency vehicle avoidance maneuver command signal to the set of platooning vehicles that are not the first associated platooning vehicle for directing the set of platooning vehicles away from a path of the associated emergency vehicle on the associated roadway.

2. The system according to claim 1, wherein:
the emergency vehicle sensor unit comprises:
a forward directed sensor operatively coupled with the platoon control unit and being configured to be disposed on a front portion of the first associated platooning vehicle, the forward directed sensor being operable to:
sense from the front of the first associated platooning vehicle emergency light flashes emanating from the associated emergency vehicle; and generate emergency vehicle present ahead data as the emergency vehicle position data based on the emergency light flashes sensed as being from ahead of the first associated platooning vehicle;

a rearward directed sensor operatively coupled with the platoon control unit and being configured to be disposed on a rear portion of the first associated platooning vehicle, the rearward directed sensor being operable to:

sense from the rear of the first associated platooning vehicle the emergency light flashes emanating from the associated emergency vehicle; and generate emergency vehicle present behind data as the emergency vehicle position data based on the emergency light flashes sensed as being from behind the first associated platooning vehicle; and the logic of the platoon control unit is executable by the processor to:

based on the first emergency vehicle sensor unit sensing the presence of the associated emergency vehicle near to the first associated platooning vehicle:

use the emergency vehicle status data, the roadway configuration data, and the emergency vehicle present ahead or behind data to determine the emergency vehicle avoidance maneuver command data representative of the emergency vehicle avoidance maneuver for directing the set of platooning vehicles away from the path of the associated emergency vehicle on the associated roadway.

3. The system according to claim 2, wherein:

the emergency vehicle sensor unit comprises:

a timer operatively coupled with the platoon control unit and being configured to:

determine a flash frequency of the sensed emergency light flashes of the associated emergency vehicle; and generate high priority emergency vehicle status data as the emergency vehicle status data based on the determined flash frequency being about 14 Hz or generate low priority emergency vehicle status data as the emergency vehicle status data based on the determined flash frequency being about 10 Hz, the high priority emergency vehicle status data being representative of a status of the associated emergency vehicle being a high priority emergency vehicle and the low priority emergency vehicle status data being representative of a status of the associated emergency vehicle being a low priority special purpose vehicle; and the logic of the platoon control unit is executable by the processor to:

based on the first emergency vehicle sensor unit sensing the presence of the associated emergency vehicle near to the first associated platooning vehicle:

use the high or low priority emergency vehicle status data, the roadway configuration data, and the emergency vehicle present ahead or behind data to determine the emergency vehicle avoidance maneuver command data representative of the emergency vehicle avoidance maneuver for directing the set of platooning vehicles away from the path of the associated emergency vehicle on the associated roadway.

4. The system according to claim 3, wherein:

the roadway configuration sensor unit is operable to:

determine a configuration of the associated roadway as being a single lane highway without a median; and generate single lane highway roadway configuration data as the roadway configuration data, the single lane highway roadway configuration data being representative of the determined configuration of the associated roadway as being a single lane highway without a median;

the logic of the platoon control unit is executable by the processor to:

use the high priority emergency vehicle status data, the single lane highway roadway configuration data, and the emergency vehicle present ahead or behind data to determine steer platoon right and stop maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles as far right in the roadway or into a shoulder of the associated roadway and to come to a stop; and the first transceiver operates to transmit the steer platoon right and stop maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to come to a stop.

5. The system according to claim 3, wherein:

the roadway configuration sensor unit is operable to:

determine a configuration of the associated roadway as being a single lane highway without a median; and generate single lane highway roadway configuration data as the roadway configuration data, the single lane highway roadway configuration data being representative of the determined configuration of the associated roadway as being a single lane highway without a median;

the logic of the platoon control unit is executable by the processor to:

use the low priority emergency vehicle status data, the single lane highway roadway configuration data, and the emergency vehicle present ahead data to determine steer platoon right and maintain speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles as far right in the roadway or into a shoulder of the associated roadway and to maintain speed of the platoon; and the first transceiver operates to transmit the steer platoon right and maintain speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to maintain speed of the platoon.

6. The system according to claim 3, wherein:
the roadway configuration sensor unit is operable to:
   determine a configuration of the associated roadway as being a single lane highway without a median; and
   generate single lane highway roadway configuration data as the roadway configuration data, the single lane highway roadway configuration data being representative of the determined configuration of the associated roadway as being a single lane highway without a median;
the logic of the platoon control unit is executable by the processor to:
   use the low priority emergency vehicle status data, the single lane highway roadway configuration data, and the emergency vehicle present behind data to determine steer platoon right and reduce speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles as far right in the roadway or into a shoulder of the associated roadway and to reduce speed of the platoon; and
the first transceiver operates to transmit the steer platoon right and reduce speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to reduce speed of the platoon.

7. The system according to claim 3, wherein:
the roadway configuration sensor unit is operable to:
   determine a configuration of the associated roadway as being a multiple lane highway in each direction without a median; and
   generate multiple lane highway roadway configuration data as the roadway configuration data, the multiple lane highway roadway configuration data being representative of the determined configuration of the associated roadway as being a multiple lane highway without a median;
the logic of the platoon control unit is executable by the processor to:
   use the high priority emergency vehicle status data, the roadway configuration data, and the emergency vehicle present ahead data to determine steer platoon from leftmost lane and reduce speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles away from the leftmost lane of the multiple lane highway and to reduce speed of the platoon; and
the first transceiver operates to transmit the steer platoon from leftmost lane and reduce speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles away from the leftmost lane of the multiple lane highway and to reduce speed of the platoon.

8. The system according to claim 3, wherein:
the roadway configuration sensor unit is operable to:
   determine a configuration of the associated roadway as being a multiple lane highway in each direction; and
   generate multiple lane highway roadway configuration data as the roadway configuration data, the multiple lane highway roadway configuration data being representative of the determined configuration of the associated roadway as being a multiple lane highway;
the logic of the platoon control unit is executable by the processor to:
   use the high priority emergency vehicle status data, the roadway configuration data, and the emergency vehicle present behind data to determine steer platoon to lane not occupied by emergency vehicle and reduce speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles into a lane of the multiple lane highway not occupied by the emergency vehicle and to reduce speed of the platoon; and
the first transceiver operates to transmit the steer platoon to lane not occupied by emergency vehicle and reduce speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles into a lane of the multiple lane highway not occupied by the emergency vehicle and to reduce speed of the platoon.

9. The system according to claim 8, wherein:
the logic of the platoon control unit is executable by the processor to:
   determine a quantity of platooning vehicles that are not the first associated platooning vehicle;
   based on the determined quantity of platooning vehicles that are not the first associated platooning vehicle being three or more, determine increase in inter-vehicle distance data, the increase in inter-vehicle distance data being representative of an increase in inter-vehicle distance to be performed by the set of platooning vehicles; and
the first transceiver operates to transmit the increase in inter-vehicle distance data as the emergency vehicle avoidance maneuver command data as the emergency vehicle avoidance maneuver command signal to the set of platooning vehicles that are not the first associated platooning vehicle for directing the set of platooning vehicles to increase the inter-vehicle distance between the platooning vehicles.

10. The system according to claim 8, wherein:
the logic of the platoon control unit is executable by the processor to:

determine a quantity of emergency vehicles;
based on the determined quantity of emergency vehicles being two or more, determine platoon disband platoon disband data, the platoon disband data being representative of disbanding of the platoon to be performed by the set of platooning vehicles; and
the first transceiver operates to transmit the platoon disband data as the emergency vehicle avoidance maneuver command data as the emergency vehicle avoidance maneuver command signal to the set of platooning vehicles for directing the set of platooning vehicles to disband the platoon.

11. The system according to claim 3, wherein:
the roadway configuration sensor unit is operable to:
determine a configuration of the associated roadway as being a multiple lane highway in each direction without a median; and
generate multiple lane highway roadway configuration data as the roadway configuration data, the multiple lane highway roadway configuration data being representative of the determined configuration of the associated roadway as being a multiple lane highway without a median;
the logic of the platoon control unit is executable by the processor to:
use the low priority emergency vehicle status data, the roadway configuration data, and the emergency vehicle present ahead data to determine steer platoon from a leftmost lane and maintain speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles from a leftmost lane of the multiple lane highway and to maintain speed of the platoon; and
the first transceiver operates to transmit the steer platoon from leftmost lane and maintain speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles away from the leftmost lane of the multiple lane highway and to maintain speed of the platoon.

12. The system according to claim 3, wherein:
the roadway configuration sensor unit is operable to:
determine a configuration of the associated roadway as being a multiple lane highway in each direction; and
generate multiple lane highway roadway configuration data as the roadway configuration data, the multiple lane highway roadway configuration data being representative of the determined configuration of the associated roadway as being a multiple lane highway;
the logic of the platoon control unit is executable by the processor to:
use the low priority emergency vehicle status data, the roadway configuration data, and the emergency vehicle present behind data to determine steer platoon to lane not occupied by emergency vehicle and maintain speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles into a lane of the multiple lane highway not occupied by the emergency vehicle and to maintain speed of the platoon; and
the first transceiver operates to transmit the steer platoon to lane not occupied by emergency vehicle and maintain speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles into a lane of the multiple lane highway not occupied by the emergency vehicle and to maintain speed of the platoon.

13. A system according to claim 3, further comprising:
a second platoon control unit configured to be disposed in a second associated platooning vehicle of the set of platooning vehicles, the second platoon control unit comprising:
a processor;
a non-transient memory device operatively coupled with the processor; and
logic stored in the non-transient memory and executable by the processor to control a platooning operation of the first associated platooning vehicle; and
a second transceiver operatively coupled with the second platoon control unit and being configured to be disposed in the second associated platooning vehicle, the second transceiver being operable to receive the emergency vehicle avoidance maneuver command signal transmitted from the first transceiver disposed in the first associated platooning vehicle, the second transceiver delivering the emergency vehicle avoidance maneuver command signal to the second platoon control unit as the emergency vehicle avoidance maneuver command data determined by the first platoon control unit using the high or low priority emergency vehicle status data, the roadway configuration data, and the emergency vehicle present ahead or behind data, the emergency vehicle avoidance maneuver command data representative of the emergency vehicle avoidance maneuver for directing the second associated platooning vehicle away from the path of the associated emergency vehicle on the associated roadway.

14. A method for dynamically controlling a set of platooning vehicles travelling on an associated roadway to respond to a presence of a non-platooning emergency vehicle approaching the set of platooning vehicles on the associated roadway, the method comprising:
sensing by a first emergency vehicle sensor unit operatively coupled with a first platoon control unit disposed in the first associated platooning vehicle a presence of an associated emergency vehicle near to the first associated platooning vehicle;
based on sensing the presence of the associated emergency vehicle near to the first associated platooning vehicle:
determining by the first emergency vehicle sensor unit a position of the emergency vehicle relative to the first associated platooning vehicle;
generating by the first emergency vehicle sensor unit emergency vehicle position data representative of the determined position of the associated emergency vehicle relative to the first associated platooning vehicle;
determining by the first emergency vehicle sensor unit a status of the associated emergency vehicle; and
generating by the first emergency vehicle sensor unit emergency vehicle status data representative of the determined status of the associated emergency vehicle;
sensing by a roadway configuration sensor unit operatively coupled with the first platoon control unit and being configured to be disposed in the first associated platooning vehicle the associated roadway;
determining by the roadway configuration sensor unit a configuration of the associated roadway; and
generating by the roadway configuration sensor unit roadway configuration data representative of the determined configuration of the associated roadway;
executing logic of the first platoon control unit by a processor of the first control unit to:
based on the first emergency vehicle sensor unit sensing the presence of the associated emergency vehicle near to the first associated platooning vehicle:
determine emergency vehicle avoidance maneuver command data using the emergency vehicle position data, the emergency vehicle status data, and the roadway configuration data, wherein the emergency vehicle avoidance maneuver command data is representative of an emergency vehicle avoidance maneuver for directing the set of platooning vehicles away from a path of the associated emergency vehicle on the associated roadway,
transmitting by a first transceiver operatively coupled with the first platoon control unit and disposed in the first associated platooning vehicle the emergency vehicle avoidance maneuver command data as an emergency vehicle avoidance maneuver command signal to the set of platooning vehicles that are not the first associated platooning vehicle for directing the set of platooning vehicles away from a path of the associated emergency vehicle on the associated roadway.

15. The method according to claim 14, further comprising:
sensing by a forward directed sensor of the emergency vehicle sensor unit operatively coupled with the platoon control unit and disposed on a front portion of the first associated platooning vehicle light flashes emanating from the associated emergency vehicle;
generating by the forward directed sensor of the emergency vehicle sensor unit emergency vehicle present ahead data as the emergency vehicle position data based on the emergency light flashes sensed as being from ahead of the first associated platooning vehicle;
sensing by a rearward directed sensor of the emergency vehicle sensor unit operatively coupled with the platoon control unit and disposed on a rear portion of the first associated platooning vehicle light flashes emanating from the associated emergency vehicle;
generating by the rearward directed sensor of the emergency vehicle sensor unit emergency vehicle present behind data as the emergency vehicle position data based on the emergency light flashes sensed as being from behind of the first associated platooning vehicle; and
executing the logic of the platoon control unit by the processor to:
based on the first emergency vehicle sensor unit sensing the presence of the associated emergency vehicle near to the first associated platooning vehicle:
use the emergency vehicle status data, the roadway configuration data, and the emergency vehicle present ahead or behind data to determine the emergency vehicle avoidance maneuver command data representative of the emergency vehicle avoidance maneuver for directing the set of platooning vehicles away from the path of the associated emergency vehicle on the associated roadway.

16. The method according to claim 15, further comprising:
determining by a timer of the emergency vehicle sensor unit a flash frequency of the sensed emergency light flashes of the associated emergency vehicle;
generating by the emergency vehicle sensor unit high priority emergency vehicle status data as the emergency vehicle status data based on the determined flash frequency being about 14 Hz or generate low priority emergency vehicle status data as the emergency vehicle status data based on the determined flash frequency being about 10 Hz, the high priority emergency vehicle status data being representative of a status of the associated emergency vehicle being a high priority emergency vehicle and the low priority emergency vehicle status data being representative of a status of the associated emergency vehicle being a low priority special purpose vehicle; and
executing the logic of the platoon control unit by the processor to:
based on the first emergency vehicle sensor unit sensing the presence of the associated emergency vehicle near to the first associated platooning vehicle:
use the high or low priority emergency vehicle status data, the roadway configuration data, and the emergency vehicle present ahead or behind data to determine the emergency vehicle avoidance maneuver command data representative of the emergency vehicle avoidance maneuver for directing the set of platooning vehicles away from the path of the associated emergency vehicle on the associated roadway.

17. The method according to claim 16, further comprising:
determining by the roadway configuration sensor unit a configuration of the associated roadway as being a single lane highway without a median; and
generating by the roadway configuration sensor unit single lane highway roadway configuration data as the roadway configuration data, the single lane highway roadway configuration data being representative of the determined configuration of the associated roadway as being a single lane highway without a median;
executing the logic of the platoon control unit by the processor to:
use the high priority emergency vehicle status data, the single lane highway roadway configuration data, and the emergency vehicle present ahead or behind data to determine steer platoon right and stop maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles as far right in the roadway or into a shoulder of the associated roadway and to come to a stop; and transmitting by the first transceiver the steer platoon right and stop maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to come to a stop.

18. The method according to claim 16, further comprising:

determining by the roadway configuration sensor unit a configuration of the associated roadway as being a single lane highway without a median;

generating by the roadway configuration sensor unit single lane highway roadway configuration data as the roadway configuration data, the single lane highway roadway configuration data being representative of the determined configuration of the associated roadway as being a single lane highway without a median;

executing the logic of the platoon control unit by the processor to:
use the low priority emergency vehicle status data, the single lane highway roadway configuration data, and the emergency vehicle present ahead data to determine steer platoon right and maintain speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles as far right in the roadway or into a shoulder of the associated roadway and to maintain speed of the platoon; and transmitting by the first transceiver the steer platoon right and maintain speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to maintain speed of the platoon.

19. The method according to claim 16, further comprising:

determining by the roadway configuration sensor unit a configuration of the associated roadway as being a single lane highway without a median;

generating by the roadway configuration sensor unit single lane highway roadway configuration data as the roadway configuration data, the single lane highway roadway configuration data being representative of the determined configuration of the associated roadway as being a single lane highway without a median;

executing the logic of the platoon control unit by the processor to:
use the low priority emergency vehicle status data, the single lane highway roadway configuration data, and the emergency vehicle present behind data to determine steer platoon right and reduce speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles as far right in the roadway or into a shoulder of the associated roadway and to reduce speed of the platoon; and transmitting by the first transceiver the steer platoon right and reduce speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway moving the set of platooning vehicles as far right in the roadway or into a shoulder of the associated roadway and to reduce speed of the platoon.

20. The method according to claim 16, further comprising:

determining by the roadway configuration sensor unit a configuration of the associated roadway as being a multiple lane highway in each direction without a median;

generating by the roadway configuration sensor unit multiple lane highway roadway configuration data as the roadway configuration data, the multiple lane highway roadway configuration data being representative of the determined configuration of the associated roadway as being a multiple lane highway without a median;

executing the logic of the platoon control unit by the processor to:
use the high priority emergency vehicle status data, the roadway configuration data, and the emergency vehicle present ahead data to determine steer platoon from leftmost lane and reduce speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles away from the leftmost lane of the multiple lane highway and to reduce speed of the platoon; and transmitting by the first transceiver the steer platoon from leftmost lane and reduce speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles away from the leftmost lane of the multiple lane highway and to reduce speed of the platoon.

21. The method according to claim 16, further comprising:

determining by the roadway configuration sensor unit a configuration of the associated roadway as being a multiple lane highway in each direction;

generating by the roadway configuration sensor unit multiple lane highway roadway configuration data as the roadway configuration data, the multiple lane highway roadway configuration data being representative of the determined configuration of the associated roadway as being a multiple lane highway;

executing the logic of the platoon control unit by the processor to:
   use the high priority emergency vehicle status data, the roadway configuration data, and the emergency vehicle present behind data to determine steer platoon to lane not occupied by emergency vehicle and reduce speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles into a lane of the multiple lane highway not occupied by the emergency vehicle and to reduce speed of the platoon; and
transmitting by the first transceiver the steer platoon to lane not occupied by emergency vehicle and reduce speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles into a lane of the multiple lane highway not occupied by the emergency vehicle and to reduce speed of the platoon.

22. The method according to claim 21, further comprising:
executing the logic of the platoon control unit by the processor to:
   determine a quantity of platooning vehicles that are not the first associated platooning vehicle;
   based on the determined quantity of platooning vehicles that are not the first associated platooning vehicle being three or more, determine increase in inter-vehicle distance data, the increase in inter-vehicle distance data being representative of an increase in inter-vehicle distance to be performed by the set of platooning vehicles; and
transmitting by the first transceiver the increase in inter-vehicle distance data as the emergency vehicle avoidance maneuver command data as the emergency vehicle avoidance maneuver command signal to the set of platooning vehicles that are not the first associated platooning vehicle for directing the set of platooning vehicles to increase the inter-vehicle distance between the platooning vehicles.

23. The method according to claim 21, further comprising:
executing the logic of the platoon control unit by the processor to:
   determine a quantity of emergency vehicles;
   based on the determined quantity of emergency vehicles being two or more, determine platoon disband platoon disband data, the platoon disband data being representative of disbanding of the platoon to be performed by the set of platooning vehicles; and
transmitting by the first transceiver the platoon disband data as the emergency vehicle avoidance maneuver command data as the emergency vehicle avoidance maneuver command signal to the set of platooning vehicles for directing the set of platooning vehicles to disband the platoon.

24. The method according to claim 16, further comprising:
determining by the roadway configuration sensor unit a configuration of the associated roadway as being a multiple lane highway in each direction without a median;
generating by the roadway configuration sensor unit multiple lane highway roadway configuration data as the roadway configuration data, the multiple lane highway roadway configuration data being representative of the determined configuration of the associated roadway as being a multiple lane highway without a median;
executing the logic of the platoon control unit by the processor to:
   use the low priority emergency vehicle status data, the roadway configuration data, and the emergency vehicle present ahead data to determine steer platoon from a leftmost lane and maintain speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles from a leftmost lane of the multiple lane highway and to maintain speed of the platoon; and
transmitting by the first transceiver the steer platoon from leftmost lane and maintain speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles away from the leftmost lane of the multiple lane highway and to maintain speed of the platoon.

25. The method according to claim 16, further comprising:
determining by the roadway configuration sensor unit a configuration of the associated roadway as being a multiple lane highway in each direction; and
generating by the roadway configuration sensor unit multiple lane highway roadway configuration data as the roadway configuration data, the multiple lane highway roadway configuration data being representative of the determined configuration of the associated roadway as being a multiple lane highway;
executing the logic of the platoon control unit by the processor to:
   use the low priority emergency vehicle status data, the roadway configuration data, and the emergency vehicle present behind data to determine steer platoon to lane not occupied by emergency vehicle and maintain speed maneuver data as the emergency vehicle avoidance maneuver command data representative of the emergency vehicle avoidance maneuver for directing the set of platooning vehicles away from the path of the associated emergency vehicle on the associated roadway by moving the set of platooning vehicles into a lane of the multiple lane highway not occupied by the emergency vehicle and to maintain speed of the platoon; and
transmitting by the first transceiver the steer platoon to lane not occupied by emergency vehicle and maintain speed maneuver data as the emergency vehicle avoidance maneuver command data as the emergency vehicle avoidance maneuver command signal to the set of platooning vehicles that are not the first associated platooning vehicle for directing the set of platooning vehicles away from a path of the associated emergency vehicle on the associated roadway by moving the set of platooning vehicles into a lane of the multiple lane highway not occupied by the emergency vehicle and to maintain speed of the platoon.

26. A method according to claim 16, further comprising:
- receiving by a second transceiver operatively coupled with a second platoon control unit disposed in a second associated platooning vehicle of the set of platooning vehicles the emergency vehicle avoidance maneuver command signal transmitted from the first transceiver disposed in the first associated platooning vehicle;
- delivering by the second transceiver the emergency vehicle avoidance maneuver command signal to a second platoon control unit disposed in the second associated platooning vehicle of the set of platooning vehicles as the emergency vehicle avoidance maneuver command data determined by the first platoon control unit using the high or low priority emergency vehicle status data, the roadway configuration data, and the emergency vehicle present ahead or behind data, the emergency vehicle avoidance maneuver command data representative of the emergency vehicle avoidance maneuver for directing the second associated platooning vehicle away from the path of the associated emergency vehicle on the associated roadway.

* * * * *